US012217221B2

(12) United States Patent
Silva et al.

(10) Patent No.: US 12,217,221 B2
(45) Date of Patent: *Feb. 4, 2025

(54) WIRELESS-ENABLED KIOSK FOR RECYCLING CONSUMER DEVICES

(71) Applicant: ecoATM, LLC, San Diego, CA (US)

(72) Inventors: John Silva, San Diego, CA (US); Jeffrey Ploetner, San Diego, CA (US); Mark Vincent Bowles, San Diego, CA (US); John Andrew Beane, San Diego, CA (US); Michael Librizzi, San Diego, CA (US); Randal Erman, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,618

(22) Filed: Jul. 3, 2023

(65) Prior Publication Data

US 2024/0005289 A1   Jan. 4, 2024

Related U.S. Application Data

(60) Continuation of application No. 17/445,575, filed on Aug. 20, 2021, now Pat. No. 11,734,654, which is a
(Continued)

(51) Int. Cl.
*G06Q 10/30* (2023.01)
*G06Q 20/18* (2012.01)
(Continued)

(52) U.S. Cl.
CPC ............ *G06Q 10/30* (2013.01); *G06Q 20/18* (2013.01); *G06Q 20/202* (2013.01);
(Continued)

(58) Field of Classification Search
None
See application file for complete search history.

(56) References Cited

U.S. PATENT DOCUMENTS

| 1,327,315 A | 1/1920 | Davies |
| 3,808,439 A | 4/1974 | Renius |
| (Continued) | | |

FOREIGN PATENT DOCUMENTS

| CA | 2760863 | 11/2010 |
| CA | 2818533 A1 | 5/2012 |
| (Continued) | | |

OTHER PUBLICATIONS

2006 Florida Statutes Title XXXIII, Chapter 538, Sections 538.03 and 538.04, 7 pages.
(Continued)

*Primary Examiner* — Fateh M Obaid
(74) *Attorney, Agent, or Firm* — Perkins Coie LLP

(57) ABSTRACT

Wireless-enabled kiosk systems and associated methods for recycling and performing other processes with mobile phones and other electronic devices are described herein. In various embodiments, the present technology includes systems and methods for wirelessly connecting a consumer-operated kiosk with an electronic device to facilitate processing (e.g., purchasing) the device. In some embodiments, the present technology includes using a wireless link to identify a device, evaluate a device, resolve device issues to enable purchase of the device, locate a device, etc. Various other aspects of the present technology are described herein.

27 Claims, 25 Drawing Sheets

Related U.S. Application Data continuation of application No. 16/575,003, filed on Sep. 18, 2019, now Pat. No. 11,126,973, which is a division of application No. 14/873,158, filed on Oct. 1, 2015, now Pat. No. 10,475,002.

(60) Provisional application No. 62/059,129, filed on Oct. 2, 2014.

(51) Int. Cl.
*G06Q 20/20* (2012.01)
*G06Q 30/0201* (2023.01)
*G07F 7/06* (2006.01)
*H04W 4/80* (2018.01)
*G06Q 10/00* (2023.01)

(52) U.S. Cl.
CPC ....... *G06Q 20/208* (2013.01); *G06Q 30/0201* (2013.01); *G06Q 30/0206* (2013.01); *G07F 7/06* (2013.01); *H04W 4/80* (2018.02); *G06Q 10/00* (2013.01); *G06Q 20/20* (2013.01); *Y02W 30/82* (2015.05); *Y02W 90/00* (2015.05)

(56) References Cited

U.S. PATENT DOCUMENTS

| | | |
|---|---|---|
| 4,248,334 A | 2/1981 | Hanley et al. |
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,159,560 A | 10/1992 | Newell et al. |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,413,454 A | 5/1995 | Movesian |
| 5,419,438 A | 5/1995 | Squyres et al. |
| 5,436,554 A | 7/1995 | Decker |
| 5,482,140 A | 1/1996 | Moore |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,323,782 B1 | 11/2001 | Stephens et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,687,679 B1 | 2/2004 | Van Luchene |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| D512,964 S | 12/2005 | Kissinger et al. |
| 7,062,454 B1 * | 6/2006 | Giannini ............ G06Q 30/0601 705/26.81 |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,343,319 B1 | 3/2008 | Jen |
| 7,407,392 B1 | 8/2008 | Cooke et al. |
| 7,408,674 B2 | 8/2008 | Moro et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Junger |
| D640,199 S | 6/2011 | Wilson |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,142,199 B1 | 3/2012 | Almouli |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,401,914 B1 | 3/2013 | Kim |
| 8,417,234 B2 | 4/2013 | Sanding et al. |
| 8,423,404 B2 | 4/2013 | Bowles et al. |
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |

(56) References Cited

U.S. PATENT DOCUMENTS

| | | |
|---|---|---|
| 8,755,783 B2 | 6/2014 | Brahami et al. |
| 8,806,280 B2 | 8/2014 | Stephenson |
| 8,823,794 B2 | 9/2014 | Suzuki et al. |
| 8,824,136 B1 | 9/2014 | Interian et al. |
| 8,743,215 B1 | 11/2014 | Lee |
| 8,922,643 B2 | 12/2014 | Ji et al. |
| 9,010,627 B1 | 4/2015 | Prasad et al. |
| 9,043,026 B2 | 5/2015 | Lien et al. |
| 9,124,056 B1 | 9/2015 | Lewis, Jr. |
| 9,189,911 B2 | 11/2015 | Kavli et al. |
| 9,195,979 B2 | 11/2015 | Geller |
| 9,256,863 B2 | 2/2016 | Chayon et al. |
| 9,317,989 B2 | 4/2016 | Grow et al. |
| 9,355,515 B2 | 5/2016 | Brahami et al. |
| 9,367,982 B2 | 6/2016 | Chayun et al. |
| 9,378,606 B2 | 6/2016 | Chayun et al. |
| 9,390,442 B2 | 7/2016 | Lyle |
| 9,497,563 B2 | 11/2016 | Hornung et al. |
| 9,582,101 B2 | 2/2017 | Chang et al. |
| 9,595,238 B2 | 3/2017 | Won |
| 9,621,947 B1 | 4/2017 | Oztaskent |
| 9,641,997 B2 | 5/2017 | Vratskides |
| 9,668,298 B1 | 5/2017 | Pearl et al. |
| 9,697,548 B1 | 7/2017 | Jaff et al. |
| 9,704,142 B2 | 7/2017 | Ahn |
| 9,818,160 B2 | 11/2017 | Bowles et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 9,934,644 B2 | 4/2018 | Chayun et al. |
| 9,972,046 B2 | 5/2018 | Ackerman |
| 10,032,140 B2 | 7/2018 | Bowles et al. |
| 10,043,339 B2 | 8/2018 | Walker et al. |
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,269,110 B2 | 4/2019 | Forutanpour et al. |
| 10,275,813 B2 | 4/2019 | Fu |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,475,002 B2 | 11/2019 | Silva et al. |
| 10,496,963 B2 | 12/2019 | Silva et al. |
| 10,565,629 B2 | 2/2020 | Hartman |
| 10,572,946 B2 | 2/2020 | Bowles et al. |
| 10,679,279 B2 | 6/2020 | Ward |
| 10,803,527 B1 | 10/2020 | Zankat et al. |
| 10,810,732 B2 | 10/2020 | Dwivedi et al. |
| 10,825,082 B2 | 11/2020 | Librizzi et al. |
| 10,846,672 B2 | 11/2020 | Dion et al. |
| 10,853,873 B2 | 12/2020 | Bowles et al. |
| 10,860,990 B2 | 12/2020 | Bowles et al. |
| 10,909,673 B2 | 2/2021 | Forutanpour et al. |
| 10,977,700 B2 | 4/2021 | Bordeleau et al. |
| 11,010,841 B2 | 5/2021 | Bowles et al. |
| 11,080,662 B2 | 8/2021 | Bowles et al. |
| 11,080,672 B2 | 8/2021 | Bowles |
| 11,107,046 B2 | 8/2021 | Bowles |
| 11,126,973 B2 | 9/2021 | Silva et al. |
| 11,232,412 B2 | 1/2022 | Hunt et al. |
| 11,315,093 B2 | 4/2022 | Bowles |
| 11,436,570 B2 | 9/2022 | Bowles et al. |
| 11,443,289 B2 | 9/2022 | Bowles et al. |
| 11,462,868 B2 | 10/2022 | Forutanpour et al. |
| 11,482,067 B2 | 10/2022 | Forutanpour et al. |
| 11,526,932 B2 | 12/2022 | Bowles et al. |
| 11,843,206 B2 | 12/2023 | Forutanpour et al. |
| 12,033,454 B2 | 7/2024 | Forutanpour et al. |
| 12,045,973 B2 | 7/2024 | Johnson et al. |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2001/0050684 A1* | 12/2001 | Smith ............... G06F 16/258 345/467 |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0109854 A1* | 8/2002 | Murray ............... G03B 27/32 358/1.9 |
| 2002/0112177 A1 | 8/2002 | Voltmer |
| 2002/0129170 A1 | 9/2002 | Moore et al. |
| 2002/0147656 A1 | 10/2002 | Tam |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0100372 A1 | 5/2003 | Hwang et al. |
| 2003/0146898 A1 | 8/2003 | Kawasaki et al. |
| 2003/0158789 A1* | 8/2003 | Miura ............... G06Q 30/02 705/26.8 |
| 2003/0170529 A1 | 9/2003 | Sagawa |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0039639 A1 | 2/2004 | Walker |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Van Der Weij et al. |
| 2004/0184651 A1 | 9/2004 | Nordbryhn |
| 2004/0186744 A1 | 9/2004 | Lux |
| 2004/0189812 A1 | 9/2004 | Gustavsson |
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0243478 A1* | 12/2004 | Walker ............... G06Q 20/12 705/26.1 |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0167580 A1 | 1/2006 | Whittier |
| 2006/0022827 A1 | 2/2006 | Highham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0184379 A1 | 8/2006 | Tan et al. |
| 2006/0195384 A1 | 8/2006 | Bauer et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0217152 A1 | 11/2006 | Fok et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |

(56) References Cited

U.S. PATENT DOCUMENTS

| | | |
|---|---|---|
| 2006/0287929 A1* | 12/2006 | Bae .................. G06Q 30/0623 705/26.61 |
| 2007/0012665 A1 | 1/2007 | Nelson |
| 2007/0013124 A1 | 1/2007 | Graef et al. |
| 2007/0013139 A1 | 1/2007 | Kumagai |
| 2007/0032098 A1 | 2/2007 | Bowles et al. |
| 2007/0050083 A1 | 3/2007 | Signorelli |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0150403 A1 | 6/2007 | Mock et al. |
| 2007/0140310 A1 | 7/2007 | Rolton et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0071627 A1 | 3/2008 | Janger |
| 2008/0097770 A1 | 4/2008 | Low et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0201232 A1 | 8/2008 | Walker |
| 2008/0207198 A1 | 8/2008 | Juric |
| 2008/0228582 A1 | 9/2008 | Fordyce |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0260235 A1 | 10/2008 | Cai et al. |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0257804 A1* | 10/2009 | Manico .............. H04N 1/00145 400/70 |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0174596 A1 | 7/2010 | Gilman |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0260271 A1 | 10/2010 | Kapoor |
| 2010/0262481 A1 | 10/2010 | Baker et al. |
| 2010/0312639 A1 | 12/2010 | Mastronardi |
| 2011/0035322 A1 | 2/2011 | Lively |
| 2011/0043628 A1 | 2/2011 | Yun |
| 2011/0047022 A1 | 2/2011 | Walker |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0082734 A1 | 4/2011 | Zhang et al. |
| 2011/0113479 A1 | 5/2011 | Ganem |
| 2011/0173576 A1 | 7/2011 | Murphy et al. |
| 2011/0191861 A1 | 8/2011 | Spears |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0095875 A1 | 4/2012 | Guthrie |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0209783 A1 | 8/2012 | Smith et al. |
| 2012/0235812 A1 | 9/2012 | De Mello et al. |
| 2012/0249779 A1 | 10/2012 | Ji et al. |
| 2012/0254046 A1 | 10/2012 | Librizzi et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0112440 A1 | 5/2013 | Alsaif et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0157641 A1 | 6/2013 | Brahami et al. |
| 2013/0159119 A1 | 6/2013 | Henderson et al. |
| 2013/0169413 A1 | 7/2013 | Schuessler |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0198089 A1 | 8/2013 | Bowles |
| 2013/0198144 A1 | 8/2013 | Bowles |
| 2013/0200912 A1 | 8/2013 | Panagas |
| 2013/0246211 A1 | 9/2013 | Sullivan |
| 2013/0246212 A1 | 9/2013 | Sullivan |
| 2013/0246285 A1 | 9/2013 | Chayun et al. |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0028449 A1 | 1/2014 | Sigal et al. |
| 2014/0038556 A1 | 2/2014 | DeSousa |
| 2014/0046748 A1 | 2/2014 | Nagarajan |
| 2014/0046845 A1 | 2/2014 | Dogin et al. |
| 2014/0052329 A1 | 2/2014 | Amirpour |

(56) References Cited

U.S. PATENT DOCUMENTS

| | | |
|---|---|---|
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0147004 A1 | 5/2014 | Uchida |
| 2014/0149201 A1 | 5/2014 | Abbott |
| 2014/0150100 A1 | 5/2014 | Gupta et al. |
| 2014/0156883 A1 | 6/2014 | Bowles |
| 2014/0178029 A1 | 6/2014 | Raheman et al. |
| 2014/0214505 A1 | 7/2014 | Shuster-Arechiga et al. |
| 2014/0235258 A1 | 8/2014 | Wang et al. |
| 2014/0244315 A1 | 8/2014 | Cahill et al. |
| 2014/0267691 A1 | 9/2014 | Humphrey |
| 2014/0278244 A1 | 9/2014 | Humphrey et al. |
| 2014/0297368 A1 | 10/2014 | Ferder |
| 2014/0330685 A1 | 11/2014 | Nazzari |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088698 A1 | 3/2015 | Ackerman |
| 2015/0088731 A1 | 3/2015 | Ackerman |
| 2015/0120485 A1 | 4/2015 | Nash |
| 2015/0161714 A1 | 6/2015 | Fainshtein |
| 2015/0170237 A1 | 6/2015 | Powell |
| 2015/0177330 A1 | 6/2015 | Morris |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0293860 A9 | 10/2015 | Bowles |
| 2015/0294278 A1 | 10/2015 | Nguyen |
| 2015/0309912 A1 | 10/2015 | Nguyen et al. |
| 2015/0317619 A1 | 11/2015 | Curtis |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0078434 A1 | 3/2016 | Huxham et al. |
| 2016/0087381 A1 | 3/2016 | Wong et al. |
| 2016/0091549 A1 | 3/2016 | Snook et al. |
| 2016/0092849 A1 | 3/2016 | Cirannek et al. |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0184990 A1 | 6/2016 | Song et al. |
| 2016/0210648 A1 | 7/2016 | Cirannek et al. |
| 2016/0269401 A1 | 9/2016 | Saito et al. |
| 2016/0269895 A1 | 9/2016 | Soini et al. |
| 2016/0275460 A1 | 9/2016 | Ploetner et al. |
| 2016/0275518 A1 | 9/2016 | Bowles et al. |
| 2016/0301786 A1 | 10/2016 | Koltsov et al. |
| 2016/0328684 A1 | 11/2016 | Bowles et al. |
| 2016/0364939 A1 | 12/2016 | Chayun et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0115235 A1 | 4/2017 | Ohlsson et al. |
| 2017/0169401 A1 | 6/2017 | Beane et al. |
| 2017/0278191 A1 | 9/2017 | Tassone et al. |
| 2017/0301010 A1 | 10/2017 | Bowles et al. |
| 2017/0323279 A1 | 11/2017 | Dion et al. |
| 2017/0372273 A1 | 12/2017 | Bowles et al. |
| 2018/0157246 A1 | 6/2018 | Huang et al. |
| 2019/0066439 A1 | 2/2019 | Pinkus |
| 2019/0287141 A1 | 9/2019 | Bordeleau et al. |
| 2020/0090137 A1 | 3/2020 | Bowles et al. |
| 2020/0126046 A1 | 4/2020 | Bowles |
| 2020/0202319 A1 | 6/2020 | Forutanpour et al. |
| 2020/0265487 A1 | 8/2020 | Forutanpour et al. |
| 2020/0342442 A1 | 10/2020 | Curtis |
| 2021/0012315 A1 | 1/2021 | Priebatsch |
| 2021/0081914 A1 | 3/2021 | Nelms et al. |
| 2021/0110366 A1 | 4/2021 | Dion et al. |
| 2021/0174312 A1 | 6/2021 | Bowles et al. |
| 2021/0192484 A1 | 6/2021 | Forutanpour et al. |
| 2021/0224867 A1 | 7/2021 | Bordeleau et al. |
| 2021/0295494 A1 | 9/2021 | Forutanpour et al. |
| 2022/0027879 A1 | 1/2022 | Bowles et al. |
| 2022/0050897 A1 | 2/2022 | Gaddam et al. |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |
| 2022/0051507 A1 | 2/2022 | Forutanpour et al. |
| 2022/0067798 A1 | 3/2022 | Forutanpour et al. |
| 2022/0068076 A1 | 3/2022 | Forutanpour et al. |
| 2022/0114854 A1 | 4/2022 | Forutanpour et al. |
| 2022/0172178 A1 | 6/2022 | Forutanpour et al. |
| 2022/0198407 A1 | 6/2022 | Beane et al. |
| 2022/0284406 A1 | 9/2022 | Hunt et al. |
| 2022/0292464 A1 | 9/2022 | Silva et al. |
| 2022/0318774 A1 | 10/2022 | Bowles |
| 2023/0007937 A1 | 1/2023 | Forutanpour et al. |
| 2023/0077844 A1 | 3/2023 | Bowles et al. |
| 2023/0100849 A1 | 3/2023 | Bowles et al. |
| 2023/0196865 A1 | 6/2023 | Forutanpour et al. |
| 2023/0274346 A1 | 8/2023 | Bowles et al. |
| 2023/0297974 A1 | 9/2023 | Bowles et al. |
| 2023/0306384 A1 | 9/2023 | Bowles et al. |
| 2024/0249251 A1 | 7/2024 | Bowles |
| 2024/0249321 A1 | 7/2024 | Forutanpour et al. |
| 2024/0265364 A1 | 8/2024 | Forutanpour et al. |
| 2024/0265470 A1 | 8/2024 | Bowles et al. |
| 2024/0289753 A1 | 8/2024 | Bowles |
| 2024/0321033 A1 | 9/2024 | Forutanpour et al. |

FOREIGN PATENT DOCUMENTS

| | | |
|---|---|---|
| CA | 2866147 | 9/2013 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 201956656 U | 8/2011 |
| CN | 102315630 A | 1/2012 |
| CN | 102467728 A | 5/2012 |
| CN | 202351953 | 7/2012 |
| CN | 202353475 U | 7/2012 |
| CN | 102654927 | 8/2012 |
| CN | 202394296 | 8/2012 |
| CN | 102682597 A | 9/2012 |
| CN | 202564711 U | 11/2012 |
| CN | 202585951 U | 12/2012 |
| CN | 202702438 U | 1/2013 |
| CN | 202711369 U | 1/2013 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 302944037 S | 9/2014 |
| CN | 302944252 S | 9/2014 |
| CN | 302944253 S | 9/2014 |
| CN | 303042750 S | 12/2014 |
| DE | 10031532 | 10/2001 |
| EP | 0116970 | 12/1991 |
| EP | 0654003 | 5/1995 |
| EP | 1168253 | 1/2002 |

(56) References Cited

FOREIGN PATENT DOCUMENTS

| | | |
|---|---|---|
| EP | 1270905 | 1/2003 |
| EP | 1703436 | 9/2006 |
| EP | 2428072 | 1/2018 |
| GB | 2167553 | 5/1986 |
| JP | H7334583 | 12/1995 |
| JP | H11242005 | 9/1999 |
| JP | H11334851 | 12/1999 |
| JP | 2000121564 | 4/2000 |
| JP | 2000171409 A | 6/2000 |
| JP | 2000180371 | 6/2000 |
| JP | 3123095 | 1/2001 |
| JP | 2001312766 | 11/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004226129 | 8/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008059403 A | 3/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |
| JP | 2017040957 A | 2/2017 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101326680 | 11/2013 |
| KR | 101329949 | 11/2013 |
| KR | 20140037543 | 3/2014 |
| KR | 101599251 | 3/2016 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |
| WO | WO2004021114 | 3/2004 |
| WO | WO2004114490 | 12/2004 |
| WO | WO2005008566 | 1/2005 |
| WO | 2005054877 | 6/2005 |
| WO | WO2005101346 | 10/2005 |
| WO | WO2006021825 | 3/2006 |
| WO | WO2006058601 | 6/2006 |
| WO | WO2006080851 | 8/2006 |
| WO | WO2007066166 | 6/2007 |
| WO | WO2009089607 | 7/2009 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |
| WO | WO2016181224 | 11/2016 |
| WO | WO2015196175 | 12/2016 |
| WO | WO2017034441 | 3/2017 |

OTHER PUBLICATIONS

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bhule et al., "Environmental and economic trade-offs in consumer electronic products recycling: a case study of cell phones and computers," IEEE International Symposium on Electronics and the Environment, Conference Record, 2004.

Bournique, D.: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

Business Wire, "The World's First Office Photography Machine" at CES 2008 Launched by Ortery Technologies, Jan. 7, 2008, 3 pages.

CNET, "Tackling LCD "burn ins", and dead/stick Pixels", published Sep. 2, 2009, retrieved from http://www.cnet.com/news/tackling-LCD-burn-ins-and-deadstuck-pixels/.

Cybercom Group Europe AB, "OMSI Forum," Downloads, 2005, 2 pages.

Cybercom Group Europe AB, "OMSI Provides Easy Service and Maintenance for Mobile Phones," Press Release, 2005, 1 page.

Cybercom Group Europe AB, "The OMSI 2.0 Interface Supports," OMSI 2.0 Description, available at least before Oct. 2008, 1 page.

Cybercom Group, "Leading Telecom Organisations Draft IDS 10/26ress Device Management Issues," Press Release, 2007, 1 page.

Evgenii Masunov, Mar. 25, 2010, http://www.appleinsider.ru/news/ipone-obladaet-luchshim-tachskrinom-provereno_robotom.html, 4 pages.

Foster et al., "Automated Visual Inspection: a Tutorial" 1990 Computers Ind. Engng. vol. 18(4): 493-504.

Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.

Geyer et al. "The economics of cell phone reuse and recylcing," The International Journal of Advanced Manufacturing Technology, 47(5): 515-525, 2010.

(56) References Cited

OTHER PUBLICATIONS

Graffia et al., "Retail Station for E-Device Identification, Assessment, and Trade-In", Jun. 6, 2014 (Drawings and Specification) (Year: 2014).
GSM Arena Glossary, "LCD (Liquid Crystal Display", retrieved from http://www.gsmarena.com/glossary.php3?term=LCD on Apr. 28, 2016, 1 page.
International Numbering Plan, www.numberingplans.com, 2 pages.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Lambert, Emily, "Use It up, Wear It Out", Forbes 175.5 (2005): 77-78. Business Source Complete. Web. Jan. 6, 2015, 3 pages.
Littleton Partners with Donations Ink (2006, Jan. 19) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Oliveira, et al., "Automatic crack detection on road imagery using anisotropic diffusion and region linkage," 18th European Signal Processing Conference (EUSIPCO-2010), Aug. 23, 2010, pp. 274-278.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, pp. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk" IEEE, Computer Society Conference on Computer Vision and Pattern Recognition (1997).
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route to Feeling Green," Xconomy, Jan. 22, 2014, pp. 1-3.
Rosebrock, "How to Build a Kick-Ass Mobile Document Scanner in Just 5 Minutes" PyImage Search, Sep. 2014, 19 pages.
Shotton et al., "Efficiently Combining Contour and Texture Cues for Object Recognition", Proceedings of the British Machine Vision Conference 2008, (Sep. 1, 2008), pp. 7.1-7.10 * abstract *.
Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.
SimplySellular, "Get Cash for your Old Cell Phone", published Apr. 2, 2010, retrieved from http://simplysellular.com/conditions.php on Jan. 6, 2015, 2 pages.
Sony Ericsson Mobile Communications Ab, "P800/P802," White Paper, 2003, 128 pages.
Sony Ericsson Mobile Communications AB, "T68i/T68ie," White Paper, 2002, 71 pages.
Tecace Software: "Your phone appraisal-Movaluate -Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Tech Spurt, "Sandisk iXpand Review | Wireless Charger & Auto Photo Backup!" https://www.youtube.com/watch?v=zemKQ6xIJLww, Aug. 21, 2019, 1 page.
Trading devices for dollars, The Economist (US) 405.8813:8 (US), Economist Intelligence Unit N.A. Incorporated, Dec. 1, 2012.
Turner, "5 MP3 Players for Pumping up Your Workouts," Mashable.com, Nov. 4, 2010, available online at https://mashable.com/2010/11/04/mp3-players-for-sports/ (Year: 2010).
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology (2009).
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
Non-Final Office Action mailed Aug. 24, 2017 in U.S. Appl. No. 15/630,539, 23 pages.
Non-Final Office Action mailed Dec. 29, 2017 in U.S. Appl. No. 14/873,158, 14 pages.
Non-Final Office Action mailed Oct. 16, 2020 in U.S. Appl. No. 16/575,003, 11 pages.
Non-Final Office Action mailed Oct. 22, 2018 in U.S. Appl. No. 14/873,145, 7 pages.
Non-Final Office Action mailed Sep. 15, 2021 in U.S. Appl. No. 16/556,018, 6 pages.
Non-Final Office Action Response filed Dec. 10, 2021 in U.S. Appl. No. 16/556,018, 10 pages.
Final Office Action mailed Jan. 6, 2022 in U.S. Appl. No. 16/556,018, 8 pages.
Final Office Action mailed Apr. 5, 2022 in U.S. Appl. No. 16/556,018, 13 pages.
Non-Final Office Action mailed Apr. 13, 2022 in U.S. Appl. No. 16/556,018, 5 pages.
Non-Final Office Action Response filed Jul. 13, 2022 in U.S. Appl. No. 16/556,018, 10 pages.
Non-Final Office Action mailed Sep. 26, 2022 in U.S. Appl. No. 16/556,018, 6 pages.
Non-Final Office Action Response filed Jan. 26, 2023 in U.S. Appl. No. 16/556,018, 12 pages.
Final Office Action mailed Mar. 3, 2023 in U.S. Appl. No. 16/556,018, 9 pages.
Final Office Action Response filed Jun. 5, 2023 in U.S. Appl. No. 16/556,018, 7 pages.
Notice of Allowance mailed Jul. 21, 2023 in U.S. Appl. No. 16/556,018, 8 pages.
Non-Final Office Action mailed Sep. 8, 2017 in U.S. Appl. No. 15/630,508, 13 pages.
Non-Final Office Action Response filed Apr. 22, 2019 in U.S. Appl. No. 14/873,145, 13 pages.
Non-Final Office Action Response filed Mar. 29, 2018 in U.S. Appl. No. 14/873,158, 18 pages.
Non-Final Office Action Response filed Mar. 16, 2021 in U.S. Appl. No. 16/575,003, 13 pages.
Non-Final Office Action Response filed Nov. 2, 2017 in U.S. Appl. No. 15/630,539, 15 pages.

(56) References Cited

OTHER PUBLICATIONS

Non-Final Office Action Response filed Sep. 8, 2017 in U.S. Appl. No. 15/630,508, 19 pages.
Notice of Allowance mailed Jan. 17, 2018 in U.S. Appl. No. 15/630,539 of Bowles et al., filed Jun. 22, 2017.
Notice of Allowance mailed Jan. 17, 2018 in U.S. Appl. No. 15/630,539, 12 pages.
Notice of Allowance mailed Jun. 28, 2019 in U.S. Appl. No. 14/873,145, 9 pages.
Notice of Allowance mailed Jun. 28, 2021 in U.S. Appl. No. 16/575,003, 15 pages.
Non-Final Office Action mailed Feb. 17, 2023 in U.S. Appl. No. 17/445,575, 6 pages.
Non-Final Office Action Response filed Mar. 14, 2023 in U.S. Appl. No. 17/445,575, 12 pages.
Notice of Allowance mailed Apr. 4, 2023 in U.S. Appl. No. 17/445,575, 7 pages.
Notice of Allowance mailed May 6, 2019 in U.S. Appl. No. 14/873,158, 7 pages.
Notice of Allowance mailed May 7, 2019 in U.S. Appl. No. 15/630,508 of Silva, J., et al., filed Jun. 22, 2017.
Notice of Allowance mailed Sep. 5, 2019 in U.S. Appl. No. 14/873,158, 7 pages.
Notice of Allowance mailed Sep. 9, 2019 in U.S. Appl. No. 15/630,508 of Silva, J., et al., filed Jun. 22, 2017.
Final Office Action mailed Apr. 19, 2018 in U.S. Appl. No. 15/630,508, 15 pages.
Final Office Action mailed Jul. 23, 2018 in U.S. Appl. No. 14/873,158, 13 pages.
Final Office Action Response filed Apr. 3, 2019 in U.S. Appl. No. 15/630,508, 13 pages.
Final Office Action Response filed Mar. 25, 2019 in U.S. Appl. No. 14/873,158, 14 pages.
Restriction Requirement mailed Jul. 2, 2021 in U.S. Appl. No. 16/556,018, 6 pages.
Restriction Requirement Response filed Sep. 2, 2021 in U.S. Appl. No. 16/556,018, 6 pages.
International Search Report and Written Opinion mailed Dec. 20, 2021 in International Application No. PCT/US2021/071269, 14 pages.
International Search Report and Written Opinion mailed Dec. 22, 2015 in International Application No. PCT/US2015/053591, 18 pages.
International Search Report and Written Opinion mailed Jun. 10, 2015 in International Application No. PCT/US2015/014139. 9 pages.
Decision to Refuse Application Sep. 25, 2020, EP17180663.1, 7pgs.
Declaration in Support of Written Submissions Jul. 8, 2020, EP17180663.1, 3pgs.
Written Submissions Arguments and Claims Filed Apr. 23, 2020, EP17180663.1, 6pgs.
Preliminary Opinion in Response to Written Submissions, Jul. 6, 2020, EP17180663.1, 5pgs.
Final Office Action dated Feb. 1, 2018 in U.S. Appl. No. 15/630,460, 47 pages.
Non-Final Office Action dated Sep. 1, 2017 in U.S. Appl. No. 15/630,460, 23 pages.
Non-Final Office Action Response filed Nov. 29, 2017 in U.S. Appl. No. 15/630,460, 16 pages.
Final Office Action Response as Appeal Brief filed Jun. 19, 2018 in U.S. Appl. No. 15/630,460, 24 pages.
Examiner's Answer to Appeal Briefs dated Sep. 28, 2018 in U.S. Appl. No. 15/630,460, 16 pages.
Supplemental Appeal Brief filed Apr. 9, 2020 in U.S. Appl. No. 15/630,460, 4 pages.
Notice of Allowance dated Jul. 6, 2020 in U.S. Appl. No. 15/630,460, 8 pages.
Hazelwood, et al., "Life extension of electronic products: a case study of smartphones," IEEE Access 9(2021): 144726-144739. (Year: 2021).
Non-Final Office Action mailed Nov. 16, 2023 in U.S. Appl. No. 17/445,799, 27 pages.
Grose, Thomas; "New Life for Old Phones," ASE Prism 22.3 (2012): 18.
Wiley Encyclopedia of Computer Science and Technology, Nov. 2008, 2362 pages, Wiley-interscience, ISBN-10: 0471383937, ISBN-13: 978-0471383932.
Non-Final Office Action mailed Nov. 16, 2023 in U.S. Appl. No. 17/445,799, 26 pages.
Non-Final Office Action received Jul. 1, 2024 in U.S. Appl. No. 18/464,023, pp. all.

* cited by examiner

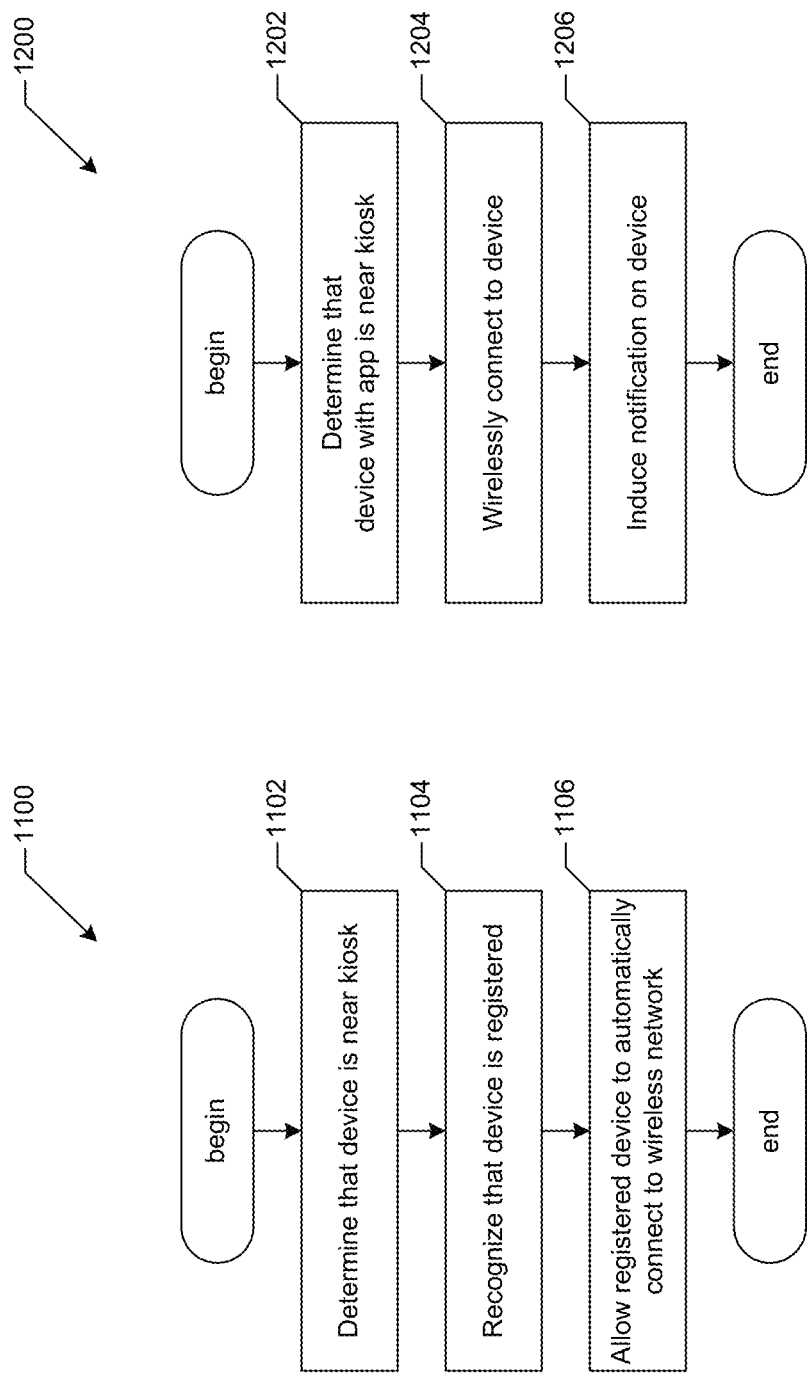

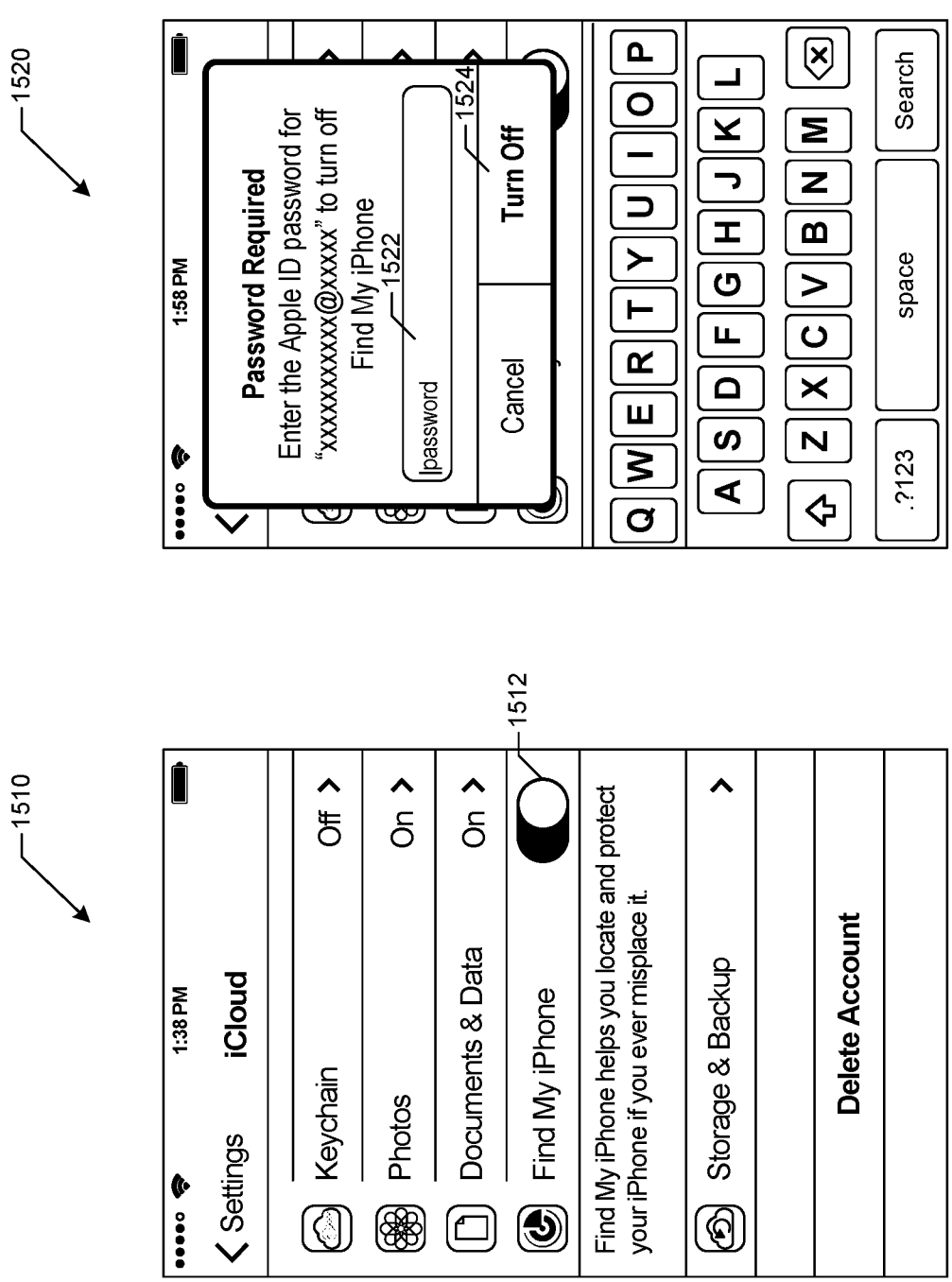

WIRELESS-ENABLED KIOSK FOR RECYCLING CONSUMER DEVICES

CROSS-REFERENCE TO RELATED APPLICATIONS

This application is a continuation of U.S. patent application Ser. No. 17/445,575, filed Aug. 20, 2021, now U.S. Pat. No. 11,734,654, which is a continuation of U.S. patent application Ser. No. 16/575,003, filed Sep. 18, 2019, now U.S. Pat. No. 11,126,973, which is a divisional of U.S. patent application Ser. No. 14/873,158, filed Oct. 1, 2015, now U.S. Pat. No. 10,475,002, which claims the benefit of U.S. Provisional Application No. 62/059,129, filed Oct. 2, 2014. The entire disclosures of the above-referenced applications are incorporated herein by reference in their entirety and made part of the present disclosure.

TECHNICAL FIELD

The present disclosure is directed generally to methods and systems for analyzing and recycling mobile phones and other consumer devices and, more particularly, to wireless methods and systems for facilitating identification, evaluation, and other processes associated with recycling consumer devices.

BACKGROUND

Consumer electronic devices, such as mobile phones, laptop computers, notebooks, tablets, MP3 players, etc., are ubiquitous. Currently there are over 6 billion mobile devices in use in the world; and the number of these devices is growing rapidly with more than 1.8 billion mobile phones being sold in 2013 alone. By 2017 it is expected that there will be more mobile devices in use than there are people on the planet. In addition to mobile phones, over 300 million desk-based and notebook computers shipped in 2013, and for the first time the number of tablet computers shipped exceeded laptops. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their mobile phones and other electronic devices to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones and other electronic devices are simply tossed into junk drawers or otherwise kept until a suitable disposal solution arises.

Although many electronic device retailers and cell carrier stores now offer mobile phone trade-in or buyback programs, many old mobile phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment.

As an alternative to retailer trade-in or buyback programs, consumers can now recycle and/or sell their used mobile phones using self-service kiosks located in malls, retail stores, or other publically accessible areas. Such kiosks are operated by ecoATM, Inc., the assignee of the present application, and are disclosed in, for example, U.S. Pat. Nos. 8,463,646, 8,423,404, 8,239,262, 8,200,533, 8,195,511, and 7,881,965, which are commonly owned by ecoATM, Inc. and are incorporated herein by reference in their entireties.

There continues to be a need for improving the means available to consumers for recycling or reselling their mobile phones and other electronic devices. Simplifying the recycling/reselling process, enhancing the consumer experience, and discouraging fraud can incentivize consumers to dispose of their old electronic devices in an efficient and environmentally conscientious way.

BRIEF DESCRIPTION OF THE DRAWINGS

FIG. 11 illustrates a flow diagram of a routine for enabling a known electronic device to automatically connect to a kiosk-provided wireless network in accordance with embodiments of the present technology.

FIG. 12 is a flow diagram of a routine for inducing a notification on the device accordance with embodiments of the present technology.

FIGS. 15A-15B are display diagrams illustrating device screens associated with disabling a remote account associated with the device in accordance with embodiments of the present technology.

DETAILED DESCRIPTION

Figure 1:
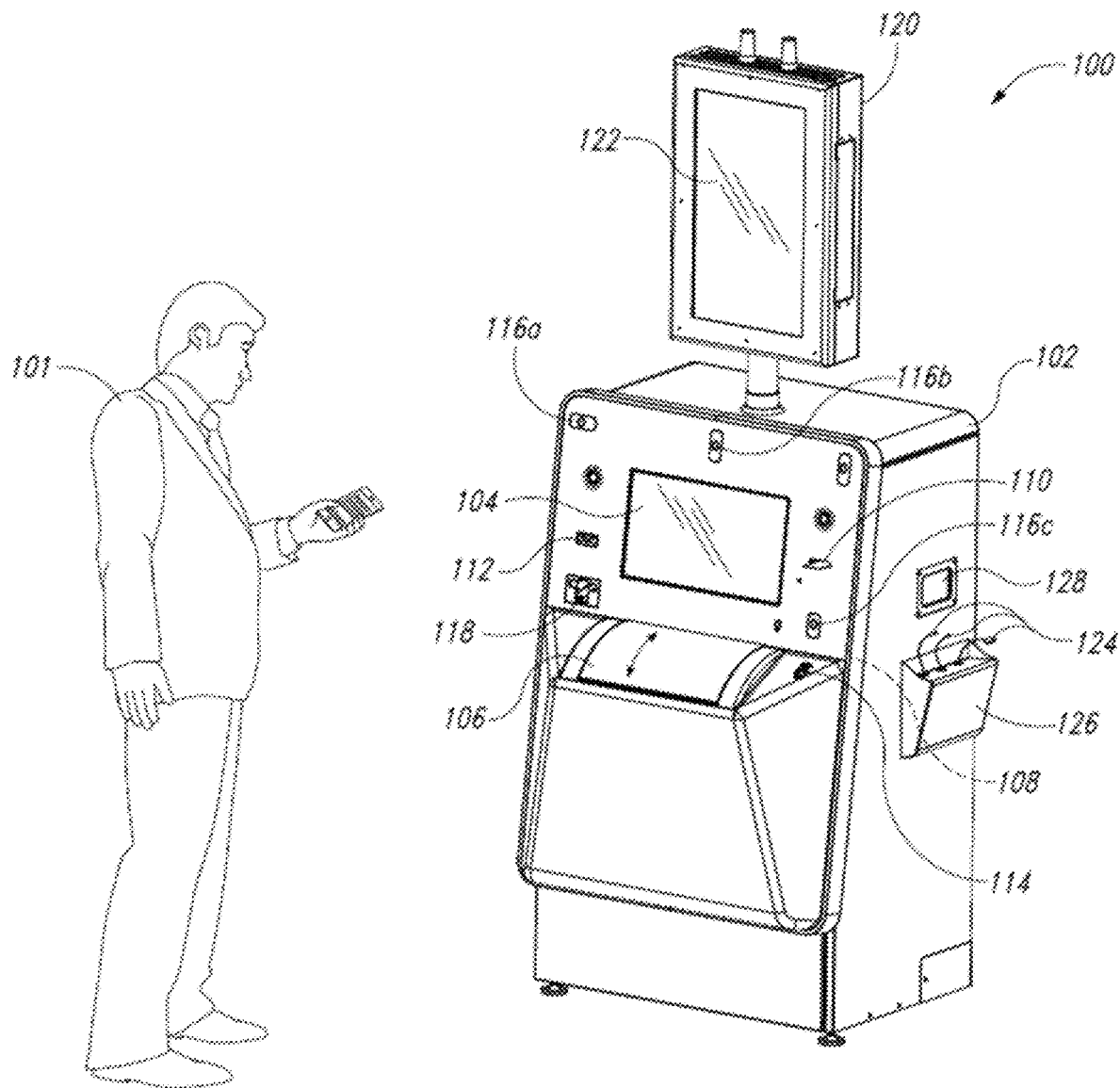
FIG. 1 is an isometric view of a machine configured in accordance with an embodiment of the present technology for recycling electronic devices.

The following disclosure describes various embodiments of systems and methods for providing a wireless connection to electronic devices to facilitate identification, evaluation, and other processes associated with purchasing and recycling consumer electronic devices. In various embodiments, for example, a consumer-operated kiosk provides a wireless network connection, allowing a consumer to connect a device to the kiosk without a physical connector. The kiosk can then receive information about the connected device to help the consumer successfully interact with the kiosk. For example, in some embodiments, the kiosk uses the wireless connection to identify and evaluate the user's device to determine a price to offer for the device. Providing a wireless connection between a device and the kiosk can thus allow the consumer to sell and recycle the device at the kiosk more quickly and easily. In some embodiments, the wireless connection helps the consumer prepare a device for possible sale at the kiosk 100, e.g., by allowing the consumer to install a software application (an "app") on the device or resolve issues that could be reducing the device's resale value. For example, if the consumer has protected the device with a remote kill switch feature that allows a lost or stolen device to be remotely reset or made unusable, the feature must typically be disabled before the device can be sold to a new user. The kiosk can provide a wireless Internet connection for the user to disable such a remote kill switch feature before completing the purchase transaction.

In various embodiments, a wireless-enabled kiosk can identify nearby wireless devices, automatically allow recognized devices to connect to the kiosk's wireless network, interact with software on a wireless device (e.g., causing an app associated with the kiosk to trigger a notification on the device), and/or obtain information transmitted via the provided wireless network. In some embodiments, the kiosk can observe and record the presence of wireless devices in its vicinity, e.g., assessing traffic patterns and volume or associating the presence of a wireless device with activity at the kiosk—for example, identifying a nearby wireless device as a known device of a repeat, high-value customer or as potentially belonging to an individual who has attempted a fraudulent sale. In some embodiments, the kiosk can use the wireless connection to reduce fraud by verifying that a purchased device has been properly submitted to the kiosk and not exchanged for a fake device.

Certain details are set forth in the following description and in FIGS. 1-24D to provide a thorough understanding of various embodiments of the present technology. In other instances, well-known structures, materials, operations and/or systems often associated with smartphones and other handheld devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the present technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view of a kiosk 100 for recycling and/or other processing of mobile phones and other consumer electronic devices in accordance with the present technology. The term "processing" is used herein for ease of reference to generally refer to all manner of services and operations that may be performed or facilitated by the kiosk 100 on, with, or otherwise in relation to an electronic device. Such services and operations can include, for example, selling, reselling, recycling, donating, exchanging, identifying, evaluating, pricing, auctioning, decommissioning, transferring data from or to, reconfiguring, refurbishing, etc. mobile phones and other electronic devices. Although many embodiments of the present technology are described herein in the context of mobile phones, aspects of the present technology are not limited to mobile phones and generally apply to other consumer electronic devices. Such devices include, as non-limiting examples, all manner of mobile phones, smartphones, handheld devices, PDAs, MP3 players, tablet, notebook and laptop computers, e-readers, cameras, etc. In some embodiments, it is contemplated that the kiosk 100 can facilitate selling and/or otherwise processing larger consumer electronic devices, such as desktop computers, TVs, game consoles, etc., as well smaller electronic devices such as Google Glass™, smartwatches, etc. The kiosk 100 and various features thereof can be at least generally similar in structure and function to the kiosks and corresponding features described in U.S. Pat. Nos. 8,463,646, 8,423,404, 8,239,262, 8,200,533, 8,195,511, and 7,881,965; and in U.S. patent application Ser. Nos. 12/573,089, 12/727,624, 13/113,497, 12/785,465, 13/017,560, 13/438,924, 13/753,539, 13/658,825, 13/733,984, 13/705,252, 13/487,299 13/492,835, 13/562,292, 13/658,828, 13/693,032, 13/792,030, 13/794,814, 13/794,816, 13/862,395 and 13/913,408. The disclosed technology also includes the disclosures of U.S. patent application Ser. No. 14/498,763, titled "METHODS AND SYSTEMS FOR PRICING AND PERFORMING OTHER PROCESSES ASSOCIATED WITH RECYCLING MOBILE PHONES AND OTHER ELECTRONIC DEVICES," filed by the applicant on Sep. 26, 2014; U.S. patent application Ser. No. 14/500,739, titled "MAINTAINING SETS OF CABLE COMPONENTS USED FOR WIRED ANALYSIS, CHARGING, OR OTHER INTERACTION WITH PORTABLE ELECTRONIC DEVICES," filed by the applicant on Sep. 29, 2014; U.S. provisional application No. 62/059,132, titled "APPLICATION FOR DEVICE EVALUATION AND OTHER PROCESSES ASSOCIATED WITH DEVICE RECYCLING," filed by the applicant on Oct. 2, 2014; U.S. patent application Ser. No. 14/506,449, titled "SYSTEM FOR ELECTRICALLY TESTING MOBILE DEVICES AT A CONSUMER-OPERATED KIOSK, AND ASSOCIATED DEVICES AND METHODS," filed by the applicant on Oct. 3, 2014; U.S. provisional application No. 62/073,840, titled "SYSTEMS AND METHODS FOR RECYCLING CONSUMER ELECTRONIC DEVICES," filed by the applicant on Oct. 31, 2014; U.S. provisional application No. 62/073,847, titled "METHODS AND SYSTEMS FOR FACILITATING PROCESSES ASSOCIATED WITH INSURANCE SERVICES AND/OR OTHER SERVICES FOR ELECTRONIC DEVICES," filed by the applicant on Oct. 31, 2014; U.S. provisional application No. 62/076,437, titled "METHODS AND SYSTEMS FOR EVALUATING AND RECYCLING ELECTRONIC DEVICES," filed by the applicant on Nov. 6, 2014; U.S. provisional application No. 62/090,855, titled "METHODS AND SYSTEMS FOR PROVIDING INFORMATION REGARDING COUPONS/PROMOTIONS AT KIOSKS FOR RECYCLING MOBILE PHONES AND OTHER ELECTRONIC DEVICES," filed by the applicant on Dec. 11, 2014; U.S. patent application Ser. No. 14/568,051, titled "METHODS AND SYSTEMS FOR IDENTIFYING MOBILE PHONES AND OTHER ELECTRONIC DEVICES," filed by the applicant on Dec. 11, 2014; U.S. provisional application No. 62/091,426, titled "SYSTEMS AND METHODS FOR RECYCLING CONSUMER ELECTRONIC DEVICES," filed by the applicant on Dec. 12, 2014; U.S. patent application Ser. No. 14/598,469, titled "METHODS AND SYSTEMS FOR DYNAMIC PRICING AND PERFORMING OTHER PROCESSES ASSOCIATED WITH RECYCLING MOBILE PHONES AND OTHER ELECTRONIC DEVICES," filed by the applicant on Jan. 16, 2015; U.S. patent application Ser. No. 14/660,768, titled "SYSTEMS AND METHODS FOR INSPECTING MOBILE DEVICES AND OTHER CONSUMER ELECTRONIC DEVICES WITH A LASER," filed by the applicant on Mar. 17, 2015; U.S. patent application Ser. No. 14/663,331, titled "DEVICE RECYCLING SYSTEMS WITH FACIAL RECOGNITION," filed by the applicant on Mar. 19, 2015; U.S. provisional application No. 62/169,072, titled "METHODS AND SYSTEMS FOR VISUALLY EVALUATING ELECTRONIC DEVICES," filed by the applicant on Jun. 1, 2015; U.S. provisional application No. 62/202,330, titled "METHODS AND SYSTEMS FOR INSPECTING MOBILE DEVICES AND OTHER CONSUMER ELECTRONIC DEVICES WITH ROBOTIC ACTUATION," filed by the applicant on Aug. 7, 2015; and U.S. provisional application No. 62/221,510, titled "METHODS AND SYSTEMS FOR INTERACTIONS WITH A SYSTEM FOR PURCHASING MOBILE PHONES AND OTHER ELECTRONIC DEVICES," filed by the applicant on Sep. 21, 2015. All of the patents and patent applications listed in the preceding sentences are commonly owned by the applicant of the present application, and they along with any other patents or patent applications identified herein are incorporated herein by reference in their entireties.

In the illustrated embodiment, the kiosk 100 is a floor-standing self-service kiosk configured for use by a user 101 (e.g., a consumer, customer, etc.) to recycle, sell, and/or perform other operations with a mobile phone or other consumer electronic device. In other embodiments, the kiosk 100 can be configured for use on a countertop or a similar raised surface. Although the kiosk 100 is configured for use by consumers, in various embodiments the kiosk 100 and/or various portions thereof can also be used by other operators, such as a retail clerk or kiosk assistant to facilitate the selling or other processing of mobile phones and other electronic devices.

In the illustrated embodiment, the kiosk 100 includes a housing 102 that is approximately the size of a conventional vending machine. The housing 102 can be of conventional manufacture from, for example, sheet metal, plastic panels, etc. A plurality of user interface devices are provided on a front portion of the housing 102 for providing instructions and other information to users, and/or for receiving user inputs and other information from users. For example, the kiosk 100 can include a display screen 104 (e.g., a liquid crystal display (LCD) or light emitting diode (LED) display screen, a projected display (such as a heads-up display or a head-mounted device), and so on) for providing information, prompts, etc. to users. The display screen 104 can include a touch screen for receiving user input and responses to displayed prompts. In addition or alternatively, the kiosk 100 can include a separate keyboard or keypad for this purpose. The kiosk 100 can also include an ID reader or scanner 112 (e.g., a driver's license scanner), a fingerprint reader 114, and one or more cameras 116 (e.g., digital still and/or video cameras, identified individually as cameras 116a-c). The kiosk 100 can additionally include output devices such as a label printer having an outlet 110, and a cash dispenser having an outlet 118. Although not identified in FIG. 1, the kiosk 100 can further include a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), a receipt or voucher printer and dispenser, as well as other user input and output devices. The input devices may include a touchpad, a pointing device such as a mouse, a joystick, pen, game pad, motion sensor, scanner, eye direction monitoring system, etc. Additionally the kiosk 100 can also include a bar code reader, QR code reader, bag/package dispenser, a digital signature pad, etc. In the illustrated embodiment, the kiosk 100 additionally includes a header 120 having a display screen 122 for displaying marketing advertisements and/or other video or graphical information to attract users to the kiosk. In addition to the user interface devices described above, the front portion of the housing 102 also includes an access panel or door 106 located directly beneath the display screen 104. As described in greater detail below, the access door is configured to automatically retract so that the user 101 can place an electronic device (e.g., a mobile phone) in an inspection area 108 for automatic inspection by the kiosk 100.

A sidewall portion of the housing 102 can include a number of conveniences to help users recycle or otherwise process their mobile phones. For example, in the illustrated embodiment the kiosk 100 includes an accessory bin 128 that is configured to receive mobile device accessories that the user wishes to recycle or otherwise dispose of. Additionally, the kiosk 100 can provide a free charging station 126 with a plurality of electrical connectors 124 for charging a wide variety of mobile phones and other consumer electronic devices.

Figure 2A:
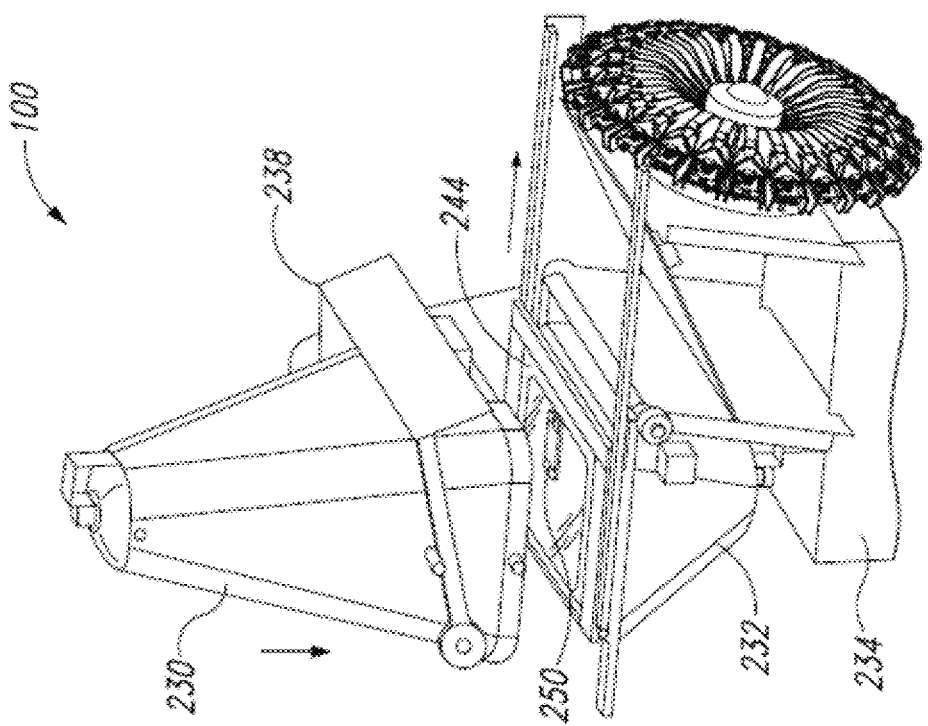
FIGS. 2A-2D are a series of isometric views of the machine of FIG. 1 with a number of exterior panels removed to illustrate operation of the machine in accordance with an embodiment of the present technology.

FIGS. 2A-2D are a series of isometric views of the kiosk 100 with the housing 102 removed to illustrate selected internal components configured in accordance with an embodiment of the present technology. Referring first to FIG. 2A, in the illustrated embodiment the kiosk 100 includes a connector carrier 240 and an inspection plate 244 operably disposed behind the access door 106 (FIG. 1). In the illustrated embodiment, the connector carrier 240 is a rotatable carrousel that is configured to rotate about a generally horizontal axis and carries a plurality of electrical connectors 242 (e.g., approximately 25 connectors) distributed around an outer periphery thereof. In other embodiments, other types of connector carrying devices (including both fixed and movable arrangements) can be used. In some embodiments, the connectors 242 can include a plurality of interchangeable USB connectors configured to provide power and/or exchange data with a variety of different mobile phones and/or other electronic devices. In operation, the carrousel 240 is configured to automatically rotate about its axis to position an appropriate one of the connectors 242 adjacent to an electronic device, such as a mobile phone 250, that has been placed on the inspection plate 244 for recycling. The connector 242 can then be manually and/or automatically withdrawn from the carousel 240 and connected to a port on the mobile phone 250 for electrical analysis. Such analysis can include, e.g., an evaluation of make, model, configuration, condition, etc. using one or more of the methods and/or systems described in detail in the commonly owned patents and patent applications identified herein and incorporated by reference in their entireties.

In the illustrated embodiment, the inspection plate 244 is configured to translate back and forth (on, e.g., parallel mounting tracks) to move an electronic device, such as the mobile phone 250, between a first position directly behind the access door 106 and a second position between an upper chamber 230 and an opposing lower chamber 232. Moreover, in this embodiment the inspection plate 244 is transparent, or at least partially transparent (e.g., formed of glass, Plexiglas, etc.) to enable the mobile phone 250 to be photographed and/or otherwise optically evaluated from all, or at least most viewing angles (e.g., top, bottom, sides, etc.) using, e.g., one or more cameras, mirrors, etc. mounted to or otherwise associated with the upper and lower chambers 230 and 232. When the mobile phone 250 is in the second position, the upper chamber 230 can translate downwardly to generally enclose the mobile phone 250 between the upper chamber 230 and the lower chamber 232. The upper chamber 230 is operably coupled to a gate 238 that moves up and down in unison with the upper chamber 230. As noted above, in the illustrated embodiment the upper chamber 230 and/or the lower chamber 232 can include one or more cameras, magnification tools, scanners (e.g., bar code scanners, infrared scanners, etc.) or other imaging components (not shown) and an arrangement of mirrors (also not shown) to view, photograph and/or otherwise visually evaluate the mobile phone 250 from multiple perspectives. In some embodiments, one or more of the cameras and/or other imaging components discussed above can be movable to facilitate device evaluation. The inspection area 108 can also include weight scales, heat detectors, UV readers/detectors, and the like for further evaluation of electronic devices placed therein. The kiosk 100 can further include an angled binning plate 236 for directing electronic devices from the transparent plate 244 into a collection bin 234 positioned in a lower portion of the kiosk 100.

Figure 2B:
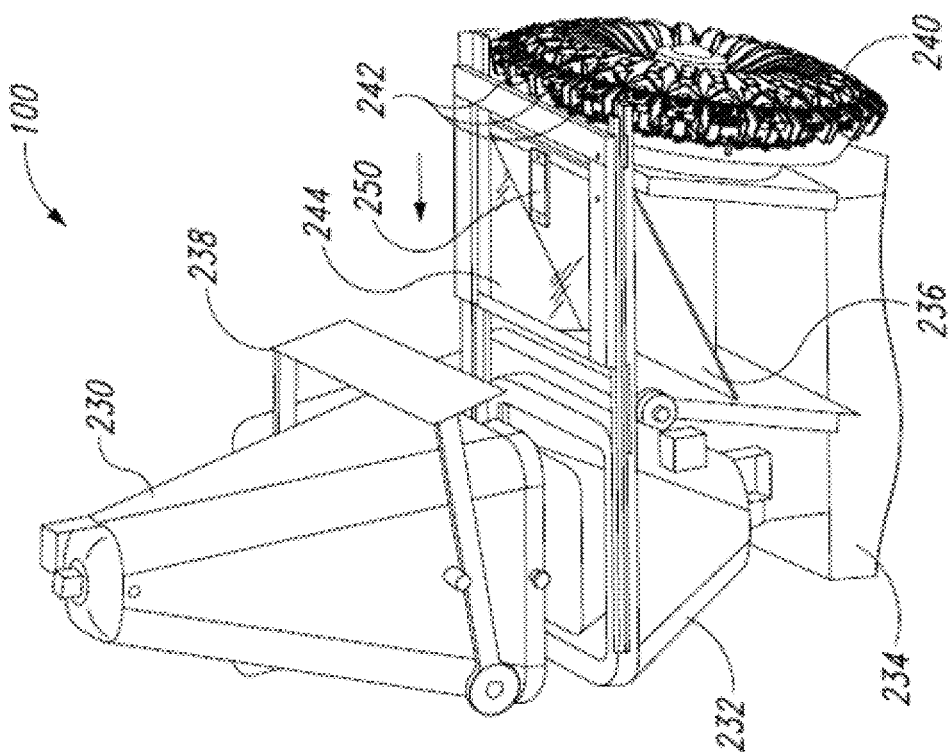
Figure 2D:
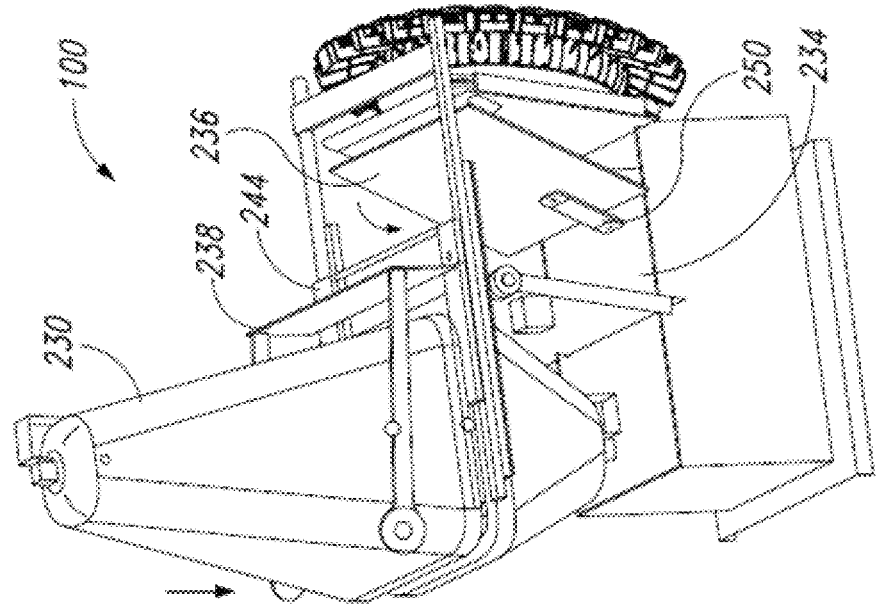

The kiosk 100 can used in a number of different ways to efficiently facilitate the recycling, selling and/or other processing of mobile phones and other consumer electronic devices. Referring to FIGS. 1-2D together, in some embodiments a user wishing to sell a used mobile phone, such as the mobile phone 250, approaches the kiosk 100 and identifies the type of device the user wishes to sell in response to prompts on the display screen 104. Next, the user may be prompted to remove any cases, stickers, or other accessories from the device so that it can be accurately evaluated. Additionally, the kiosk 100 may print and dispense a unique identification label (e.g., a small adhesive-backed sticker with a QR code, barcode, etc.) from the label outlet 110 for the user to adhere to the back of the mobile phone 250. After this is done, the door 106 retracts allowing the user to place the mobile phone 250 onto the transparent plate 244 in the inspection area 108 (FIG. 2A). The door 106 then closes and the transparent plate 244 moves the mobile phone 250 under the upper chamber 230 as shown in FIG. 2B. The upper chamber 230 then moves downwardly to generally enclose the mobile phone 250 between the upper and lower chambers 230 and 232, and the cameras and/or other imaging components in the upper and lower chambers 230 and 232 perform a visual inspection of the mobile phone 250. In some embodiments, the visual inspection can include a 3D visual analysis to confirm the identification of the mobile phone 250 (e.g. make and model) and/or to evaluate or assess the condition and/or function of the mobile phone 250 and/or its various components and systems. For example, the visual analysis can include an inspection of a display screen on the mobile phone 250 for cracks or other damage. In some embodiments, the visual inspection can include performing optical character recognition (OCR) to identify printed or displayed patterns, codes, and/or text, and comparing characteristics of the patterns, codes, and/or text (e.g., layout, size, font, color, etc.) to templates to determine the presence of device identifiers such as a model number, serial number, etc. In some embodiments, the kiosk 100 can perform the visual analysis using one or more of the methods and/or systems described in detail in the commonly owned patents and patent applications identified herein and incorporated by reference in their entireties.

Figure 2C:
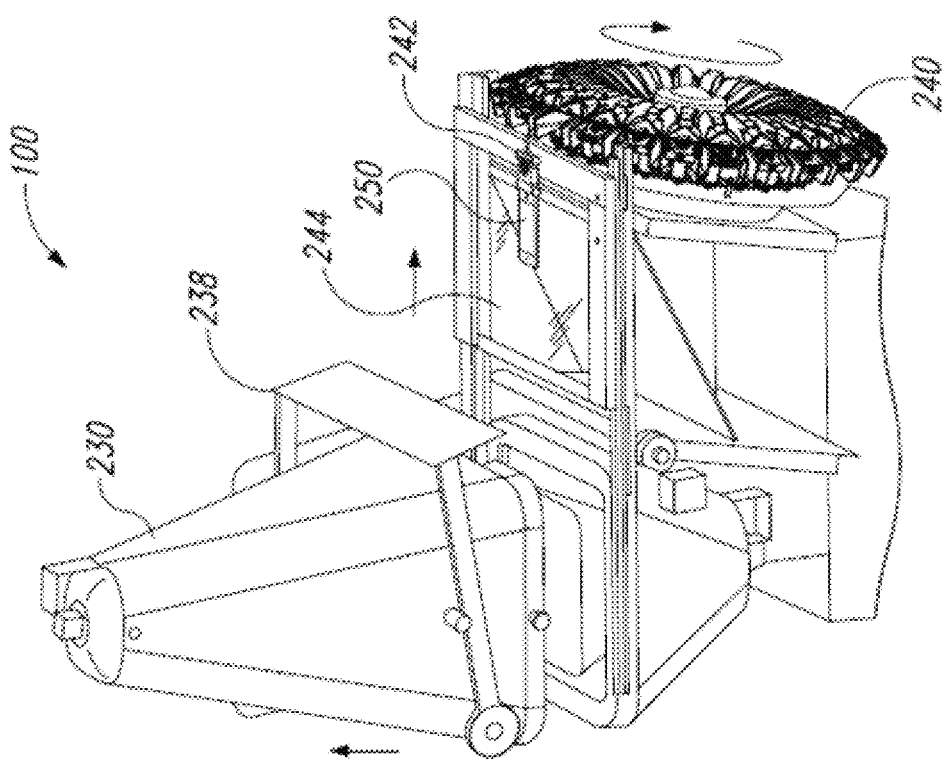

Referring next to FIG. 2C, after the visual analysis is performed and the device has been identified, the upper chamber 230 returns to its upper position and the transparent plate 244 returns the mobile phone 250 to its initial position next to the door 106. The display screen 104 can also provide an estimated price or an estimated range of prices that the kiosk 100 may offer the user for the mobile phone 250 based on the visual analysis and/or based on user input (e.g., input regarding the type, condition, etc. of the mobile phone 250). If the user indicates (via, e.g., input via the touch screen) that he or she wishes to proceed with the transaction, the carrousel 240 automatically rotates an appropriate one of the connectors 242 into position adjacent the transparent plate 244, and door 106 is again opened. The user can then be instructed (via, e.g., the display screen 104) to withdraw the connector 242 (and its associated wire) from the carrousel 240, plug the connector 242 into the corresponding port (e.g., a USB port) on the mobile phone 250, and reposition the mobile phone 250 in the inspection area on the transparent plate 244. After doing so, the door 106 once again closes and the kiosk 100 performs an electrical inspection of the device to further evaluate the condition of the phone as well as specific component and operating parameters such as memory, carrier, etc. In some embodiments, the kiosk 100 can perform the electrical analysis using one or more of the methods and/or systems described in detail in the commonly owned patents and patent applications identified herein and incorporated by reference in their entireties.

In some embodiments, the user can attach the electrical connector to the mobile phone 250 and/or perform an electrical analysis of the device before the kiosk 100 performs a visual analysis of the phone. For example, in such an embodiment the user can approach the kiosk 100 and identify the type of device (e.g., the make and model) he or she wishes to recycle, and/or the appropriate electrical connector for connecting to the device. The kiosk 100 can then use this information to stage the appropriate electrical connector at the inspection area. Alternatively, the kiosk 100 can present the user with a selection of standard electrical connectors from which the user can determine an appropriate electrical connector for connecting to the device. Either way, the door 106 retracts and the user is instructed to withdraw the selected connector 242 from the carrier 240, plug it into the corresponding port (e.g., a USB port) on the mobile phone 250, and position the mobile phone 250 on the transparent plate 244 in the inspection area. The user may also be prompted to remove any cases, stickers, or other accessories from the mobile phone 250, and adhere a unique identification label to the back of the mobile phone 250 as described above. The door 106 then closes and the kiosk 100 can perform an electrical inspection of the mobile phone 250 as described above, and after the electrical inspection, a visual inspection as described above. The electrical inspection can include gathering device identification information and/or other information, which the kiosk 100 can then use to customize further interaction with the user, such as to add or omit user inquiries depending on the type of device the user connects. Thus, in some embodiments, electrical inspection of the mobile phone 250 can occur before the user provides information about the mobile phone 250 to the kiosk 100.

After the visual and electronic analysis of the mobile phone 250, the user may be presented with a phone purchase price via the display screen 104. If the user declines the price (via, e.g., the touch screen), a retraction mechanism (not shown) automatically disconnects the connector 242 from the mobile phone 250, the door 106 opens, and the user can reach in and retrieve the mobile phone 250. If the user accepts the price, the door 106 remains closed and the purchase transaction proceeds. For example, the user may be prompted to place his or her identification (e.g., a driver's license) in the ID scanner 112 and provide a thumbprint via the fingerprint reader 114. As a fraud prevention measure, the kiosk 100 can be configured to transmit an image of the driver's license to a remote computer screen, and an operator at the remote computer can visually compare the picture (and/or other information) on the driver's license to the person standing in front of the kiosk 100 as viewed by one or more of the cameras 116a-c (FIG. 1) to confirm that the person attempting to sell the mobile phone 250 is in fact the person identified by the driver's license. In some embodiments, one or more of the cameras 116a-c can be movable to facilitate viewing of kiosk users, as well as other individuals in the proximity of the kiosk 100. Additionally, the person's fingerprint can be checked against records of known fraud perpetrators. If either of these checks indicate that the person selling the phone presents a fraud risk, the transaction can be declined and the mobile phone 250 returned. After the user's identity has been verified, the transparent plate 244 moves back toward the upper and lower chambers 230 and 232. As shown in FIG. 2D, however, when the upper chamber 230 is in the lower position the gate 238 permits the transparent plate 244 to slide underneath but not electronic devices carried thereon. As a result, the gate 238 knocks the phone 150 off of the transparent plate 244, onto the binning plate 236 and into the bin 234. The kiosk can then provide payment of the purchase price to the user. In some embodiments, payment can be made in the form of cash dispensed from the cash outlet 118. In other embodiments, the user can receive remuneration for the mobile phone 150 in various other useful ways. For example, the user can be paid via a redeemable cash voucher, a coupon, an e-certificate, a prepaid card, a wired or wireless monetary deposit to an electronic account (e.g., a bank account, credit account, loyalty account, online commerce account, mobile wallet, etc.), Bitcoin, etc.

As those of ordinary skill in the art will appreciate, the foregoing routines are but some examples of ways in which the kiosk 100 can be used to recycle or otherwise process consumer electronic devices such as mobile phones. Although the foregoing examples are described in the context of mobile phones, it should be understood that kiosk 100 and various embodiments thereof can also be used in a similar manner for recycling virtually any consumer electronic device, such as MP3 players, tablet computers, PDAs, and other portable devices, as well as other relatively non-portable electronic devices such as desktop computers, printers, devices for playing games, entertainment or other digital media on CDs, DVDs, Blu-ray, etc. Moreover, although the foregoing examples are described in the context of use by a consumer, the kiosk 100 in various embodiments thereof can similarly be used by others, such as store clerk, to assist consumers in recycling, selling, exchanging, etc. their electronic devices.

Figure 3:
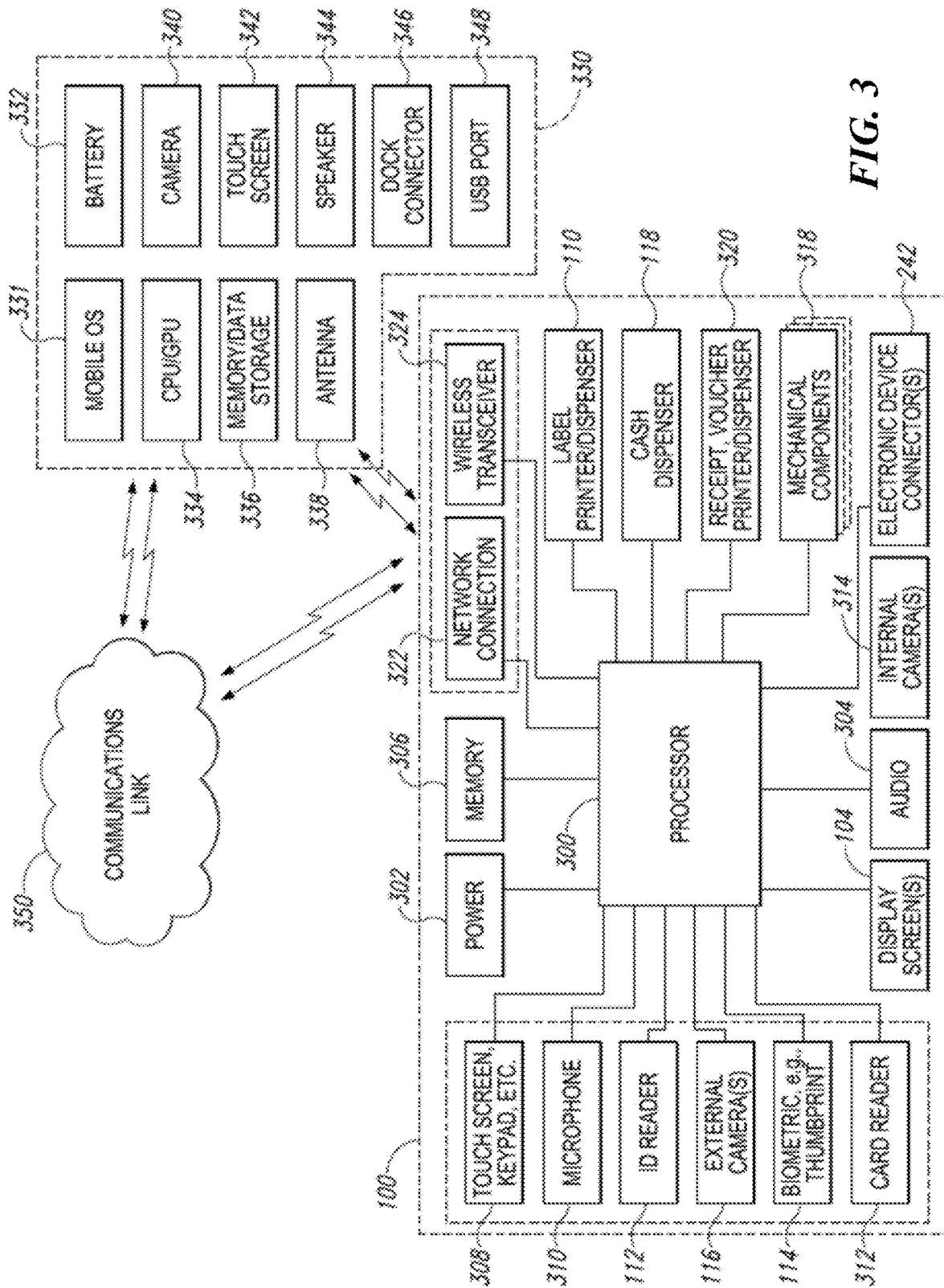
FIG. 3 is a schematic diagram illustrating various components associated with the machine of FIG. 1.

FIG. 3 provides a schematic representation of an architecture of the kiosk 100 in accordance with an embodiment of the present technology. In the illustrated embodiment, the kiosk 100 includes a suitable processor or central processing unit (CPU) 300 that controls operation of the kiosk 100 in accordance with computer-readable instructions stored on system memory 306. The CPU 300 may be any logic processing unit, such as one or more CPUs, digital signal processors (DSPs), application-specific integrated circuits (ASICs), etc. The CPU 300 may be a single processing unit or multiple processing units in a device or distributed across multiple devices. The CPU 300 is connected to the memory 306 and may be coupled to other hardware devices, for example, with the use of a bus (e.g., a PCI Express or Serial ATA bus). The CPU 300 can include, by way of example, a standard personal computer (PC) (e.g., a DELL OPTIPLEX 7010 PC) or other type of embedded computer running any suitable operating system, such as Windows, Linux, Android, iOS, or an embedded real-time operating system. In some embodiments, the CPU 300 can be a small form factor PC with integrated hard disk drive (HDD) or solid-state drive (SSD) and universal serial bus (USB) or other ports to communicate with the other components of the kiosk 100. In other embodiments, the CPU 300 can include a microprocessor with a standalone motherboard that interfaces with a separate HDD. The memory 306 can include read-only memory (ROM) and random access memory (RAM) or other storage devices, such as disk drives or SSDs, that store the executable applications, test software, databases and other software required to, for example, control kiosk components, process electronic device information and data (to, e.g., evaluate device make, model, condition, pricing, etc.), communicate and exchange data and information with remote computers and other devices, etc.

The CPU 300 can provide information and instructions to kiosk users via the display screen 104 and/or an audio system (e.g., a speaker) 304. The CPU 300 can also receive user inputs via, e.g., a touch screen 308 associated with the display screen 104, a keypad with physical keys, and/or a microphone 310. Additionally, the CPU 300 can receive personal identification and/or biometric information associated with users via the ID reader 112, one or more of the external cameras 116, and/or the fingerprint reader 114. In some embodiments, the CPU 300 can also receive information (such as user identification and/or account information) via a card reader 312 (e.g., a debit, credit, or loyalty card reader having, e.g., a suitable magnetic stripe reader, optical reader, etc.). The CPU 300 can also control operation of the label dispenser 110 and systems for providing remuneration to users, such as the cash dispenser 118 and/or a receipt or voucher printer and an associated dispenser 320.

As noted above, the kiosk 100 additionally includes a number of electronic, optical and electromechanical devices for electrically, visually and/or physically analyzing electronic devices placed therein for recycling. Such systems can include one more internal cameras 314 for visually inspecting electronic devices for, e.g., determining external dimensions and condition, and one or more of the electrical connectors 242 (e.g., USB connectors) for, e.g., powering up electronic devices and performing electronic analyses. As noted above, the cameras 314 can be operably coupled to the upper and lower chambers 230 and 232, and the connectors 242 can be movably and interchangeably carried by the carrousel 240 (FIGS. 2A-2D). The kiosk 100 further includes a plurality of mechanical components that are electronically actuated for carrying out the various functions of the kiosk 100 during operation. The mechanical components 318 can include, for example, the inspection area access door 106 and one or more of the movable components (e.g. the inspection plate 244, the upper and lower chambers 230 and 232, etc.) operably disposed within the inspection area 108 (FIG. 1). The kiosk 100 further includes power 302, which can include battery power and/or facility power for operation of the various electrical components associated with kiosk operation.

In the illustrated embodiment, the kiosk 100 further includes a network connection 322 (e.g., a wired connection, such as an Ethernet port, cable modem, FireWire cable, Lightning connector, USB port, etc.) suitable for communication with, e.g., all manner of remote processing devices via a communication link 350, and a wireless transceiver 324 (e.g., including a Wi-Fi access point, Bluetooth transceiver, near-field communication (NFC) device, and/or a wireless modem or cellular radio utilizing GSM, CDMA, 3G, and/or 4G technologies, each of which may include an associated antenna or antennas) for data communications suitable for communication with, e.g., all manner of remote processing devices via the communication link 350 and/or directly via, e.g., a wireless peer-to-peer connection. For example, the wireless transceiver 324 can facilitate wireless communication with handheld devices, such as a mobile device 330 (e.g., a smartphone) either in the proximity of the kiosk 100 or remote therefrom. By way of example only, in the illustrated embodiment the mobile device 330 can include one or more features, applications and/or other elements commonly found in smartphones and other known mobile devices. For example, the mobile device 330 can include a CPU and/or a graphics processing unit (GPU) 334 for executing computer readable instructions stored on memory 336. In addition, the mobile device 330 can include an internal power source or battery 332, a dock connector 346, a USB port 348, a camera 340, and/or well-known input devices, including, for example, a touch screen 342, a keypad, etc. In many embodiments, the mobile device 330 can also include a speaker 344 for two-way communication and audio playback. In addition to the foregoing features, the mobile device 330 can include a mobile operating system (OS) 331 and/or a device wireless transceiver that may include one or more antennas 338 for wirelessly communicating with, for example, other mobile devices, websites, and the kiosk 100. Such communication can be performed via, e.g., the communication link 350 (which can include the Internet, a public or private intranet, a local or extended Wi-Fi network, cell towers, the plain old telephone system (POTS), etc.), direct wireless communication, etc.

Unless described otherwise, the construction and operation of the various components shown in FIG. 3 are of conventional design. As a result, such components need not be described in further detail herein, as they will be readily understood by those skilled in the relevant art. In other embodiments, the kiosk 100 and/or the mobile device 330 can include other features that may be different from those described above. In still further embodiments, the kiosk 100 and/or the mobile device 330 can include more or fewer features similar to those described above.

Figure 4:
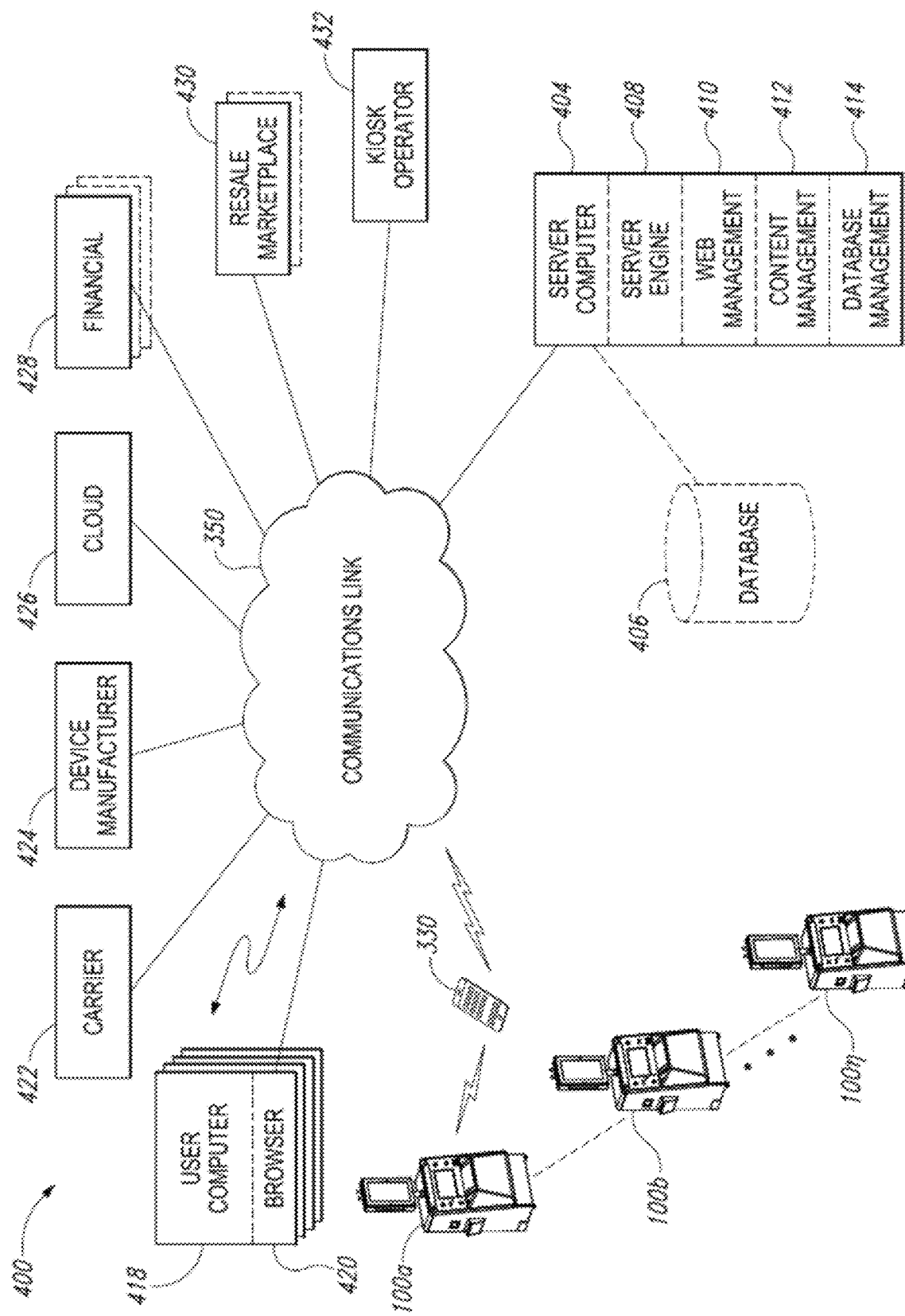
FIG. 4 is a schematic diagram of a suitable distributed computing environment for implementing various aspects of the present technology.

FIG. 4 is a schematic diagram of a suitable network environment for implementing various aspects of an electronic device recycling system 400 configured in accordance with embodiments of the present technology. In the illustrated embodiment, a plurality of the kiosks 100 (identified individually as kiosks 100a-100n) can exchange information with one or more remote computers (e.g., one or more server computers 404) via the communication link 350. Although the communication link 350 can include a publically available network (e.g., the Internet with a web interface), a private communication link, such as an intranet or other network can also be used. Moreover, in various embodiments the individual kiosk 100 can be connected to a host computer (not shown) that facilitates the exchange of information between the kiosks 100 and remote computers, other kiosks, mobile devices, etc.

The server computer 404 can perform many or all of the functions for receiving, routing and storing of electronic messages, such as webpages, audio signals and electronic images necessary to implement the various electronic transactions described herein. For example, the server computer 404 can retrieve and exchange web pages and other content with an associated database or databases 406. In some embodiments, the database 406 can include information related to mobile phones and/or other consumer electronic devices. Such information can include, for example, make, model, serial number, International Mobile Equipment Identity (IMEI) number, carrier plan information, pricing information, owner information, etc. In various embodiments the server computer 404 can also include a server engine 408, a web page management component 410, a content management component 412, and a database management component 414. The server engine 408 can perform the basic processing and operating system level tasks associated with the various technologies described herein. The webpage management component 410 can handle creation and/or display and/or routing of web or other display pages. The content management component 412 can handle many of the functions associated with the routines described herein. The database management component 414 can perform various storage, retrieval and query tasks associated with the database 406, and can store various information and data such as animation, graphics, visual and audio signals, etc.

In the illustrated embodiment, the kiosks 100 can also be operably connected to a plurality of other remote devices and systems via the communication link 350. For example, the kiosks 100 can be operably connected to a plurality of user devices 418 (e.g., personal computers, laptops, handheld devices, etc.) having associated browsers 420. Similarly, as described above the kiosks 100 can each include wireless communication facilities for exchanging digital information with mobile devices, such as the mobile device 330. The kiosks 100 and/or the server computer 404 are also operably connectable to a series of remote computers for obtaining data and/or exchanging information with necessary service providers, financial institutions, device manufactures, authorities, government agencies, etc. For example, the kiosks 100 and the server computer 404 can be operably connected to one or more cell carriers 422, one or more device manufacturers 424 (e.g., mobile phone manufacturers), one or more electronic payment or financial institutions 428, one or more databases (e.g., the GSMA IMEI Database, etc.), and one or more computers and/or other remotely located or shared resources associated with cloud computing 426. The financial institutions 428 can include all manner of entity associated with conducting financial transactions, including banks, credit/debit card facilities, online commerce facilities, online payment systems, virtual cash systems, money transfer systems, etc.

In addition to the foregoing, the kiosks 100 and the server computer 404 can also be operably connected to a resale marketplace 430 and a kiosk operator 432. The resale marketplace 430 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices. The kiosk operator 432 can be a central computer or system of computers for controlling all manner of operation of the network of kiosks 100. Such operations can include, for example, remote monitoring and facilitating of kiosk maintenance (e.g., remote testing of kiosk functionality, downloading operational software and updates, etc.), servicing (e.g., periodic replenishing of cash and other consumables), performance, etc. In addition, the kiosk operator 432 can further include one or more display screens operably connected to cameras located at each of the kiosks 100 (e.g., one or more of the cameras 116 described above with reference to FIG. 1). This remote viewing capability enables operator personnel to verify user identification and/or make other visual observations at the kiosks 100 in real-time during transactions, as described above with reference to FIG. 1.

The foregoing description of the electronic device recycling system 400 illustrates but one possible network system suitable for implementing the various technologies described herein. Accordingly, those of ordinary skill in the art with appreciate that other systems consistent with the present technology can omit one or more of the facilities described in reference to FIG. 4, or can include one or more additional facilities not described in detail in FIG. 4.

The kiosks 100, mobile devices 330, server computers 404, user computers or devices 418, etc. can include one or more central processing units or other logic-processing circuitry, memory, input devices (e.g., keyboards and pointing devices), output devices (e.g., display devices and printers), and storage devices (e.g., magnetic, solid state, fixed and floppy disk drives, optical disk drives, etc.). Such computers can include other program modules such as an operating system, one or more application programs (e.g., word processing or spreadsheet applications), and the like. The computers can include wireless computers, such as mobile phones, personal digital assistants (PDA's), palmtop computers, etc., which communicate with the Internet via a wireless link. The computers may be general-purpose devices that can be programmed to run various types of applications, or they may be single-purpose devices optimized or limited to a particular function or class of functions. Aspects of the invention may be practiced in a variety of other computing environments.

While the Internet is shown, a private network, such as an intranet can likewise be used herein. The network can have a client-server architecture, in which a computer is dedicated to serving other client computers, or it can have other architectures such as peer-to-peer, in which one or more computers serve simultaneously as servers and clients. A database or databases, coupled to the server computer(s), stores much of the web pages and content exchanged between the user computers. The server computer(s), including the database(s), can employ security measures to inhibit malicious attacks on the system, and to preserve integrity of the messages and data stored therein (e.g., firewall systems, message encryption and/or authentication (e.g., using transport layer security (TLS) or secure sockets layer (SSL)), password protection schemes, encryption of stored data (e.g., using trusted computing hardware), and the like).

One skilled in the relevant art will appreciate that the concepts of the invention can be used in various environments other than location based or the Internet. In general, a display description can be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, can be used instead of the Internet. The system can be conducted within a single computer environment, rather than a client/server environment. Also, the user computers can comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. The data storage devices can include any type of computer-readable media that can store data accessible by a computer, such as magnetic hard and floppy disk drives, optical disk drives, magnetic cassettes, tape drives, flash memory cards, DVDs, Bernoulli cartridges, RAM, ROMs, smart cards, etc. Indeed, any medium for storing or transmitting computer-readable instructions and data may be employed, including a connection port to a network such as a LAN, WAN, or the Internet. Alternatively, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). The terms "memory" and "computer-readable storage medium" include any combination of temporary, persistent, and/or permanent storage, e.g., ROM, writable memory such as RAM, writable non-volatile memory such as flash memory, hard drives, solid state drives, removable media, and so forth, but do not include a propagating signal per se.

Figure 5:
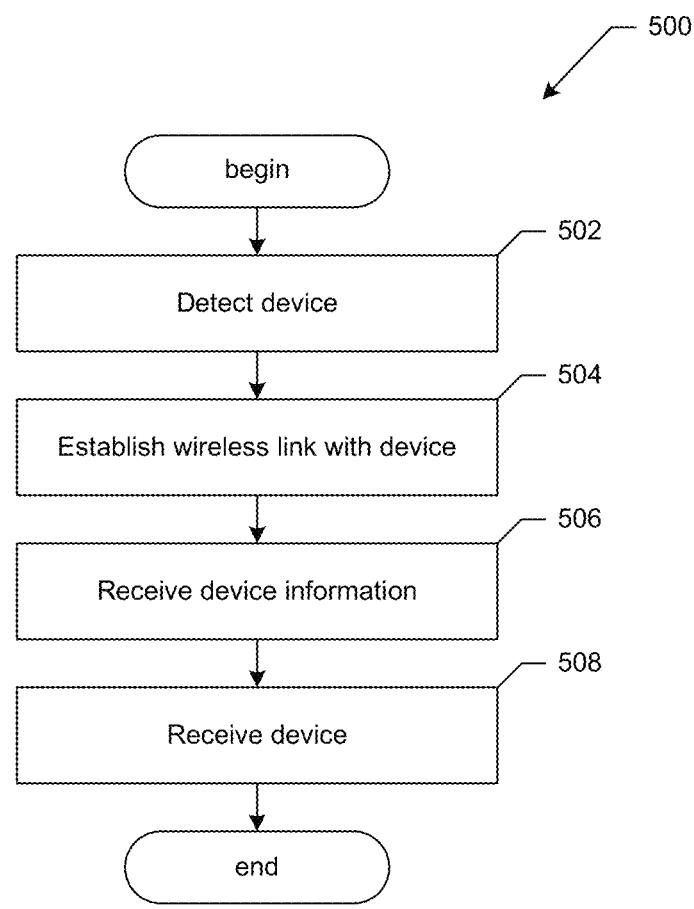
FIG. 5 is a flow diagram of a routine for wirelessly receiving information from an electronic device (e.g., a mobile phone) in accordance with embodiments of the present technology.

FIG. 5 is a flow diagram of a routine 500 for wirelessly receiving information from an electronic device (e.g., a mobile phone) in accordance with embodiments of the present technology. FIG. 5 and the flow diagrams that follow are representative and may not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented. Those skilled in the art will appreciate that the blocks shown in FIG. 5 and in each of the flow diagrams discussed below may be altered in a variety of ways. For example, while processes or blocks are presented in a given order, alternative implementations may perform routines in a different order, and some processes or blocks may be rearranged, deleted, moved, added, subdivided, combined, and/or modified to provide alternative or sub-combinations. Each of these processes or blocks may be implemented in a variety of different ways. Also, although processes or blocks are at times shown as being performed in series, these processes or blocks may instead be performed or implemented in parallel, or may be performed at different times. Some of the blocks depicted in FIG. 5 and the other flow diagrams are of a type well known in the art, and can themselves include a sequence of operations that need not be described herein. Those of ordinary skill in the art can create source code, microcode, program logic arrays or otherwise implement the invention based on the flow diagrams and the detailed description provided herein.

Those of ordinary skill in the art will appreciate that the routine 500 and other functions and methods described herein can be implemented as an application specific integrated circuit (ASIC), by a digital signal processing (DSP) integrated circuit, through conventional programmed logic arrays and/or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

In various embodiments, all or a portion of the routine 500 and the routines in the other flow diagrams herein can be implemented by means of a consumer operating one or more of the devices and systems described above. For example, the kiosk 100 can perform the processes or blocks of the routine 500 and other routines disclosed herein. In some embodiments of the present technology, portions (e.g., blocks) of a routine can be performed by a plurality of the kiosks 100*a*-100*n* of FIG. 4, and/or by one or more remote computers. For example, such remote computers can include one or more of the server computers 404 of FIG. 4 and/or computing resources associated with the cloud 426, the resale marketplace 430, and/or the kiosk operator 432 operating separately or in combination. The kiosk 100 and/or the remote computers can perform the routines described herein using one or more local and/or remote databases (e.g., the database 406 of FIG. 4, such as the GSMA IMEI Database). Accordingly, the description of the routine 500 and the other routines disclosed herein may refer interchangeably to the routine performing an operation and/or the kiosk performing the operation, with the understanding that any of the above devices, systems, and resources can perform all or part of the operation.

In block 502, the routine 500 begins when a consumer-operated kiosk (e.g., the kiosk 100 of FIG. 1) detects a device (e.g., the device 330 of FIG. 3, such as a mobile phone) that the user 101 has brought to the kiosk 100. In some embodiments, detecting the device 330 can include detecting wireless signals emitted by the device 330 in the vicinity of the kiosk 100, as discussed in greater detail below with reference to FIGS. 20 and 22. In other embodiments, detecting the device 330 can include receiving user input indicating the presence of the device 330 at the kiosk 100. Examples of such user input include, for example, a gesture or finger press on the kiosk's touchscreen 308 indicating that the user has brought the wireless device 330 to the kiosk 100, a button press, or a user's verbal indication received by the kiosk microphone 310. In other embodiments, detecting the device 330 can include using other sensors (e.g., a camera such as the external cameras 116 or the internal cameras 314, a scale such as the weight scale in the inspection area 108, etc.) to detect or identify the device 330.

In block 504, the kiosk 100 establishes a wireless link with the device 330. For example, the kiosk 100 can provide a wireless network or peer-to-peer connection for communication with the device 330. In various embodiments, the wireless link includes a radio link (e.g., Wi-Fi, Bluetooth, or NFC), an optical link (e.g., IrDA, laser, or screen-based), and/or an audio link (e.g., high-frequency or ultrasound) for data transfer. In some embodiments, establishing the wireless link can include providing instructions to the user via, for example, textual and/or graphical instructions or video guidance shown on the display screen 104 of the kiosk 100 or on the screen 342 of the device 330, steps listed on a sign affixed to the kiosk housing 102, and/or audio instructions played through the kiosk speaker 304 or the device speaker 344. The instructions can include, for example, a code or other identifier to facilitate linking of the device 330 with the kiosk 100. Establishing the wireless link can also include receiving user input or confirmation at the kiosk 100 or at the device 330. For example, to pair a Bluetooth-enabled device 330 with a kiosk Bluetooth connection, the kiosk 100 can direct the user to perform one or more steps such as activating the device's Bluetooth radio, making the device discoverable, selecting the kiosk 100 (with the user interface of the device 330) or selecting the device 330 (with the user interface of the kiosk 100), initiating a pairing process, entering a confirmation passcode on the device 330 and/or at the kiosk 100, and/or confirming that the connection should be allowed. As another example, the kiosk 100 can provide a Wi-Fi network. Allowing the device 330 to join the Wi-Fi network can include directing the user to activate a Wi-Fi radio on the device 330, select a designated network, input a particular password, agree to presented login terms, etc. Establishing the wireless link can also include requiring other user actions, such as swiping an NFC-enabled device against or in close proximity to a kiosk NFC sensor (e.g., within a few inches), or aligning the device's optical transceiver with an optical transceiver of the kiosk 100 (e.g., by pointing a laser or an infrared LED or sensor at a designated optical window or device on the kiosk 100, or aiming or placing the device's screen 342 against a window or in front of a camera such as the camera 116 on the kiosk 100).

In block 506, the routine 500 receives information from the device 330 via the wireless link, such as information necessary to identify and/or evaluate the device 330. Such information can include, for example, a unique IMEI number (or MEID or equivalent number) of a mobile phone; a manufacturer name or ID code; a model number; a serial number; a unique hardware address or any other identifying code or information. Identifying the device 330 based on the information can include determining the make, model, submodel, storage capacity, color, carrier, and/or radio bands of the device 330, and so on. In various embodiments, the kiosk 100 processes the information to determine whether the device 330 is acceptable for processing (e.g., for purchase and/or recycling). If so, the kiosk 100 can offer the user a price for the device 330; if the user accepts the offer and completes the transaction, then the routine 500 receives the device 330 in block 508 (e.g., in the collection bin 234 of FIGS. 2A-2D). After receiving the device 330, the routine 500 ends.

Figure 6:
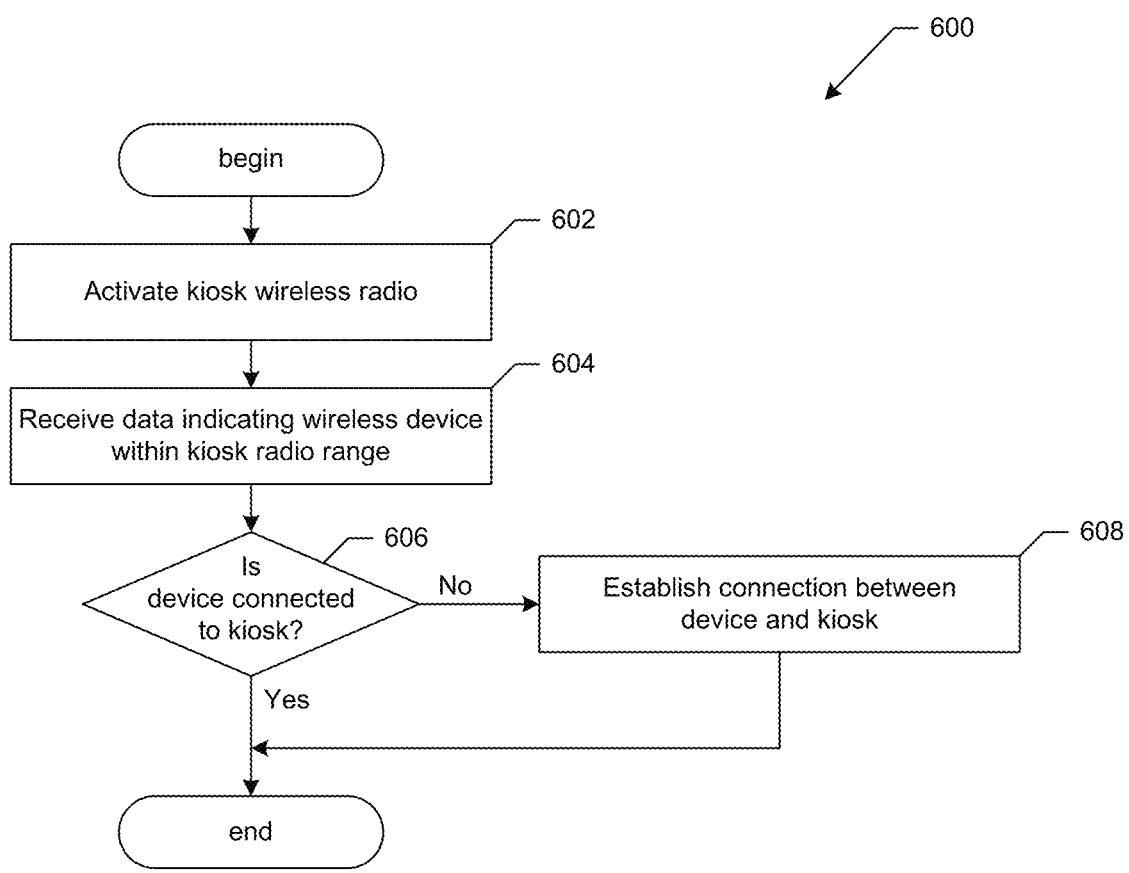
FIG. 6 is a flow diagram of a routine for wirelessly connecting a kiosk to a device in accordance with embodiments of the present technology.

FIG. 6 is a flow diagram of a routine 600 for wirelessly connecting the kiosk 100 to the device 330 in accordance with embodiments of the present technology. In the illustrated routine 600, the kiosk 100 provides a radio link, although other types of wireless connections are contemplated as described above with reference to block 504 of FIG. 5. In block 602, the kiosk 100 activates a wireless radio transceiver such as the transceiver 324 of FIG. 3. For example, in some embodiments, the kiosk 100 turns on a Wi-Fi infrastructure mode access point or ad hoc network node. In some embodiments, activating a wireless radio can include making the transceiver's connection available or visible to devices 330 within range of the kiosk's wireless signal, whether or not the transceiver 324 was already powered (e.g., making the kiosk's Bluetooth device discoverable, or broadcasting the kiosk Wi-Fi base station's service set identifier (SSID) to make it more easily detectable by other devices).

In some embodiments, the range of the activated wireless radio can be configured by adjusting the power provided to the kiosk transceiver 324, the type, location, directionality, and/or gain of the antenna or antennas used, the wireless radio frequency band, the type of wireless connection provided, and/or the kiosk's location (taking into account environmental influences such as interference from other wireless devices, obstacles around the kiosk 100, and/or whether the kiosk 100 is located indoors or outdoors), among other factors. For example, an IEEE 802.11 a/b/g/n/ac Wi-Fi transmitter using a 5 or 9 dBi gain omnidirectional or directional antenna or antenna array (e.g., multiple-input and multiple-output ("MIMO") antennas), broadcasting with 500 mW or 750 mW transmit power in a low-interference channel in the 2.4 or 5 GHz band, may achieve an outdoor range of up to 100-250 meters. On the other hand, a class 2 IEEE 802.15.1 Bluetooth transmitter with a 2.5 mW (or 4 dBm) maximum output power in the 2.4 GHz band may have a maximum range of 10 meters. The effective range of the kiosk's wireless connection may depend on the transmitting power and/or the receiving sensitivity of the kiosk wireless transceiver 324, as well as on the transmitting power and/or receiving sensitivity of each device wireless transceiver.

In block 604, the kiosk 100 receives data indicating that a wireless device such as the wireless device 330 is within communication range of the kiosk's radio. For example, the kiosk wireless transceiver 324 can detect the wireless device's radio signals, such as signals corresponding to a request to wirelessly connect to the kiosk 100. In some embodiments, the signals include an indication provided by a user that the wireless device 330 is present. In some embodiments, the kiosk detects signals indicating that the wireless device 330 is in the vicinity of the kiosk 100, as described below with reference to FIG. 20. In decision block 606, the routine 600 checks whether the device 330 is connected to the kiosk 100. If the wireless device 330 is not connected to the kiosk 100, then in block 608, the kiosk 100 establishes a connection with the device 330. In some embodiments, establishing the connection can include providing instructions and/or authentication information for the user to enter on the device 330 and/or on the kiosk 100. For example, the routine 600 can direct the user to make the user's Bluetooth device 330 discoverable, and/or can provide a Bluetooth pairing code that the user can type on the keyboard or screen 342 of the device 330 or on the touchscreen 308 of the kiosk 100. As another example, the routine 600 can provide a Wi-Fi network name and/or password that when selected and/or entered on the user's device 330 enables the user to wirelessly connect the user's device 330 to the indicated Wi-Fi network. In other embodiments, establishing the connection can include providing a visual code or image (e.g., a QR code) for the user to scan using the device 330, such that scanning the code or image prompts the device 330 to connect to the kiosk's wireless network (e.g., upon user confirmation). In some embodiments, establishing the connection can include allowing a particular wireless device to join or use the wireless network or make a wireless connection. For example, when the kiosk 100 detects the device 330 and determines that the device 330 is registered for access to the kiosk 100 or otherwise recognized, the kiosk 100 connects to the device 330 without requiring further user authentication. After the device 330 and the kiosk 100 are connected, the routine 600 ends.

Figure 7:
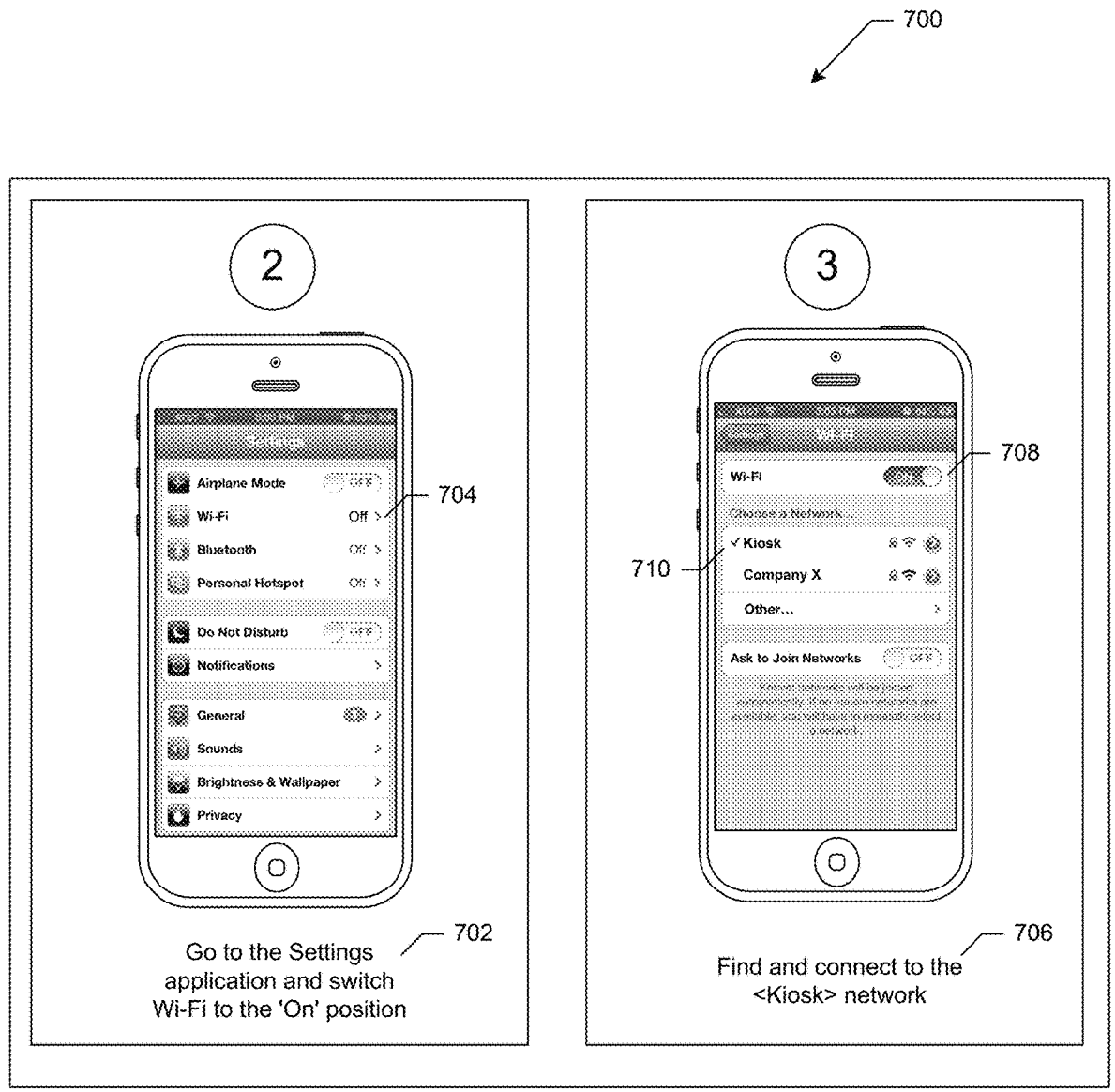
FIG. 7 is a display diagram illustrating a screen display or graphical user interface (GUI) that graphically and textually provides instructions for wirelessly connecting a device to a kiosk in accordance with embodiments of the present technology.

FIG. 7 is a display diagram 700 illustrating a screen display or graphical user interface (GUI) that graphically and textually provides instructions for wirelessly connecting the device 330 to the kiosk 100 in accordance with embodiments of the present technology. In some embodiments, the kiosk 100 displays the illustrated textual instructions and accompanying graphical diagrams on the display screen 104. The kiosk 100 can display instructions including animated graphics or text, photographs, and/or video guidance. In some embodiments, the kiosk 100 updates the instructions as the user follows the instructions, for example, when the kiosk 100 detects that an instruction has been followed. For example, after the kiosk 100 displays an instruction directing the user to activate a wireless radio feature of the user's device 330 (e.g., a Wi-Fi or Bluetooth radio), the kiosk 100 may detect the presence of the activated radio as described below with reference to FIG. 20. After detecting that the user has activated the device 330 as instructed, the kiosk 100 can display a next instruction until the user has completed each of the instructions in a set of instructions. The illustrated example instructions 702 guide the user to activate the device's Wi-Fi transceiver, such as by accessing a device settings control panel or application and turning the Wi-Fi feature to an ON position. For example, the illustrated graphical diagram above the instructions 702 highlights a control 704 (e.g., a button or a slider switch), showing the control 704 in an OFF state that the user can match to the screen 342 of his or her own device 330, or animating the control 704 to show the user how to turn on the device's Wi-Fi (e.g., by pressing a button or swiping a slider switch). The following instructions 706 guide the user to connect to a specified network (e.g., a network named "Kiosk"). For example, the instructions can include an illustration of a control 708 in an ON position showing an activated Wi-Fi feature, and an indication 710 of what the user will see on the device's screen 342 once the device 330 has successfully connected to the "Kiosk" network. In the illustrated embodiment, the instructions correspond to options shown on an Apple® iOS® device. In some embodiments, the kiosk 100 is configured to detect or receive information specifying a device type (e.g., the manufacturer, model, and/or operating system 331 of the device 330) and to display instructions corresponding to options available on that device type.

The display diagrams in the present disclosure, including display diagram 700, illustrate representative computer display screens or web pages that can be implemented in various ways, such as in C++ or as web pages in XML (Extensible Markup Language), HTML (HyperText Markup Language), the Wireless Access Protocol (WAP), LaTeX or PDF documents, or any other scripts or methods of creating displayable data, such as text, images, animations, video and audio, etc. The screens or web pages provide facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users are shown and described with respect to certain Figures, those skilled in the relevant art will recognize that various other alternatives may be employed. The terms "screen," "web page" and "page" are generally used interchangeably herein.

When implemented as web pages, for example, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database typically connected to a server. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), matrix or bit-mapped formats, animated or video formats, etc. While aspects of the invention are described herein using a networked environment, some or all features can be implemented within a single-computer environment.

Figure 8:
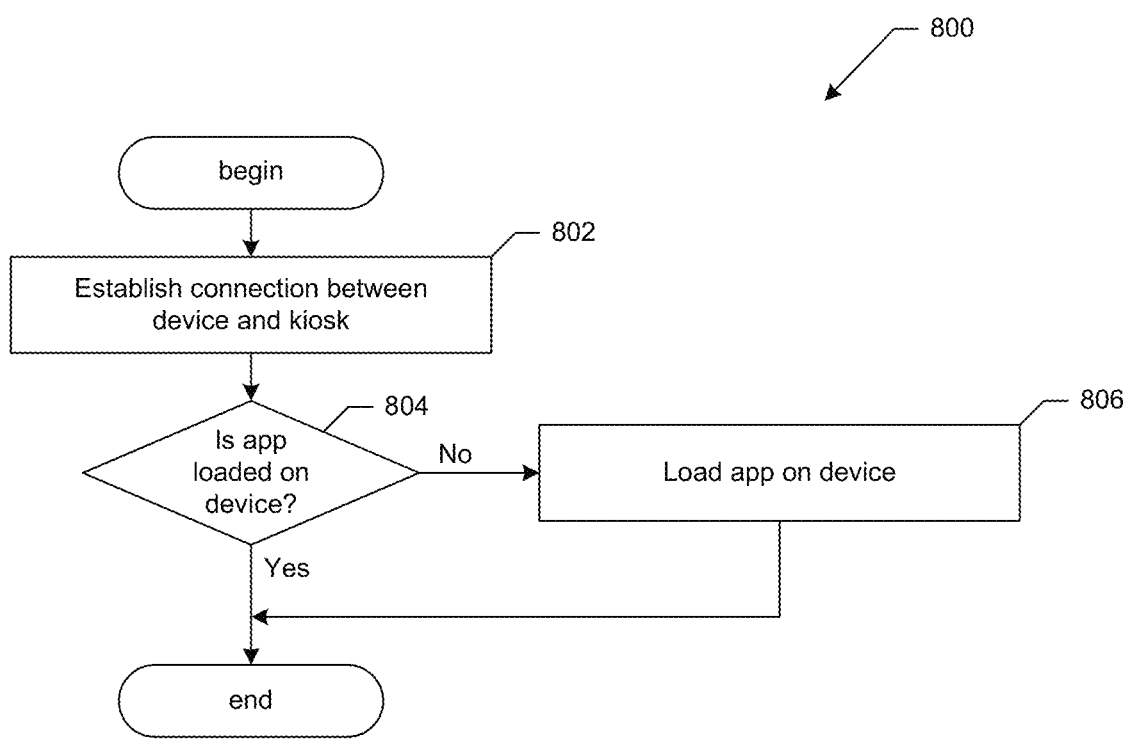
FIG. 8 is a flow diagram of a routine for loading software on a device such as a mobile phone in accordance with embodiments of the present technology.

FIG. 8 is a flow diagram of a routine 800 for loading software on a device, such as a mobile phone, in accordance with embodiments of the present technology. In various embodiments, the present technology operates in conjunction with software associated with a device (e.g., the device 330). For example, the user can download an app from the kiosk 100 or the kiosk operator 432 to the device 330 (e.g., a mobile phone, tablet, or other computing device) to obtain a valuation of the device 330 and/or to obtain remuneration and/or other benefits offered for bringing the device 330 to the kiosk 100 with the app installed. Once installed, the app can, for example, obtain information about the device 330, transmit the information about the device to a server computer 404 or database 406, and use the information to make the user an offer to purchase the device 330 at a kiosk 100. In addition, the app can interact with the kiosk 100 to help the kiosk 100 identify, recognize, and/or evaluate the device 330 more quickly. For example, the app can obtain information from or about the device and transmit that information to the kiosk 100, and/or identify a known or already evaluated device to the kiosk 100 (including an evaluation performed by the app and/or an evaluation performed by a kiosk 100). In block 802, the routine 800 establishes a connection between the device 330 and the kiosk 100. In some embodiments, for example, the connection can be established as described above with reference to block 608 of FIG. 6. In decision block 804, the routine 800 checks whether a designated software app is loaded on the device. For example, the kiosk 100 can ask the user whether the app is installed, direct the user to activate the app if it is installed, and/or request user confirmation of activation of the app. The kiosk 100 can instruct the user to scan a code (e.g., a QR code, a barcode, etc.) displayed by the display screen 104 that causes the device 330 to invoke the app if present on the device. In some embodiments, an app can include software or other logic not directly installed on the device, such as scripts, services, permissions, and/or interfaces that allow interaction between the device owner, the device, a kiosk 100, and/or one or more remote computing facilities (e.g., the server computer 404). In some embodiments, checking whether an app is loaded on the device can include querying the device (for example, obtaining a list of apps on the device, or sending a notification or other data to be handled by a targeted app if present), and/or querying a local or remote database (e.g., database 406) that includes a list of devices upon which the app has been installed. If a specified app is not loaded on the device, then in block 806, the routine 800 loads the app on the device, as described below with reference to FIG. 9. Conversely, if the app is loaded on the device, the routine 800 ends.

Figure 9:
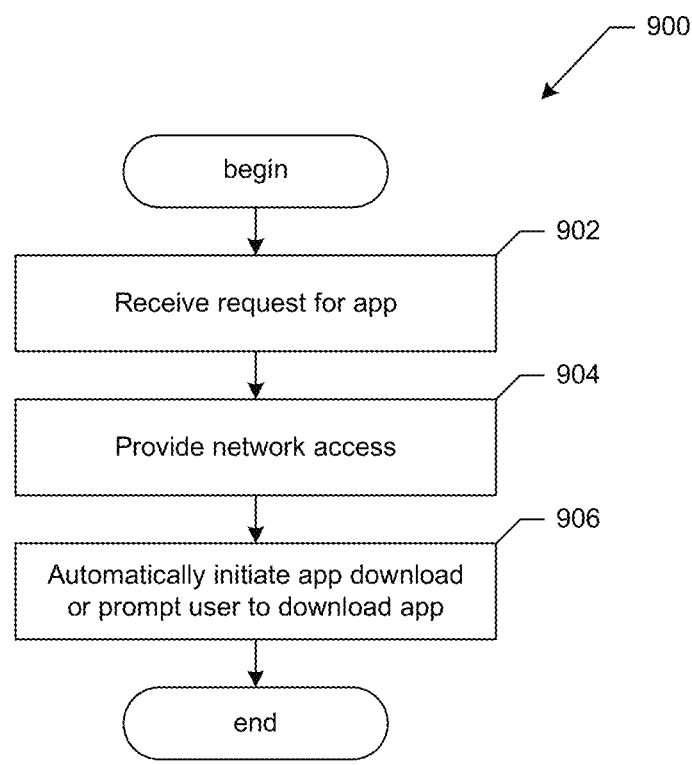
FIG. 9 is a flow diagram of a routine for initiating a software download in accordance with embodiments of the present technology.

FIG. 9 is a flow diagram of a routine 900 for initiating a software download in accordance with embodiments of the present technology. In block 902, the routine 900 receives a request for a specified app to be loaded to a device, for example, a device for recycling such as the device 330. For example, the kiosk display screen 104 can display an option to initiate an app download and enable the user to select the option by, for example, touching a virtual button on the touch screen 308 or a physical button on the kiosk cabinet 102. In block 904, the routine 900 provides network access for the device 330, enabling the device 330 to download the desired app. In some embodiments, the kiosk 100 provides network access in direct response to a request received by the kiosk 100 through user interaction with the kiosk's touchscreen 308 or a verbal request detected by the kiosk 100 through the microphone 310. In block 906, the routine 900 automatically initiates an app download to the device 330 or prompts the user to download the app to the device 330 using the provided network access. In some embodiments, the routine 900 directs the device 330 to a download page for the app, for example, presenting a Wi-Fi login page with a direct link to the app. In some embodiments, the routine 900 provides a link to initiate a download, such as by displaying on the display screen 104 a QR code or other code that the device 330 can scan. When the device 330 scans the code, the device 330 decodes the link, either automatically following the link or enabling the user to follow the link. The link can direct the device's browser (e.g., a user computer browser 420) to a web page from which the app can be downloaded, can invoke an app management program that enables the user to agree to the app install, or can prompt the device 330 to load an installer application or the desired software directly to the device 330. After the routine 900 assists the user to obtain the app, the routine 900 ends.

Figure 10:
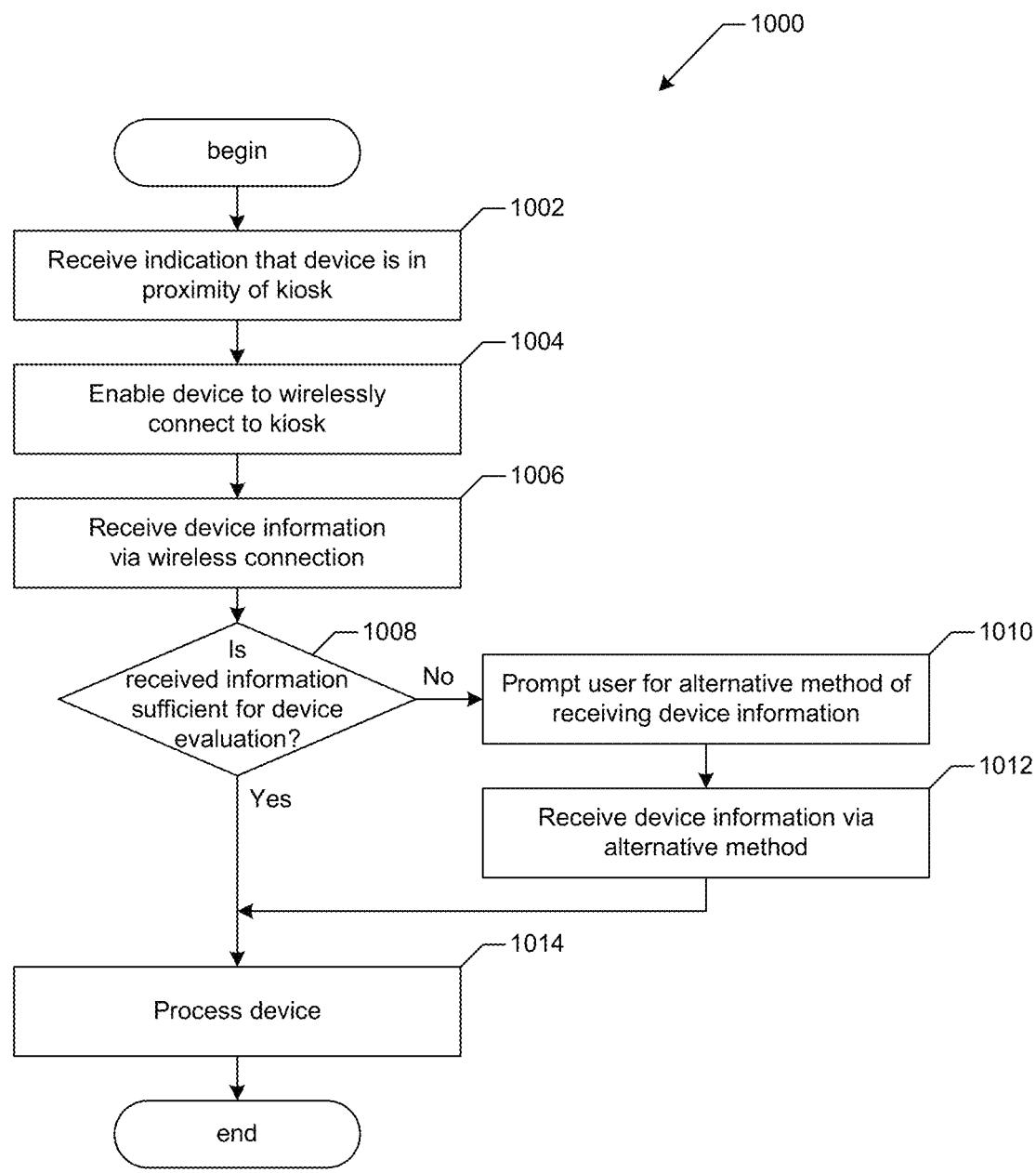
FIG. 10 is a flow diagram of a routine for wirelessly receiving information from the device in accordance with embodiments of the present technology.

FIG. 10 is a flow diagram of a routine 1000 for wirelessly receiving information from the device 330 in accordance with embodiments of the present technology. In block 1002, the kiosk 100 receives an indication that the device 330 is in proximity to the kiosk 100 (e.g., within wireless range of one of the kiosks 100a-100n of FIG. 4). In some embodiments, the routine 1000 receives an indication that the device 330 has an app installed. For example, receiving the indication can include receiving a known wireless identifier of the device 330 at the kiosk 100 after the app has identified and transmitted or saved one or more wireless identifiers for the device 330, such as a Wi-Fi interface media access control address (MAC address). In some embodiments, receiving the indication can include receiving user input at the kiosk 100 (e.g., via the touch screen 308 or other input devices of the kiosk 100 described above with reference to FIG. 1), such as user confirmation that the app is installed on the device 330, or user entry of a code associated with the user and/or one or more of the user's device(s) 330. In some embodiments, receiving the indication can include receiving a report from the app (e.g., while the app is running on the device 330) that the location of the device 330 is in the range of a wireless radio of the kiosk 100, as described above with reference to FIG. 6. In some embodiments, receiving the indication can include receiving a transmission at the kiosk 100 from the device 330 upon which the app is installed and active.

In block 1004, the routine 1000 enables the device 330 to wirelessly connect to the kiosk 100, for example, by the methods described above with reference to FIGS. 5 and 6. In block 1006, the kiosk 100 receives information from and/or about the device 330 via the wireless connection. The information can include, for example, the device's MAC address, IMEI number, electronic serial number (ESN), Integrated Circuit Card Identifier (ICCID), make and model, storage capacity, radio bands (e.g., frequency ranges and encoding such as CDMA, GSM, LTE, etc.), charge state, etc. In some embodiments, the kiosk 100 receives information including a code for recognizing the device 330 and/or the device's owner (e.g., the user 101). For example, as discussed below with reference to FIG. 11, the user may have downloaded the app on the device 330 and used the app to transmit the information about the device 330 to the kiosk 100 and/or the server computers 404 (FIG. 4) or other aspects of the present technology before arriving at the kiosk 100. Then by receiving a code from the device 330, the kiosk 100 can associate the device 330 with the previously received information that the user submitted via the app.

In decision block 1008, the routine 1000 determines whether the information is sufficient for evaluating the device 330. The determination can include, for example, whether the information is sufficient to determine a price to offer for the device 330 or sufficient to identify the presence or confirm the absence of issues affecting the device's operation, value, or ability to be resold. If the routine 1000 determines that the information is not sufficient, then in block 1010 the routine 1000 prompts the user for an alternative method of receiving the necessary information from the device 330. In some embodiments, alternative methods include physically connecting the device 330 to the kiosk 100 via a wired electrical connection, such as one of the electrical connectors 242 of FIG. 2. In block 1012, the kiosk 100 receives the necessary information from the device 330 via such an alternative method. Conversely, if the routine 1000 at block 1008 determines that the wirelessly received information is sufficient, then in block 1014 the routine 1000 continues to process the device 330, for example, proceeding to evaluate the physical and/or electrical condition of the device 330 and/or offering to purchase the device 330.

FIG. 11 illustrates a flow diagram of a routine 1100 for enabling a known electronic device (e.g., a mobile phone, such as the device 330) to automatically connect to a kiosk-provided wireless network in accordance with embodiments of the present technology, so that when the user brings the device 330 to the kiosk 100 the device 330 can exchange data with the kiosk 100, access servers of the device's manufacturer 424, download data from a website (e.g., a website associated with the kiosk operator 432), etc.

The user can register the device 330 (e.g., through a software app) so that the kiosk 100 can recognize the device 330, and the kiosk 100 automatically provides registered devices 330 a wireless connection to the kiosk 100 and/or to various remote resources associated with selling and/or recycling the device 330. By automatically offering a wireless network connection to a known device 330, the kiosk 100 enables the user to prepare the device 330 for sale and/or complete a partially completed sale at the kiosk 100, minimizing potential roadblocks and speeding the sale process. For example, by automatically providing wireless access to remote servers (e.g., to the server computers 404, the manufacturer servers 424, the carrier servers 422, etc.) the kiosk 100 can facilitate the resolution of issues that might otherwise prevent sale of the device 330, as described below with reference to FIGS. 13-19.

In block 1102, the routine 1100 determines that the device 330 is within a certain distance of the kiosk 100 (e.g., corresponding to a wireless connection range of the kiosk 100). For example, the routine 1100 can determine the presence of the device 330 by: detecting the device's radio as described below with reference to FIG. 20; receiving a connection request from the device 330 such as an attempt to join the kiosk's Wi-Fi network; or receiving user input, for example, via the touchscreen 308 of the kiosk 100, indicating that the user has brought the device 330 to the kiosk 100. In block 1104, the kiosk 100 recognizes that the device 330 near the kiosk 100 is a registered device. A registered device is a device 330 that the system recognizes, for example, from the user previously submitting device 330 data through the app or performing an evaluation of the device 330 at the kiosk 100. For example, when the user installs the app on the device 330, the app can record and transmit one or more identifiers for the device 330 to a remote server 404 and/or database 406. The identifiers can include, for example, a unique wireless identifier of the device 330 such as a Wi-Fi interface media access control address (MAC address). The routine 1100 registers the device 330 by, for example, saving one or more of the identifiers (or, e.g., a derived code such as a unique hash based on the identifiers) in a registry. The routine 1100 can store some or all of the registry in one or more local or remote databases (e.g., the database 406). For example, the registration process 1100 can include providing the identifiers to the kiosk 100 (e.g., to one or more of the kiosks in a network of connected kiosks such as kiosks 100*a*-100*n*). In some embodiments, the routine 1100 sends only a portion of the registry to a particular kiosk 100*a*, such as information about registered devices 330 in the same geographic area as the kiosk 100*a* (e.g., within the same city or state), reducing the volume of data transmitted to the kiosk 100*a*.

Once a device is registered, the kiosk 100 can recognize the device 330 (e.g., whether or not the app remains installed). Recognizing that the device 330 at the kiosk 100 is a registered device can include, for example, receiving one or more of the identifiers from the device 330, and querying the registry (e.g., a local or remote database that includes all or a portion of a list of unique identifiers or derived codes) to check whether the device 330 is in the list of registered devices. In block 1106, the routine 1100 permits the registered device to automatically connect to the wireless network provided by the kiosk 100 as a recognized, paired, or otherwise accepted or known device 330. For example, a registered Bluetooth device 330 can automatically pair with a Bluetooth-enabled kiosk 100, and a registered Wi-Fi device 330 can automatically join a Wi-Fi network of the kiosk 100 without requiring the user to enter login credentials. In some embodiments, the kiosk 100 limits the ability of a device 330 to use the wireless network as described below with reference to FIG. 19, and/or cancels an automatic network connection, for example, if the user does not initiate a transaction at the kiosk 100 (e.g., if the user is a phone hawker attempting to compete with the kiosk).

In some embodiments, the automatic network connection directly provides for a quick and easy device purchase process. For example, after the user downloads the app on the device 330, the system registers the device 330 for future recognition, as described above with reference to block 1104. The user may download and run the app on the device 330 using a communication link other than the wireless connection provided by the kiosk 100 and without needing to be near the kiosk 100 when downloading and running the app. For example, the device 330 can use a wired or wireless Internet connection at a remote location to obtain the app from a website (e.g., a website associated with the kiosk operator 432), from a software repository run by the device manufacturer 424 or a third party (e.g., the Apple® App Stores℠, Google Play™ Store, Amazon® Appstore™, and so on), etc. The device 330 can use such available communication links to remotely obtain the app and for the app to remotely communicate with the kiosk 100 and/or other aspects of the present technology. The user can thus use the app to submit information about the device 330 (e.g., registering the device 330) and obtain an estimated price quote for the device 330 through the app. In some embodiments of the present technology, the estimated price includes a range of prices that the kiosk 100 may offer for the device 330, and/or is contingent on an evaluation of the device 330 at the kiosk 100 to confirm the device's electrical and/or physical condition. The user can then bring the device 330 to the kiosk 100, which recognizes the device 330 and allows the device 330 to automatically wirelessly connect to the kiosk 100. The kiosk 100 receives information about the device 330 via the wireless connection to evaluate the device 330 as described above with reference to FIG. 10. The kiosk 100 also retrieves the information submitted via the app and the estimated price of the device 330 that was provided to the user through the app. The kiosk 100 compares the wirelessly received information with the app-submitted information to confirm the identity of the device 330 and/or to verify that the condition of the device 330 has not changed. The kiosk 100 can then process the device 330, such as by receiving the device 330, performing a visual inspection as described above with respect to FIG. 2B, determining and offering a price for the device, and concluding the wireless purchase transaction.

FIG. 12 is a flow diagram of a routine 1200 for inducing a notification on the device 330 in accordance with embodiments of the present technology. It may be useful in some embodiments to wirelessly send a notification to the user of a known device 330; for example, to notify the user that the value of the user's device 330 has changed or is expected to change, to alert the user that the kiosk 100 is nearby and available, and/or to offer a coupon or special deal to the user, etc. In block 1202, the routine 1200 determines that the device 330 (e.g., a registered device or a device with an app installed) is near the kiosk 100. Examples of such determining are described above with reference to block 1002 of FIG. 10 and blocks 1102 and 1104 of FIG. 11. In block 1204, the routine 1200 wirelessly connects to the device 330. For example, if the device 330 is a registered device, the kiosk 100 can automatically wirelessly connect to the device 330 as described above with reference to block 1106 of FIG. 11. In block 1206, the routine 1200 induces a notification on the device 330, for example, sending a message to the device 330 or triggering the app to cause the device 330 to display a message on the display 342 that can inform the user that, for example, the user can sell the device at a predetermined price if he or she brings the device to the kiosk 100. The notification can inform the user where the kiosk 100 is located and/or provide directions from the user's location to the kiosk 100. As an example, if the user has checked the price of the device 330 (e.g., within a preset period of time before the device 330 is detected near the kiosk 100), the routine 1200 can notify the user that the user can complete the contemplated sale of the device 330 for the price at the nearby kiosk 100. By using the kiosk's wireless connection to induce a notification, the system ensures that the user is within the vicinity of the kiosk 100, enabling the user to complete the sale of his or her device 330 without needing to travel far. In addition, the localized notification enables the system to provide location-specific incentives, such as discounts redeemable at merchants located close to the kiosk 100.

In some embodiments, the user may wish to sell the device 330 at the kiosk 100, but the kiosk 100 or the user may discover an issue that prevents the sale. For example, it is becoming increasingly common for electronic devices such as computers, tablets, and mobile phones to be associated with remote user accounts. Examples of such remote user accounts include cloud-based services provided by a device manufacturer or other third party. When a device is associated with such a remote user account, it may be password protected or otherwise locked to that user's identity so that the device cannot be reset and used by another individual (e.g., a subsequent purchaser). In addition, a remote user account may allow the account owner to remotely lock or disable the associated device to prevent anyone else from using it (a device "kill switch"). Therefore, a device may not be marketable while the device is associated with such a remote user account. To sell such a device 330 at the kiosk 100, the user must first disassociate the device 330 from the remote user account. By providing a wireless network at the kiosk 100, the kiosk 100 allows the user to resolve such issues to allow a transaction to proceed.

Figure 13:
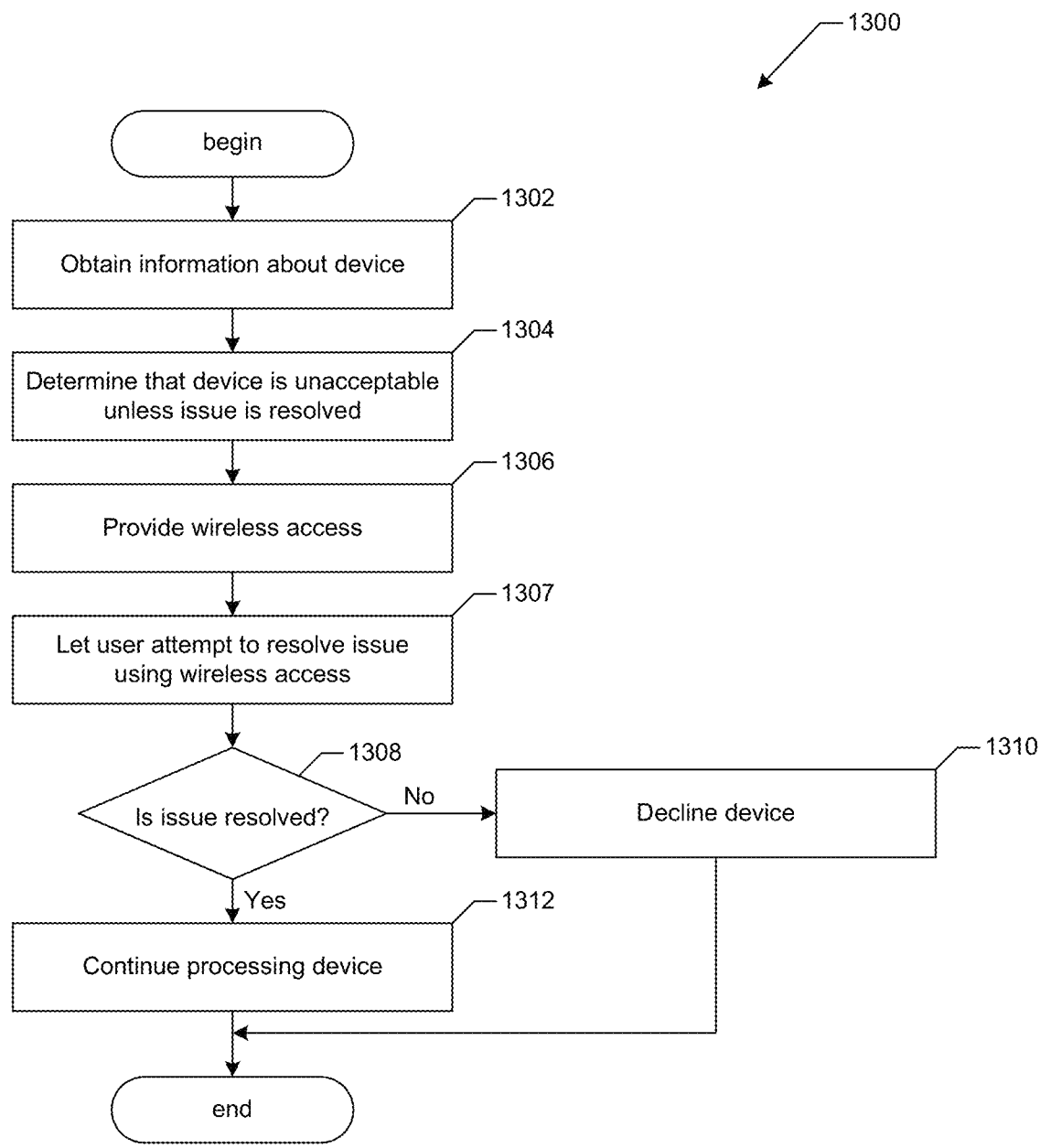
FIG. 13 is a flow diagram of a routine for providing wireless network access to resolve a device issue in accordance with embodiments of the present technology.

FIG. 13, for example, is a flow diagram of a routine 1300 for providing wireless network access to resolve a device issue in accordance with embodiments of the present technology. In block 1302, the routine 1300 obtains information about a device, such as the device 330 brought to the kiosk 100 by a user who wishes to sell the device 330 for recycling. Obtaining information about the device 330 can include, for example, receiving user input describing the device 330, performing visual evaluation of the device 330 after it has been placed in the kiosk 100, performing optical character recognition (OCR) of information printed on the device 330 (e.g., the back of the device) or displayed on the device's screen 342, performing electrical evaluation of the device 330 via a physical connector as described above with respect to FIGS. 2A-2D, and/or querying remote servers (e.g., a stolen phone database). In block 1304, the routine 1300 determines based on the information that the device 330 is unacceptable unless an issue is resolved. For example, the routine 1300 may obtain information indicating that the device 330 is or may be associated with a remote user account that includes a device kill switch, as described below with respect to block 1402 of FIG. 14. The routine 1300 may treat a device's association with a remote user account as an issue that must be resolved before the device is acceptable for processing (e.g., purchasing and recycling) at the kiosk 100. Thus, if the information indicates that the device 330 is subject to a kill switch, the routine 1300 determines that the device is unacceptable while that issue exists.

In block 1306, the routine 1300 provides wireless access to allow the issue to be resolved. For example, in some embodiments, the kiosk 100 allows the device 330 to contact a carrier 422 or device manufacturer 424 (FIG. 4) via the Internet to let the device owner sign in and turn off a kill switch feature that could otherwise be used to deactivate the device 330 after resale. In block 1307, the routine 1300 lets the user attempt to resolve the issue using the wireless access. In decision block 1308, the routine 1300 checks whether the issue is resolved. In some embodiments, checking for issue resolution can include querying one or more remote servers (e.g., the device manufacturer servers 424) to determine whether the determined issue has been resolved. In some embodiments, the checking can include interrogating the device 330 to determine whether the issue is still present. For example, a device 330 that has been locked by a remote user account may reveal that locked-out state in response to queries via an electronic interface of the device 330, and/or may display an indication of its state on the device's screen 342 (e.g., a message stating that the device is lost and should be returned to its owner). The routine 1300 may query the device's electronic interface and/or photograph the device's screen 342 to determine whether such an issue is present. If the issue is still present after giving the user an opportunity to resolve the issue, then in block 1310, the routine 1300 declines to further process the device 330. On the other hand, if the issue has been resolved, then in block 1312, the routine 1300 continues to process the device 330. This can include, for example, visual and/or electrical inspection of the device 330 to determine or confirm the device's value, making an offer to purchase the device 330, and if the user accepts the offer, completing the purchase by collecting the device 330 for resale or recycling and providing the offered value to the user in exchange for the device 330. After blocks 1310 or 1312, the routine 1300 ends.

Figure 14:
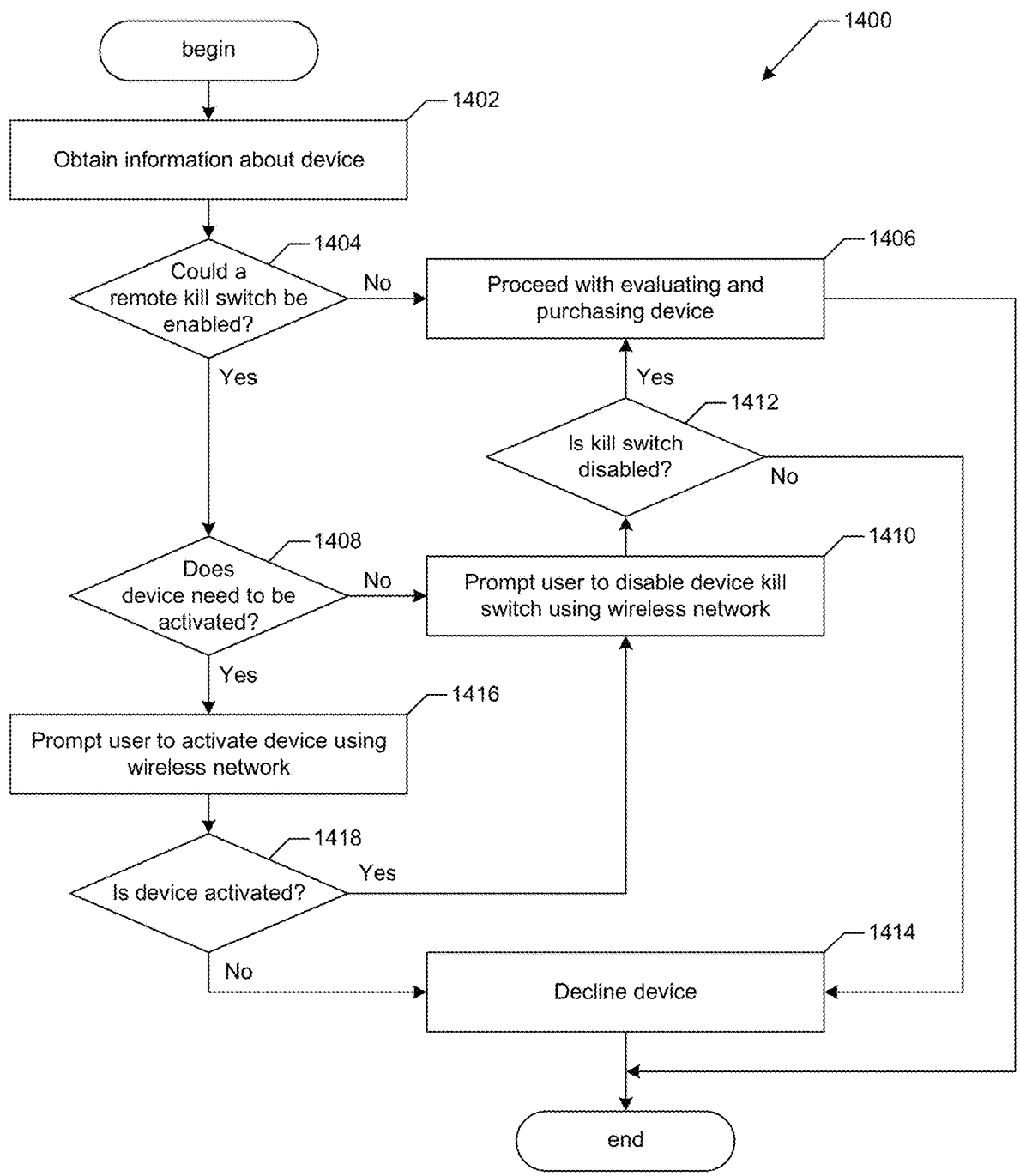
FIG. 14 is a flow diagram of a routine for disassociating a device from a remote user account in accordance with embodiments of the present technology.

FIG. 14 is a flow diagram of a routine 1400 for disassociating a device from a remote user account in accordance with embodiments of the present technology. For example, if the remote user account includes a kill switch that is enabled for the device 330, the user must disable it; and if the device 330 is in a factory reset state, the routine 1400 can require the user to activate the device 330 to ensure that a kill switch is not enabled for the device 330. In block 1402, the routine 1400 obtains information about the device 330, such as information from the device 330 or from a remote server having information that pertains to the device 330. For example, an app can use an operating system 331 API on the device 330 to determine whether the device 330 is associated with a remote user account. As another example, to determine whether an Apple® device 330 is associated with an iCloud® remote user account, the kiosk 100 can query the Apple® device manufacturer servers 424 (e.g., the Global Service Exchange (GSX) servers at gsx.apple.com). In some embodiments, obtaining the information can include receiving user answers to questions at the kiosk 100; obtaining information from an app associated with the device 330; connecting a physical connector to the device 330; and/or directing the user to connect the device 330 to a wireless network provided by the kiosk 100, or to perform an action that requires the device 330 to be unlocked and activated (e.g., displaying the device's home screen). In decision block 1404, the routine 1400 checks whether the device 330 is or might be subject to a remote kill switch. For example, if the information indicates that the device 330 is not associated with a remote user account, or if the device 330 is associated only with a remote user account that does not include a remote kill switch feature (e.g., a webmail account that is removed from the device 330 by a factory reset of the device 330), then the routine 1400 determines that the device 330 is not subject to a remote user account kill switch. If no such kill switch is in effect, then in block 1406 the routine 1400 proceeds with evaluating, purchasing, and recycling (e.g., refurbishing and/or reselling) the device 330.

In decision block 1408, the routine 1400 determines whether the device 330 must be activated before confirming and/or deactivating the kill switch. For example, if the device 330 appears to have been reset, it may not be evident whether it is unassociated with any remote user account, whether a still-associated user remotely reset the device 330 (so that it cannot be reactivated except by that user), or whether a remote user permanently disabled the device 330 (so that it cannot be reactivated by anyone). If the device 330 does not require activation (for example, if the device 330 is in an active, usable state rather than in a reset or other locked-out state), then in block 1410 the routine 1400 prompts the user to disable any device kill switch via a wireless network; for example, using a provided wireless Internet connection as described above with reference to FIG. 13. In decision block 1412, the routine 1400 determines whether the remote kill switch has been disabled. If not (i.e., if the user cannot remove the kill switch feature or is otherwise unable or unwilling to provide the device 330 in a freely resalable state), then the device 330 may have little or no resale value, and/or the device 330 may be stolen property, so in block 1414 the routine 1400 declines to purchase the device 330 by displaying an appropriate message to the user, e.g., via the display screen 104. Otherwise, if the user successfully unlinks the remote user account and its remote kill switch from the device 330, the routine 1400 continues in block 1406.

Returning to decision block 1408, if the device 330 does require activation (e.g., if it is in a user-wiped or remotely locked state), then in block 1416, the routine 1400 prompts the user to activate the device 330 via a wireless network, for example, using a provided wireless Internet connection as described below with reference to FIG. 16. For example, the routine 1400 can prompt the user with steps to connect to the wireless network and/or instructions with steps to activate the device 330. In decision block 1418, if the user has not activated the device 330 (for example, if the user cannot provide a password required to activate the device 330 or is otherwise unable or unwilling to activate it), then in block 1414 the routine 1400 declines the device 330. Otherwise, if the user successfully activates the device 330, the routine 1400 continues in block 1410 so that any kill switch can be deactivated.

FIGS. 15A-15B are display diagrams illustrating device screens associated with disabling a remote account associated with the device 330 in accordance with embodiments of the present technology. "Find My iPhone" is an example of a remote kill switch feature for Apple® iOS® devices that is described herein for illustrative purposes. Referring first to FIG. 15A, the display page 1510 illustrates device settings for an Apple® iOS® device 330 including a button or control 1512 for the "Find My iPhone" feature. The control 1512 is illustrated in an ON state, indicating that the feature is active. As long as the feature is active, the owner can attempt to locate and/or remotely disable this device 330 if the device 330 were to be lost or stolen. For example, the user can log into his or her remote user account on icloud-.com, select the device 330, and press a button to play a sound on the device 330, lock the device 330 and track its movement, or erase the device 330. To prevent the device 330 sold at the kiosk 100 from being subject to such actions by the user after the sale, the kiosk 100 requires the user to deactivate the "Find My iPhone" feature. FIG. 15B shows an Apple® iOS® device display page 1520 that requires user authentication on the device 330 before the "Find My iPhone" feature can be deactivated. After turning the control 1512 to the OFF state, such as by sliding the button or control 1512 to the left, the device 330 requires the user to enter the device owner's account password 1522. Only after the user enters the correct credentials can the feature be turned off 1524.

Figure 15C:
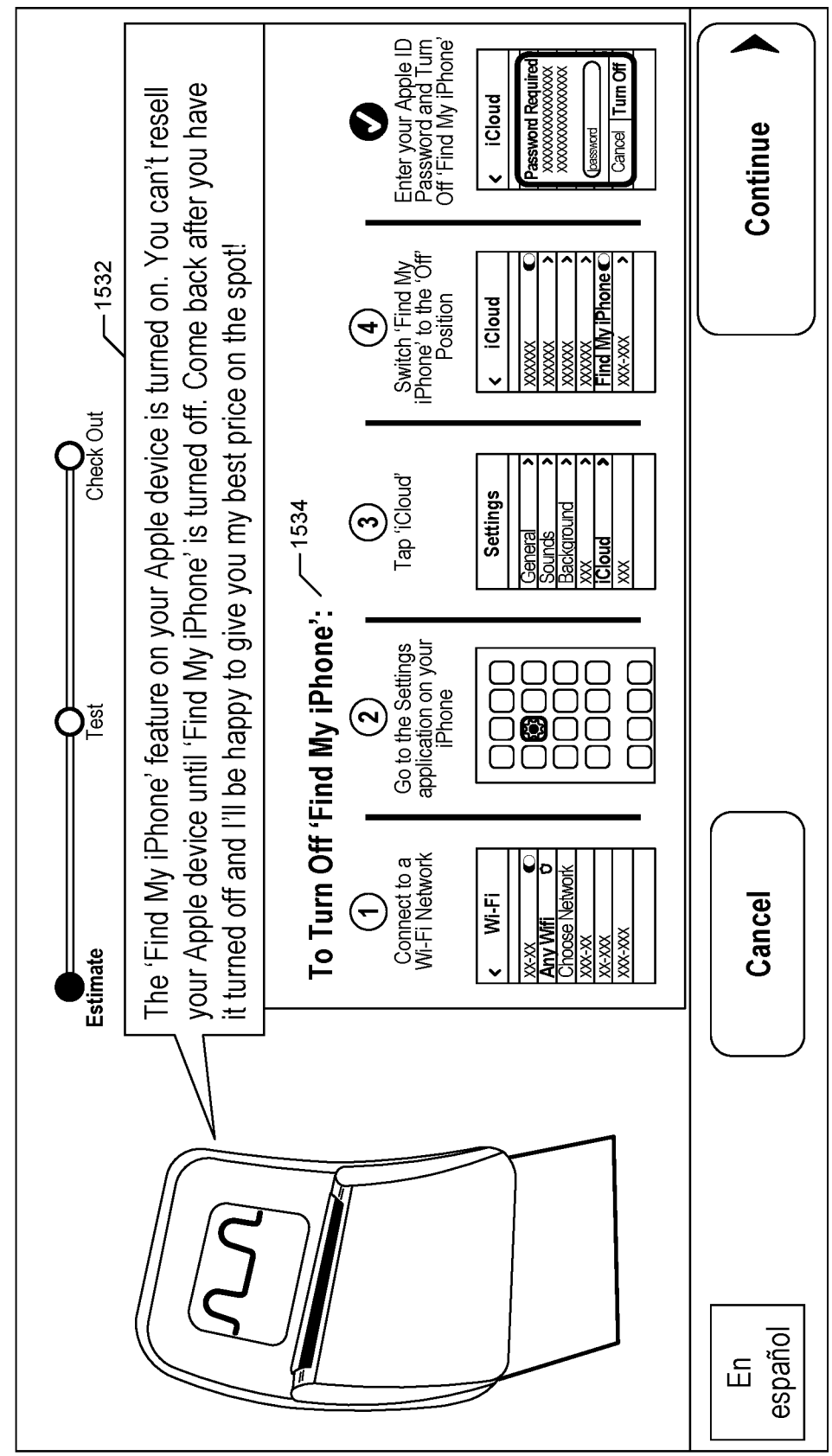
FIGS. 15C-15D are display diagrams illustrating instructions for disassociating a device from a remote user account in accordance with embodiments of the present technology.
Figure 15D:
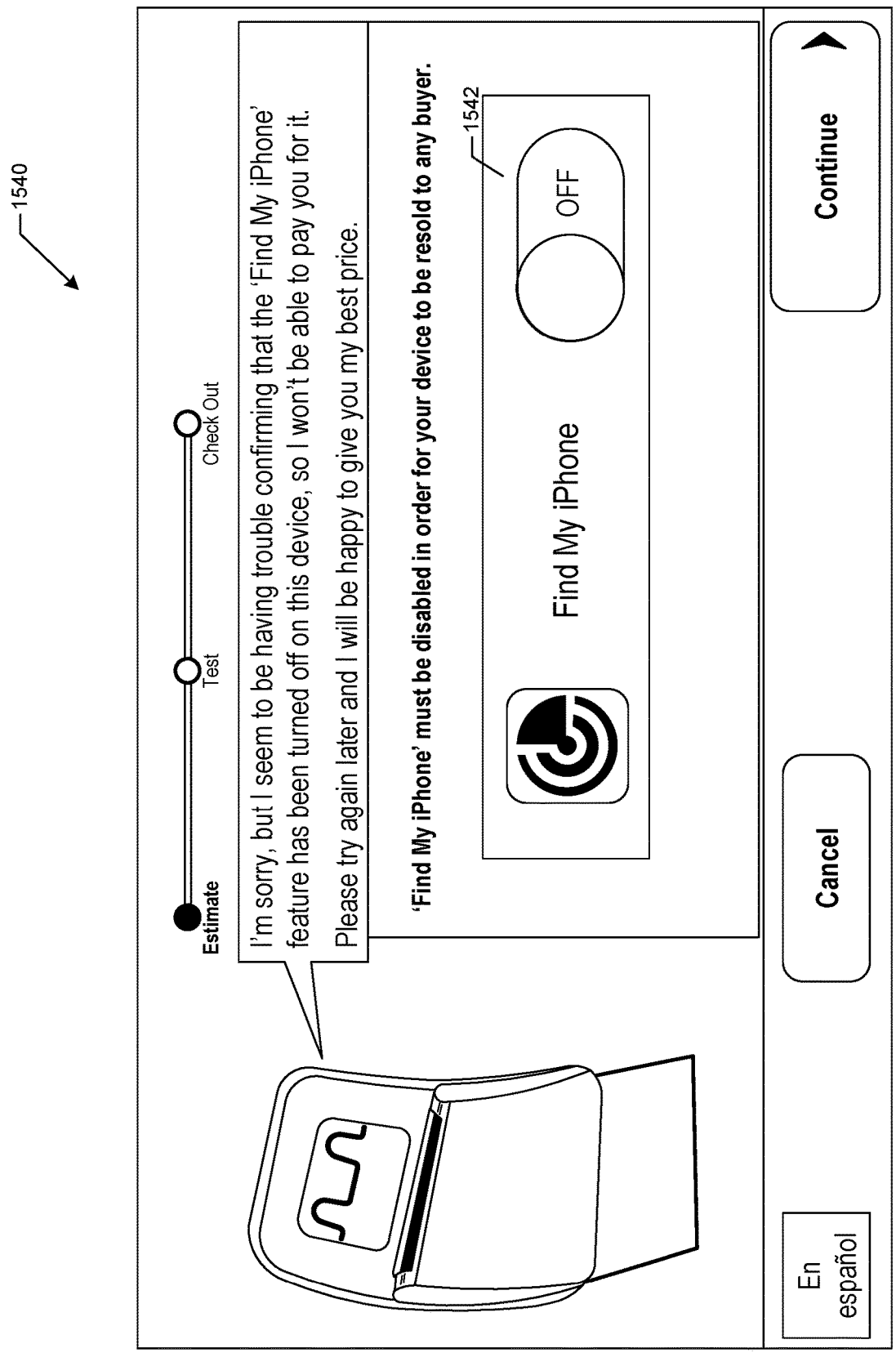

FIGS. 15C-15D are display diagrams illustrating instructions for disassociating a device 330 from a remote user account in accordance with embodiments of the present technology. In some embodiments, the kiosk 100 displays the illustrated textual instructions and accompanying graphical diagrams on the display screen 104. In FIG. 15C, the illustrated display page 1530 informs the user in explanatory text 1532 that the user cannot sell his or her device 330 while its "Find My iPhone" feature (described herein for illustrative purposes) is turned on. In addition, the display screen 1530 displays a series of steps 1534 for the device's owner to disable the remote kill switch feature. Those steps 1534 include a first step of connecting to a Wi-Fi network. In some embodiments, the kiosk 100 presents instructions that direct the user to connect to the wireless network provided by the kiosk 100, as described above with reference to block 608 of FIG. 6 and FIG. 7. In other embodiments, the kiosk 100 automatically wirelessly connects to the registered device 330 as described above with reference to FIG. 11, and presents instructions based on the device 330 being connected. In some embodiments, the kiosk 100 provides instructions that are customized to the user's device 330 (e.g., with illustrations and/or directions specific to the device's operating system 331, manufacturer, screen shape, installed software, type of remote user account, etc.) to better help the device's owner to disable the remote kill switch feature. In FIG. 15D, the display page 1540 illustrates a deactivated "Find My iPhone" control 1542 showing how the corresponding control 1512 appears in the successfully disabled OFF state. In some embodiments, the kiosk 100 presents the display page 1540 to the user when the kiosk 100 declines to purchase the device 330 as described above with reference to block 1414 of FIG. 14 after the user fails to disassociate the device 330 from a remote user account.

Figure 16:
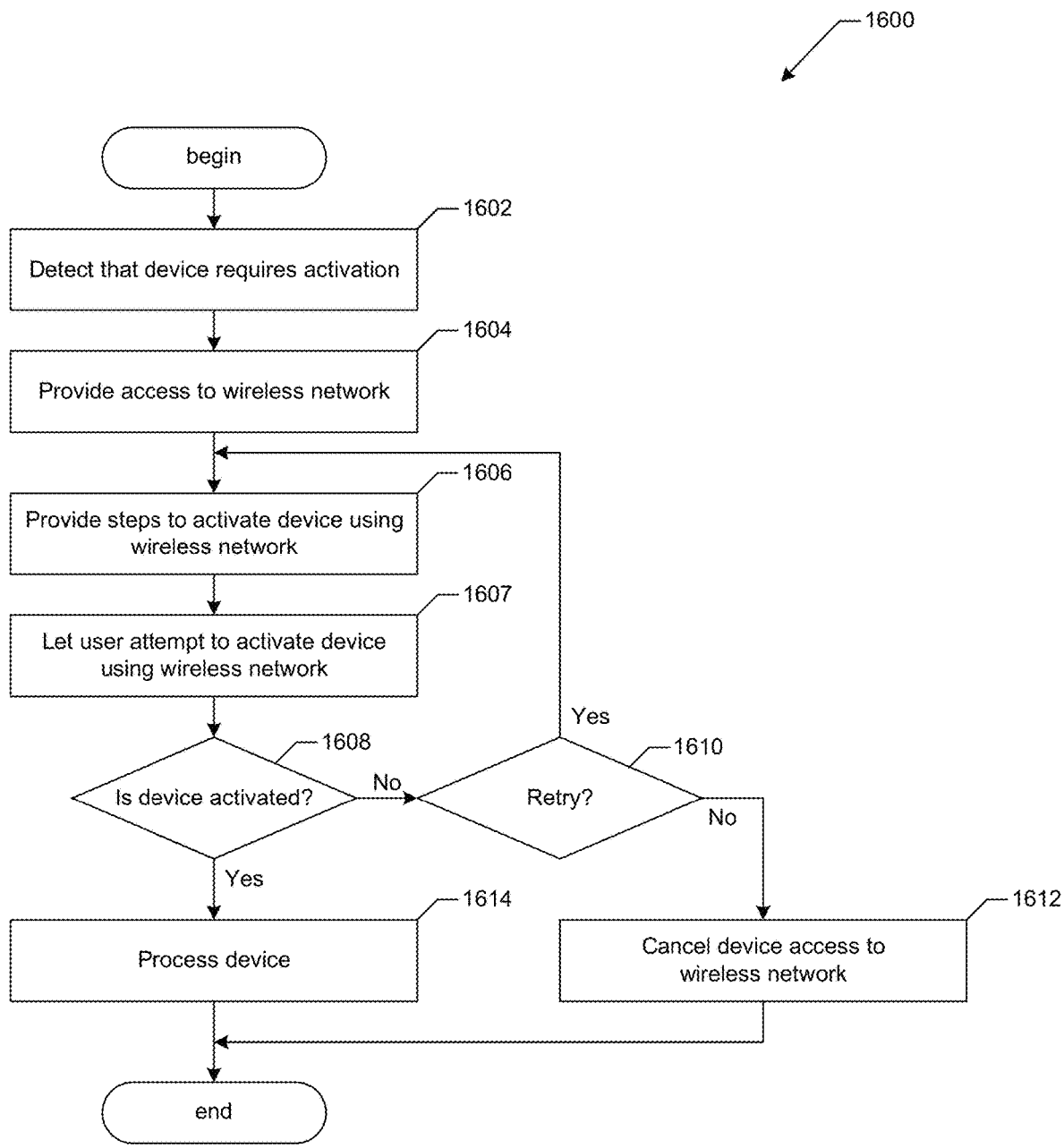
FIG. 16 is a flow diagram of a routine for wirelessly activating a device in accordance with embodiments of the present technology.

FIG. 16 is a flow diagram of a routine 1600 for wirelessly activating a device in accordance with embodiments of the present technology. In block 1602, the routine 1600 detects that the device 330 requires activation, as described above with reference to blocks 1408 and 1416 of FIG. 14. For example, if the user wants to be sure that all of his or her personal information has been removed from a device before selling it, he or she may have erased the device 330 and thereby reset it to a state similar to a factory-new device. On the other hand, a device that appears simply to have been erased may instead have been remotely wiped and locked after the owner believed it to be stolen or lost—in which case activation by a new user may be impossible, or may require the owner's password. To distinguish those possibilities and to ensure that the kiosk 100 accepts only an active working device from the owner (as well as, for example, to install a software app on the device 330), in block 1604 the kiosk 100 provides and allows the device 330 to connect to a wireless network. Through the wireless network, the kiosk 100 provides the device 330 Wi-Fi access to remote activation servers such as the device manufacturer servers 424 and/or the wireless carrier servers 422 as described above with reference to block 1306 of FIG. 13. For example, if the user cancels cell network service for the device 330 and then brings the device 330 to the kiosk 100, the user may not be able to contact the activation servers 422 and/or 424 except through the kiosk's wireless network. In block 1606, the routine 1600 provides steps to activate the device 330 using the wireless network. For example, the kiosk 100 can display, on the display screen 104, instructions illustrating device screens (e.g., as described below with reference to FIGS. 17A-17B) and a resultant successfully activated state (e.g., as described below with reference to FIG. 18). In block 1607, the routine 1600 lets the user attempt to activate the device using the wireless network. In decision block 1608, the routine 1600 checks whether the device 330 has been successfully activated. If not, then the routine 1600 proceeds to decision block 1610. The kiosk 100 can set a threshold number of activation attempts (e.g., 3) to prevent the user from monopolizing the kiosk 100 with unsuccessful attempts. If the kiosk 100 allows the user to retry activation, the routine 1600 returns to block 1606. If the user has tried the threshold number of times without success, then in block 1612 the routine 1600 cancels the device's access to the wireless network and the routine 1600 ends. Otherwise, if the device 330 has been activated following decision block 1608, then in block 1614 the kiosk 100 continues to process the device 330 (for example, to evaluate the device 330, make an offer to the user, and purchase the device 330), and the routine 1600 ends.

Figures 17A, 17B:
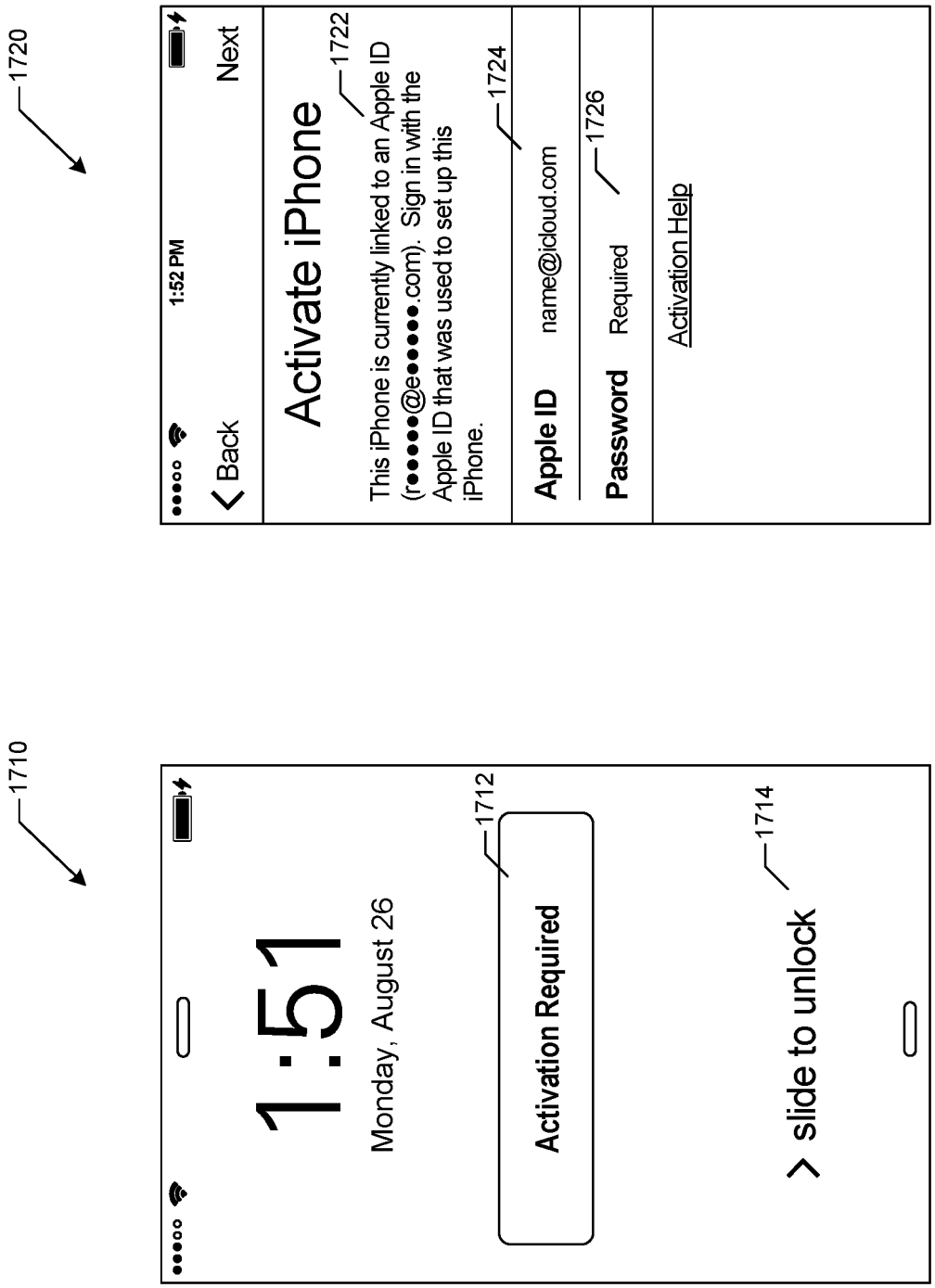
FIGS. 17A-17B are display diagrams illustrating screens associated with activating a mobile device in accordance with embodiments of the present technology.
Figure 18:
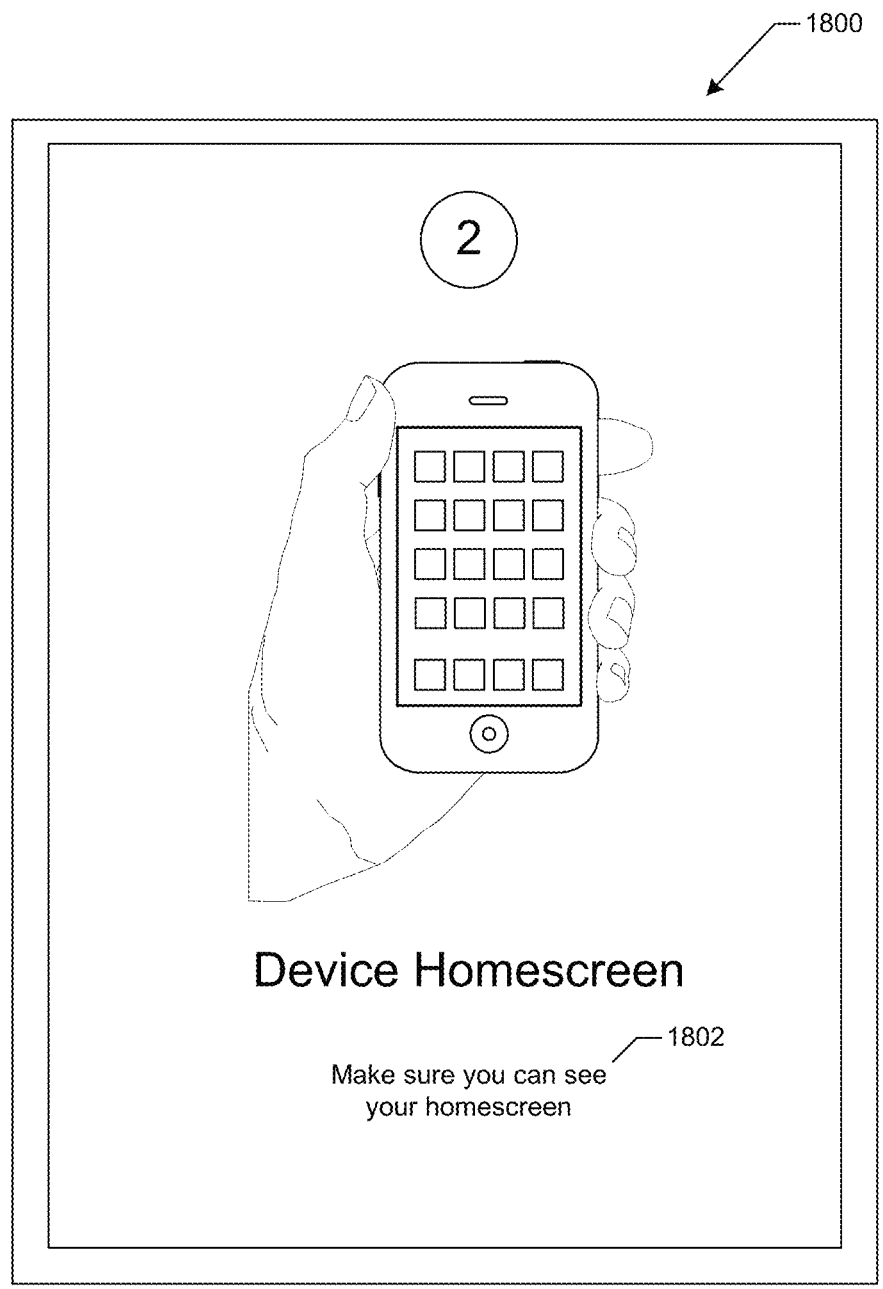
FIG. 18 is a display diagram illustrating an instruction for activating a device in accordance with embodiments of the present technology.

FIGS. 17A-17B are display diagrams illustrating screens associated with activating a mobile device such as a mobile phone (e.g., the device 330) in accordance with embodiments of the present technology. The illustrated Apple® iPhone® activation screens 1710 and 1720 are described herein for illustrative purposes. In FIG. 17A, the display page 1710 includes an "Activation Required" message 1712 indicating that the device 330 is in a deactivated state. It also includes a control 1714 for unlocking the device 330 or initiating the activation process. The screen 1710 does not indicate whether or not the device 330 is associated with a remote user account. In FIG. 17B, however, the display page 1720 shows a message 1722 that the device 330 was reset in connection with an owner's remote user account (e.g., by a remote kill switch feature) and indicates that the device 330 cannot be activated without entering the owner's account credentials (username 1724 and password 1726). In some embodiments, the kiosk 100 determines that the device 330 displaying a screen substantially similar to the display page 1720 cannot be accepted for purchase. The kiosk 100 determines that the device 330 is unacceptable by, for example, optically scanning the screen 342 (e.g., using the external cameras 116 or the internal cameras 314) or by requesting and receiving user confirmation of the content displayed on the screen 342. In some embodiments, the kiosk 100 can utilize OCR techniques to convert portions of the display page 1720 to text. The kiosk 100 can also utilize OCR to read information, such as an identifier (e.g., a serial number or IMEI number), printed on the device 330 (e.g., on the back of the device) or displayed on the screen 342. The kiosk 100 can compare the information from the device 330 against information in a local and/or remote database (e.g., the database 406 of FIG. 4) and/or query a remote server such as a device manufacturer server 424 to determine whether the device 330 is in an unacceptable state (e.g., associated with a remote user account or unactivated), as described above with reference to block 1402 of FIG. 14. After such a determination that the device 330 requires activation, the kiosk 100 prompts the user to activate the device 330 by entering the required credentials, as described above with reference to block 1416 of FIG. 14. The kiosk 100 can display a series of instructions for device activation to ensure that the device 330 is not associated with a remote user account. FIG. 18, for example, is a display diagram illustrating an instruction 1800 for activating the device 330 in accordance with embodiments of the present technology. The instructional text 1802 indicates that if the device's home screen is visible, then the device 330 has been successfully activated.

Figure 19:
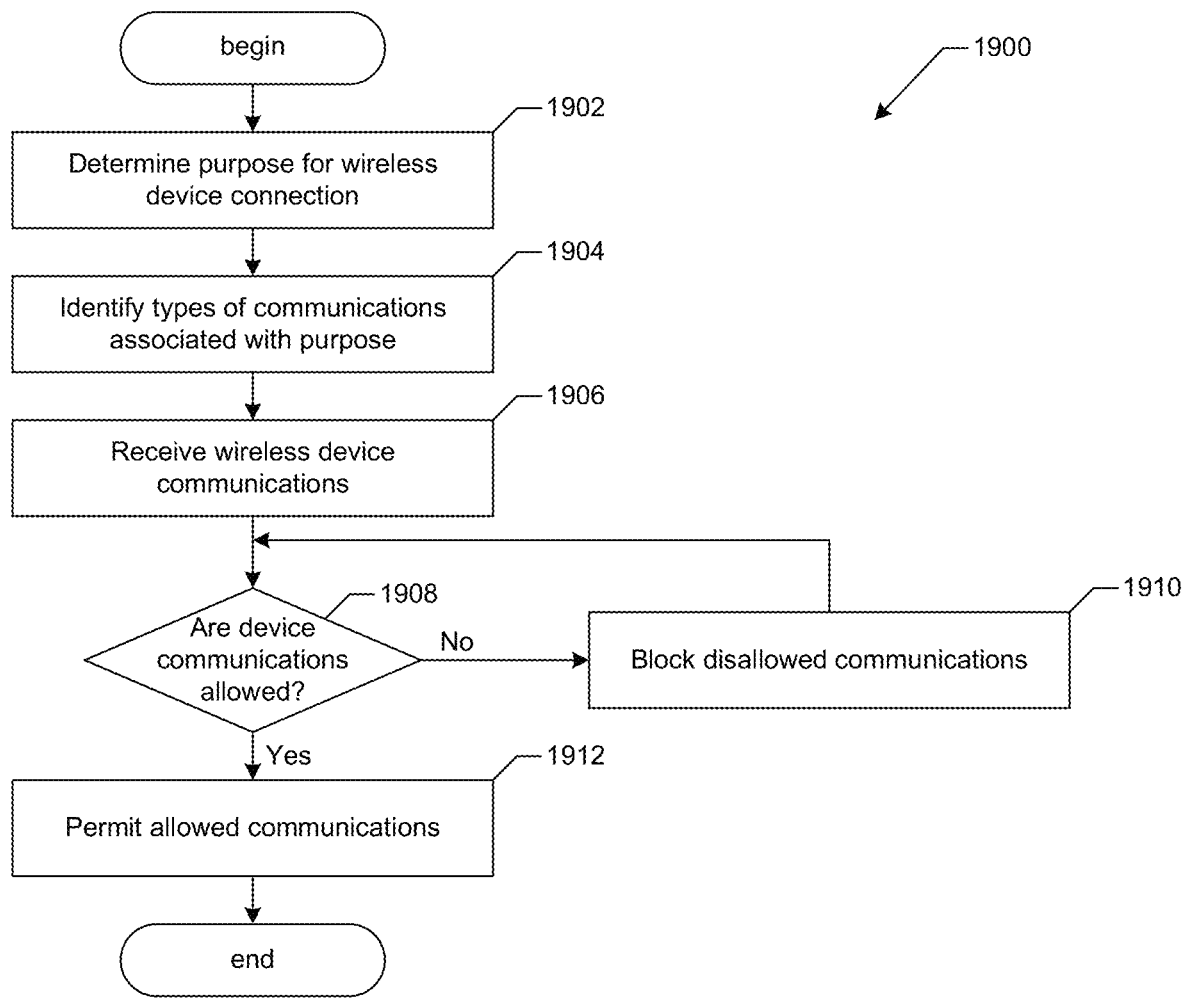
FIG. 19 is a flow diagram of a routine for filtering wireless communications in accordance with embodiments of the present technology.

In various embodiments, it may be useful to limit the use of a wireless network to allowed purposes rather than providing, for example, unlimited Wi-Fi network access to some or all devices 330 that connect to the kiosk's wireless network. FIG. 19, for example, is a flow diagram of a routine 1900 for filtering wireless communications in accordance with embodiments of the present technology. In block 1902, the routine 1900 determines a purpose for a wireless device connection. For example, as described above, the kiosk's wireless network can be provided for allowing an app download, activating a reset device 330, and/or turning off a remote kill switch feature, among other purposes. In block 1904, the routine 1900 identifies types of communications associated with the purpose for the wireless device connection. For example, communications can be identified by domain (e.g., apple.com), by individual server address (e.g., gsx.apple.com), by message type (email, secure HTML GET/POST request and reply, etc.), by specific message formatting, and so on. In block 1906, the routine 1900 receives wireless device communications from and/or to the device 330. In decision block 1908, the routine 1900 determines whether the device communications are allowed, such as by comparing various features of those communications to the identified types of communications associated with the purpose for allowing network access. In block 1910, disallowed communications are blocked; in some embodiments, the disallowed communications are dropped. In other embodiments, the disallowed communications produce an error code or message to the user that the kiosk 100 can display on the display screen 104 and/or play through the kiosk speaker 304, or that the device 330 can present to the user via the device screen 342 and/or the device speaker 344. In some embodiments, a user's attempts to use the wireless network for unpermitted purposes result in the kiosk 100 disallowing the device 330 from the wireless network or turning the wireless network off. In block 1912, allowed communications are permitted. After allowed communications have concluded, the routine 1900 ends.

Figures 20, 21:
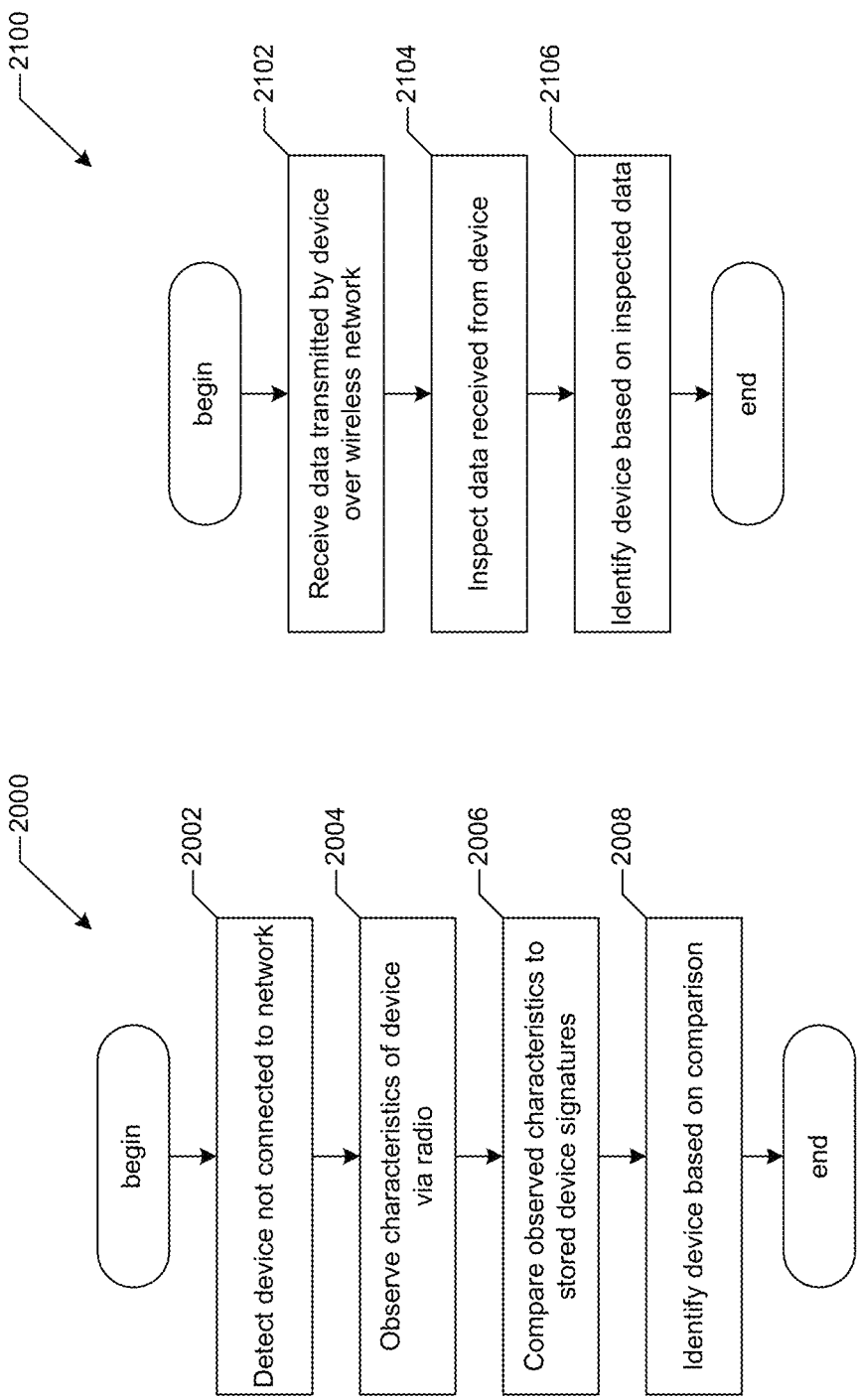
FIG. 20 is a flow diagram of a routine for identifying a wireless device in accordance with embodiments of the present technology.
FIG. 21 is a flow diagram of a routine for identifying a connected wireless device in accordance with embodiments of the present technology.

In various embodiments, the present technology can include identifying wireless devices 330. FIG. 20, for example, is a flow diagram of a routine 2000 for identifying a wireless device such as a mobile phone, tablet computer, laptop computer, or music player (e.g., the device 330) in accordance with embodiments of the present technology. In block 2002, the routine 2000 detects a wireless device 330 that is not connected to the kiosk's wireless network. For example, a Wi-Fi or Bluetooth device can broadcast information according to various low-level protocols for identifying available networks and devices (for example, IP packets in Ethernet frames, which can include probe request and probe response frames). Wi-Fi client stations (e.g., a device 330) can transmit, on various channels, packets searching for access points (e.g., an access point that the client station had previously connected to), and those transmissions typically reveal the device's Wi-Fi MAC address. The kiosk 100 can detect a wireless device 330 unassociated with the kiosk's wireless network by passive scanning (such as observing wireless data traffic) and/or active scanning (such as sending wireless data to prompt devices to reply and reveal their presence to the kiosk 100). In block 2004, when the kiosk 100 has detected the device 330, the routine 2000 observes characteristics of the device 330. Such characteristics can include, for example, MAC address information, signal strength, protocol response patterns, channels, etc. For example, a MAC address may include numbers that encode or otherwise indicate a device's manufacturer or other information about the device 330. In block 2006, the routine 2000 compares the observed characteristics with stored device signatures, such as information in the database 406. In block 2008, the routine 2000 identifies the device 330 based on the comparison. In some embodiments, the routine 2000 can identify the device 330 probabilistically or as one of a category of devices (e.g., a Samsung phone, or one of a group of devices); in some embodiments, the routine 2000 identifies the device 330 as a particular device.

FIG. 21 is a flow diagram of a routine 2100 for identifying a connected wireless device 330 in accordance with embodiments of the present technology. In block 2102, the device 330 is connected to the kiosk's wireless network and the routine 2100 wirelessly receives data transmitted by the device 330 over the network. The device 330 can send packets of data addressed to the kiosk 100, for example, including data directed to the kiosk 100 and data sent through the kiosk 100 to a remote server (e.g., to the device manufacturer's activation server 424). As a result of the device sending and receiving data using the kiosk's wireless network, the kiosk 100 is able to capture and/or inspect the device's data transmissions. In block 2104, the routine 2100 inspects the data. The contents of the wireless data transmissions can include, for example, a MAC address that indicates the device's manufacturer, packet header information identifying the type of the device 330, and/or packet payload information that reveals the identity of the device 330 (for example, a web page request that includes data telling the web server what kind of device is making the web page request, so that a properly displayable page is returned to the device 330). In block 2106, the routine 2100 identifies the device 330 based on the data.

Figure 22:
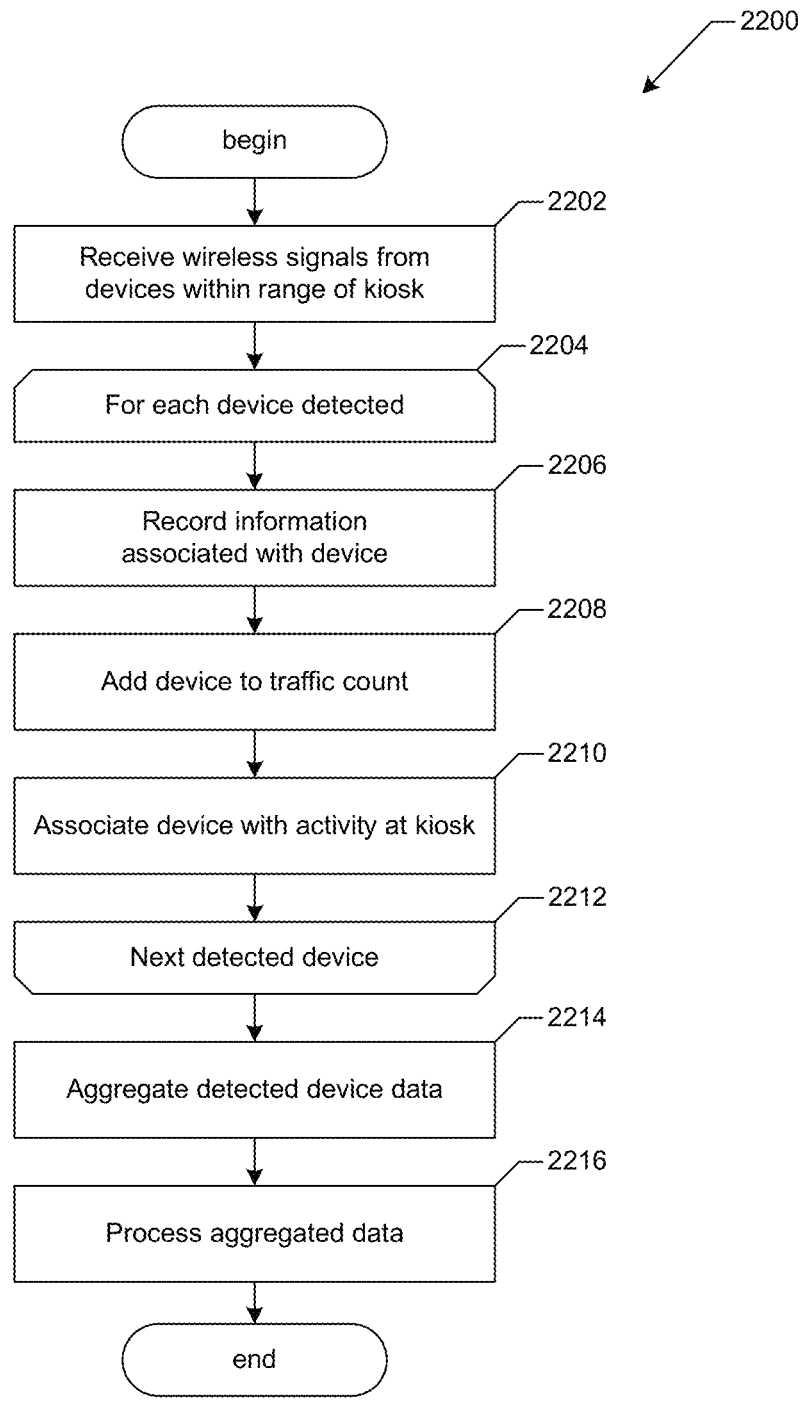
FIG. 22 is a flow diagram of a routine for recording wireless device activity in accordance with embodiments of the present technology.

FIG. 22 is a flow diagram of a routine 2200 for recording wireless device activity in accordance with embodiments of the present technology. In block 2202, the routine 2200 receives wireless signals from mobile devices 330 (e.g., mobile phones; PDAs; wearable computing devices such as smartwatches and wireless headsets; tablet, netbook, and laptop computers; e-readers; music playing devices; etc.) within range of the kiosk 100, as described above with reference to FIGS. 20 and 21. In some embodiments, the kiosk 100 receives wireless signals over networks having varied ranges, such as the ranges described above with reference to block 602 of FIG. 6. For example, devices 330 detected via a sensitive Wi-Fi antenna may be at a greater distance from the kiosk 100 than devices 330 detected via a Bluetooth, ZigBee, or NFC antenna configured for short range communication. In blocks 2204-2212, the routine 2200 iterates for each detected device 330. In block 2206, the routine 2200 records information associated with the detected device 330. The information can include, for example, the device's MAC address, the time and duration of time when the device 330 was present, and signal strength while the device 330 is detected. In block 2208, the routine 2200 adds the device 330 to a count of device traffic, and in block 2210, the routine 2200 associates the device 330 with activity at the kiosk 100 at the time when the device 330 was detected. In block 2212, the routine 2200 proceeds to the next device 330 detected. In block 2214, the routine 2200 aggregates detected device data, and in block 2216, the routine 2200 processes the aggregated data. For example, in some embodiments, processing data can include evaluating kiosk 100 location quality and/or promotion opportunities by, for example, comparing high-traffic periods to kiosk 100 high-usage times; comparing traffic at different locations; and/or analyzing the signal strength of traffic to determine whether potential customers are close to or far from the kiosk 100. In some embodiments, processing data can include identifying devices 330 that are near the kiosk 100 at the time of (and thus possibly associated with) attempted fraudulent transactions, and adding the presence of such devices 330 to potential do-not-buy indicators, to potential hawker lists, etc. As another example, processing data can include identifying devices 330 that remain near the kiosk 100 without being sold at the kiosk 100, which may indicate the presence of a hawker trying to compete with the kiosk 100. In some embodiments, processing data can include reselling data, packaging data, etc.

Figure 23:
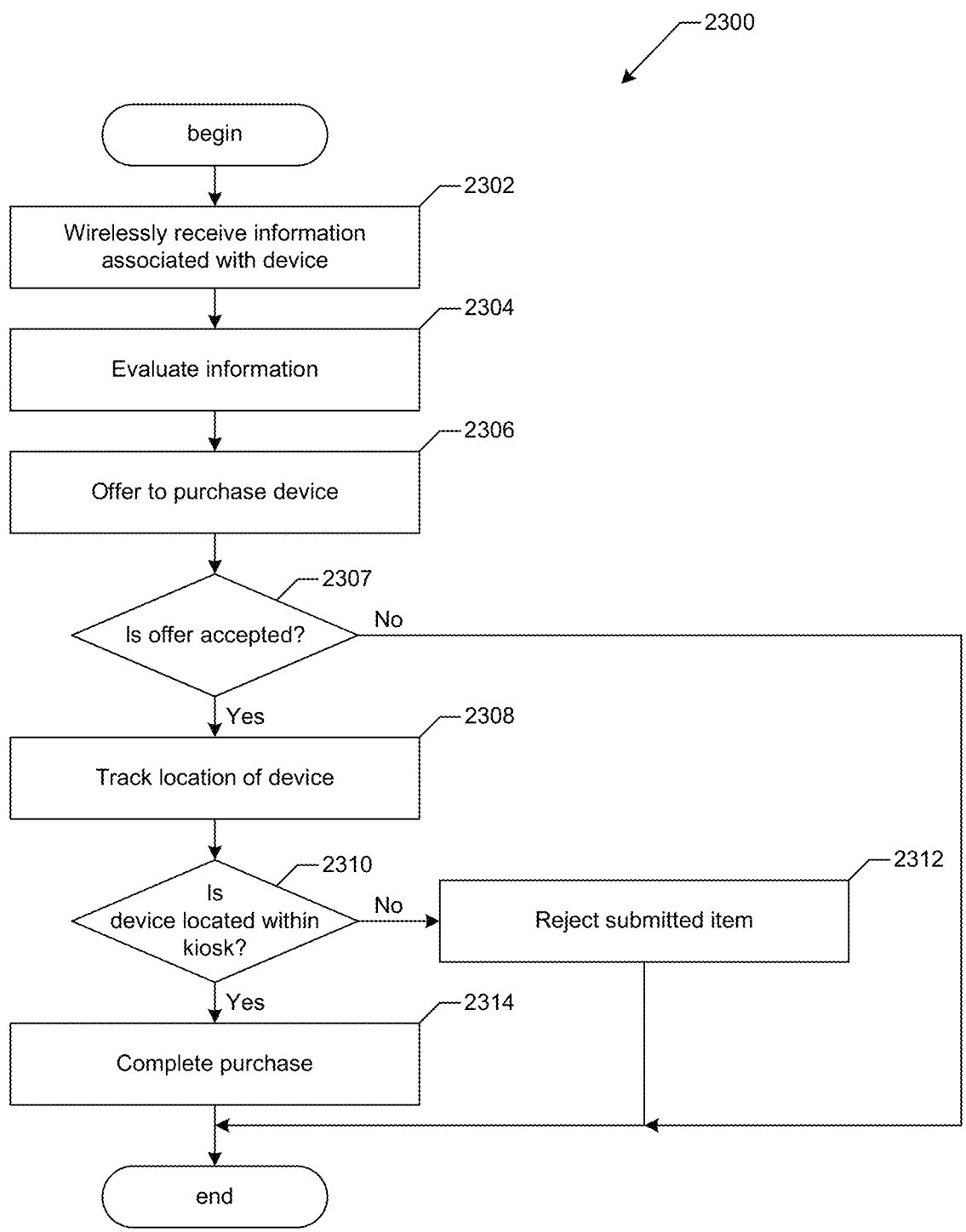
FIG. 23 is a flow diagram of a routine for locating a device in accordance with embodiments of the present technology.

FIG. 23 is a flow diagram of a routine 2300 for locating a wireless enabled electronic device such as the device 330 in accordance with embodiments of the present technology. In block 2302, the routine 2300 wirelessly receives information associated with the device 330, for example, information used to evaluate the device 330 for possible purchase as described above with reference to block 1006 of FIG. 10. The information can include, for example, a unique identifier such as the device's IMEI number, and/or information describing the device's manufacturer, model, characteristics, capabilities, and/or condition. In block 2304, the routine 2300 evaluates the information, and in block 2306, the routine 2300 makes an offer to purchase the device 330 based on the evaluated information. In decision block 2307, if the user does not accept the offer, then the routine ends. If, on the other hand, the user accepts the offer and agrees to submit the device 330 at the kiosk 100, then in block 2308, the routine 2300 tracks the location of the device 330. In some embodiments, the routine 2300 uses GPS location information or other location data (e.g., indoor positioning system or real-time locating system data) available on the device 330, e.g., through the app installed on the device 330. In some embodiments, the routine 2300 tracks the device's location over a short distance using multiple kiosk antennas. For example, the routine 2300 can use angularly arrayed directional antennas to measure the strength of signals from the device 330 in multiple directions to estimate the location of the device 330 without the use of triangulation. As another example, the routine 2300 may use well-known multilateration techniques to locate the source of the device's wireless signal based on the timing of signals received from the device 330 at multiple antennas and/or triangulation techniques to locate the source of the device's wireless signal based on directional information received at two or more antennas. In some embodiments, the routine 2300 adjusts the power of a wireless signal to determine whether the device 330 is within the reduced range of the low-power signal, or uses a short-range wireless receiver (e.g., NFC) to track the device 330 to within the receiver's range. In some embodiments, the routine 2300 determines information about the device's location by detecting the device's signal strength and/or continuity, including changes in the device's signal strength. In some embodiments, signal strength detection can include implementation of a Faraday cage into which the device 330 should pass. For example, if the kiosk inspection area 108 behind the access panel or door 106 of FIG. 1 is configured to, for example, reflect wireless signals within the inspection area and/or attenuate wireless signals from outside the inspection area, then the kiosk 100 can detect whether the device 330 is within the inspection area by observing whether wireless signals from the device 330 are reflected or attenuated when the access panel or door 106 is closed. In decision block 2310, the routine 2300 checks whether the device 330 is located within the kiosk 100. If the tracked location of the device 330 is not within the kiosk 100, then in block 2312 the routine 2300 rejects the submitted item that is apparently not the correct device 330. If, however, the tracked location of the device 330 is within the kiosk 100, then in block 2314 the routine 2300 can accept the device 330 with confidence that the kiosk has received the correct device 330. The routine 2300 can then complete the purchase according to the offer that the user accepted, after which the routine 2300 ends.

The present technology allows wireless enabled devices of various types such as mobile phones (smartphones and feature phones, for example), wearable computers, game devices, media players, desktop computers, etc. (e.g., the device 330) to be evaluated and purchased by an automated kiosk 100 with improved ease and speed. The present technology enables the user to submit the device 330 in a reduced number of steps and to take advantage of a wireless connection between the device 330 and the kiosk 100 so that the user does not have to connect wires from the kiosk 100 to the device 330. For example, the user may want to obtain an estimated price for his or her device 330 while maintaining possession of the device 330; for example, the user may not wish to place his or her device 330 into the inspection area 108 of the kiosk 100. In some embodiments, the present technology provides a "quick quote" or initial price estimate that the kiosk 100 can offer the user based on performing an analysis of the device 330 without requiring the user to give up control of his or her device 330. The kiosk can perform a visual analysis of the device 330 using one or more of the kiosk's external cameras 116a-c. For example, to initiate obtaining such a price estimate, the user can swipe an NFC-enabled device 330 against or in close proximity to (e.g., within a few inches of) an NFC sensor on the kiosk 100, or use the device 330 to scan a code such as a QR code displayed on the display screen 104. The user's action to initiate the "quick quote" process can, for example, launch the app on the user's device 330 and/or transfer information about the user's device 330 from the device 330 to the kiosk 100. The kiosk 100 and/or the app may instruct the user to position the device 330 so that one or more of the cameras 116a-c can image the device 330 to perform an initial visual analysis of the device. For example, they may instruct the user to hold his or her device at various angles or distances from the camera 116 (e.g., to show components of the device 330 and/or information printed on the device 330), or direct the user to display particular content on the screen 342 of the device 330 (e.g., a device information "about" screen or a screen displayed by the app) for evaluation by the kiosk through the camera 116. If the information and/or initial visual analysis are sufficient for the kiosk 100 to provide an initial quote, the kiosk 100 can provide the user a price or estimated range of prices for the device 330, e.g., via the display screen 104.

Figure 24A:
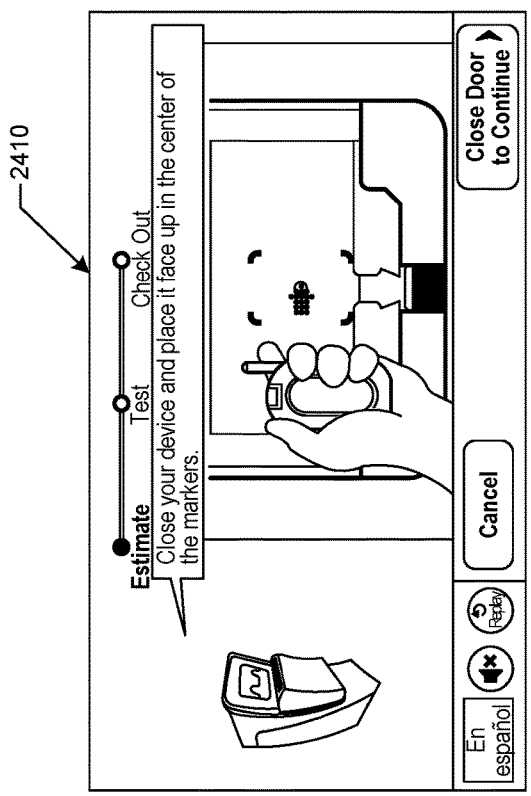
FIGS. 24A-24D are a series of display diagrams illustrating instructions for submitting a device in accordance with embodiments of the present technology.
Figure 24B:
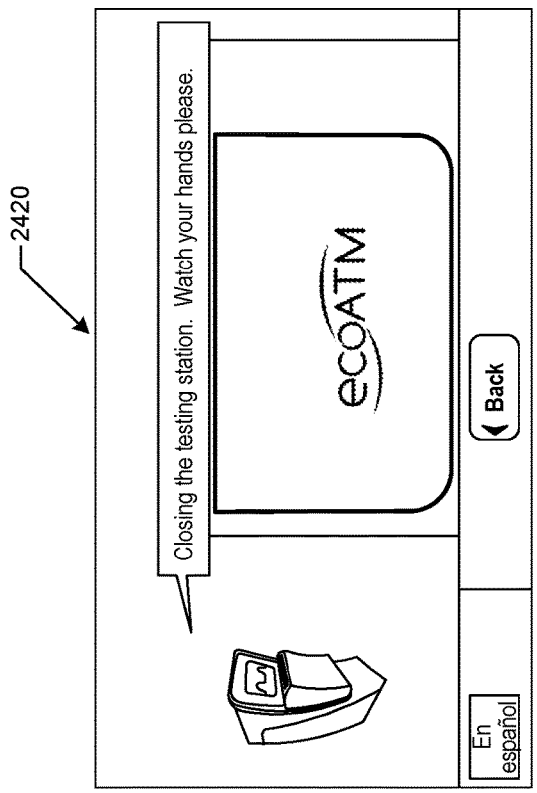
Figure 24C:
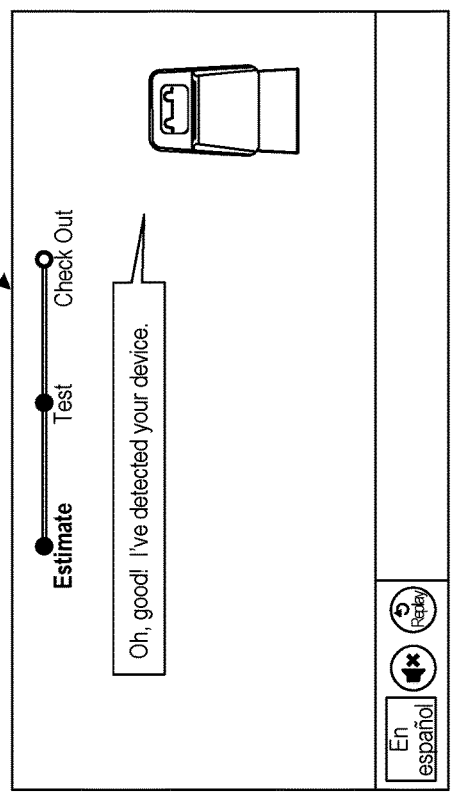
Figure 24D:
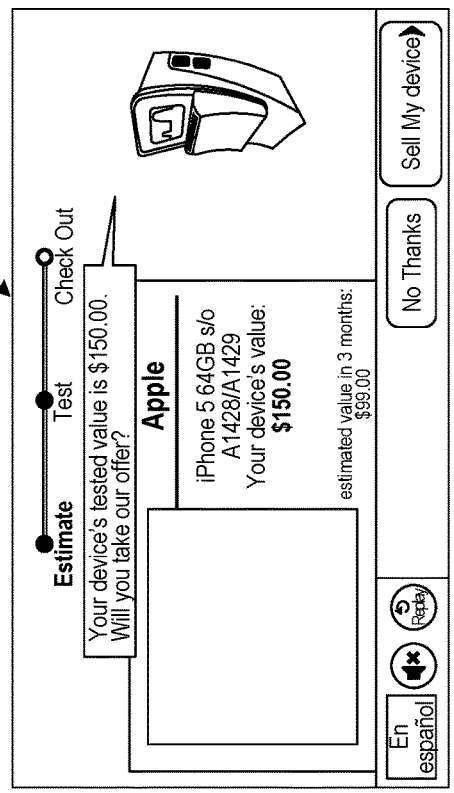

FIGS. 24A-24D, for example, are a series of display diagrams illustrating instructions for submitting the device 330 in accordance with embodiments of the present technology. In some embodiments, the kiosk 100 displays the illustrated textual instructions and accompanying graphical diagrams on the display screen 104 in response to, e.g., a user initiating a transaction to recycle a wireless device 330 at the kiosk 100. The kiosk 100 can display instructions that include, for example, animated graphics or text, photographs, and/or video guidance to the user. In FIG. 24A, the illustrated display page 2410 instructs the user to place his or her wireless device 330 within the kiosk inspection area 108. The device 330 can be connected to the kiosk's wireless network, for example, so that the kiosk 100 has wirelessly obtained information sufficient for an electrical evaluation of the device 330 as described above with respect to FIG. 10. In FIG. 24B, the illustrated display page 2420 indicates that the kiosk 100 is receiving the wireless device 330, with the access panel or door 106 closing over the inspection area 108. After the user places the device 330 in the kiosk 100 as instructed, the kiosk 100 performs a visual evaluation of the device 330 as described above with respect to FIG. 2B. In FIG. 24C, the kiosk 100 informs the user via a display page 2430 illustrating a message that the device 330 has been detected, indicating successful evaluation of the device 330 without a wired connection. In FIG. 24D, the illustrated display page 2440 presents an offer to purchase the customer's device 330 based on the wireless evaluation.

The present technology includes various other types and embodiments of recycling machines. For example, the present technology includes embodiments such as a countertop recycling station and/or a retail store-based interface operated by or with the assistance of a retail employee. As another example, the present technology includes embodiments such as a recycling machine configured to accept all kinds of devices, including larger items (e.g., desktop and laptop computers, televisions, gaming consoles, DVRs, etc.).

The above Detailed Description of examples and embodiments of the invention is not intended to be exhaustive or to limit the invention to the precise form disclosed above. Although specific examples for the invention are described above for illustrative purposes, various equivalent modifications are possible within the scope of the invention, as those skilled in the relevant art will recognize.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

Although the above description describes various embodiments of the invention and the best mode contemplated, regardless how detailed the above text, the invention can be practiced in many ways. Details of the system may vary considerably in its specific implementation, while still being encompassed by the present technology. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for evaluating and purchasing an electronic device, the method comprising:
    displaying a machine-readable code at a kiosk;
    instructing a user to scan, with the electronic device, the machine-readable code displayed at the kiosk;
    receiving, at a first computer remote from the kiosk, and via a software application operating on the electronic device, information about the electronic device, wherein operation of the software application is facilitated by the scanning of the machine-readable code;
    instructing the user to place the electronic device in an inspection area of the kiosk;
    receiving, at the first computer and/or a second computer remote from the kiosk, and via one or more cameras operably associated with the inspection area, one or more images of the electronic device;
    determining a price for the electronic device based at least in part on the information and the one or more images, and
    offering to purchase the electronic device for the price.

2. The method of claim 1 wherein the machine-readable code is configured to, when scanned by the electronic device, facilitate downloading the software application onto the electronic device.

3. The method of claim 1 wherein the machine-readable code is configured to, when scanned by the electronic device, cause the electronic device to automatically download the software application onto the electronic device.

4. The method of claim 1 wherein the machine-readable code is configured to, when scanned by the electronic device, cause the electronic device to prompt and/or guide the user to download the software application onto the electronic device.

5. The method of claim 1 wherein the machine-readable code is configured to, when scanned by the electronic device, cause the electronic device to run the software application.

6. The method of claim 1 wherein the machine-readable code is configured to, when scanned by the electronic device, cause the electronic device to send a request for the software application to one or more of the first computer, the second computer, and/or a third computer remote from the kiosk, and wherein the method further comprises:
    receiving, by the one or more of the first, the second, and/or the third computer, the request from the electronic device for the software application; and
    sending, by the one or more of the first, the second, and/or the third computer, in response to receiving the request, the software application to the electronic device.

7. The method of claim 1 wherein determining the price includes determining the price by the first computer and/or the second computer.

8. The method of claim 1 wherein displaying the machine-readable code at the kiosk includes presenting the machine-readable code on a display screen of the kiosk.

9. The method of claim 1 wherein displaying the machine-readable code at the kiosk includes displaying a QR code, a barcode, or other machine-readable indicia at the kiosk.

10. The method of claim 1 wherein instructing a user to scan, with the electronic device, the machine-readable code includes providing instructions to the user via a display screen of the kiosk.

11. The method of claim 1 wherein—
receiving, via the software application, information about the electronic device includes receiving first information about the electronic device,
receiving, via one or more cameras, one or more images of the electronic device includes receiving second information about the electronic device, and
the method further comprises comparing the first information to the second information, wherein offering to purchase the electronic device for a price includes offering to purchase the electronic device for the price when the first information matches the second information.

12. The method of claim 11 wherein the first information and the second information include a make, a model, a serial number, and/or an IMEI number of the electronic device.

13. The method of claim 11 wherein comparing the first information to the second information includes verifying a condition of the electronic device.

14. The method of claim 1, further comprising visually inspecting the one or more images of the electronic device to determine a condition of the electronic device, wherein offering to purchase the electronic device for a price includes offering to purchase the electronic device for a price based at least in part on the information and the condition of the electronic device.

15. The method of claim 1 wherein offering to purchase the electronic device for a price includes presenting the offer via a display screen of the kiosk, and/or presenting the offer via a display screen of the electronic device.

16. The method of claim 1, further comprising:
prompting the user to cause a display screen of the electronic device to display a unique identifier associated with the electronic device before the user places the electronic device in the inspection area; and
visually inspecting the one or more images to read the unique identifier from the display screen.

17. The method of claim 16 wherein the unique identifier includes a make, a model, a serial number, and/or an IMEI number of the electronic device.

18. The method of claim 1 wherein the electronic device is a mobile phone.

19. A system for evaluating and purchasing electronic devices, the system comprising:
a kiosk having—
a housing;
an inspection area within the housing and configured to receive an electronic device from a user; and
one or more cameras operably associated with the inspection area and configured to image the electronic device; and
one or more computers remote from the kiosk;
wherein the kiosk is configured to—
prompt the user to scan, with the electronic device, a machine-readable code displayed at the kiosk,
prompt the user to place the electronic device in the inspection area, and
obtain, via the one or more cameras, one or more images of the electronic device;
wherein the one or more computers are configured to—
receive information about the electronic device from the electronic device via a software application operating on the electronic device, wherein operation of the software application is facilitated by scanning the machine-readable code, and
receive the one or more images obtained by the kiosk via the one or more cameras; and
wherein the kiosk and/or the one or more computers are further configured to—
determine a price for the electronic device based at least in part on the information and the one or more images, and
facilitate an offer to purchase the electronic device from the user for the price.

20. The system of claim 19 wherein the kiosk includes a display screen, and wherein prompting the user to scan, with the electronic device, the machine-readable code includes prompting the user to scan, with the electronic device, a QR code, a barcode, or other machine-readable indicia displayed by the display screen.

21. The system of claim 19 wherein the one or more computers are configured to—
receive a request from the electronic device for the software application, wherein the request is facilitated by scanning the machine-readable code by the electronic device, and
provide the software application to the electronic device in response to receiving the request from the electronic device.

22. The system of claim 19 wherein the information about the electronic device includes a make, a model, a serial number, and/or an IMEI number of the electronic device.

23. The system of claim 19 wherein the kiosk further includes a storage bin within the housing, and wherein the kiosk is further configured to move the electronic device from the inspection area to the storage bin upon acceptance of the offer by the user.

24. The system of claim 19 wherein the software application is configured to cause a display screen of the electronic device to display a unique identifier associated with the electronic device.

25. The system of claim 24 wherein the unique identifier includes a make, a model, a serial number, and/or an IMEI number of the electronic device.

26. The system of claim 19 wherein the software application is configured to prompt the user to provide input regarding a condition of the electronic device.

27. The system of claim 19 wherein the electronic device is a mobile phone.

* * * * *